United States Patent
Ettes et al.

(10) Patent No.: US 10,090,884 B2
(45) Date of Patent: Oct. 2, 2018

(54) WIRELESS INDUCTIVE POWER TRANSFER

(71) Applicant: KONINKLIJKE PHILIPS N.V., Eindhoven (NL)

(72) Inventors: Wilhelmus Gerardus Maria Ettes, Leeuwarden (NL); Klaas Jacob Lulofs, Eindhoven (NL); Adrianus Petrus Johanna Maria Rommers, Veldhoven (NL); Neil Francis Joye, Waalre (NL); Andries Van Wageningen, Wijlre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 370 days.

(21) Appl. No.: 14/650,909

(22) PCT Filed: Dec. 30, 2013

(86) PCT No.: PCT/IB2013/061414
§ 371 (c)(1),
(2) Date: Jun. 10, 2015

(87) PCT Pub. No.: WO2014/108785
PCT Pub. Date: Jul. 17, 2014

(65) Prior Publication Data
US 2015/0341085 A1 Nov. 26, 2015

Related U.S. Application Data

(60) Provisional application No. 61/892,560, filed on Oct. 18, 2013.

(30) Foreign Application Priority Data

Jan. 11, 2013 (EP) .................................... 13151004

(51) Int. Cl.
*H04B 5/00* (2006.01)
*H02J 50/80* (2016.01)
(Continued)

(52) U.S. Cl.
CPC ............ *H04B 5/0031* (2013.01); *H02J 7/025* (2013.01); *H02J 50/12* (2016.02); *H02J 50/50* (2016.02);
(Continued)

(58) Field of Classification Search
None
See application file for complete search history.

(56) References Cited

U.S. PATENT DOCUMENTS 7,880,337 B2 * 2/2011 Farkas .................. B60L 11/005
307/104
2008/0062898 A1 3/2008 Hunt
(Continued)

FOREIGN PATENT DOCUMENTS

EP 1708545 B1 10/2006
JP 2011062008 A 3/2011
(Continued)

OTHER PUBLICATIONS

Qi System Description Wireless Power Transfer, Vol. I: Low Power, Part 1: Intervace Definiation;, June 2013, 117 Pages.
(Continued)

*Primary Examiner* — Jared Fureman
*Assistant Examiner* — James Evans

(57) ABSTRACT

A power transmitter for transferring power to a power receiver using a wireless inductive power signal includes a power source provides a power source signal which may have level variations. A power signal generator generates a drive signal from the power source signal by a frequency converter which increases the frequency of the drive signal relative to the power source signal. A limiter restricts the power of the drive signal fed to the inductor to be below a threshold in repeating time intervals. A synchronizer synchronizes the repeating time intervals to the power source
(Continued)

signal. In the power receiver, an inductor receives a power signal from the power transmitter, a load coupler decouples the power load from the inductor during the repeating time intervals and a synchronizer synchronizes the repeating time intervals of the receiver to the power signal. Communication units exchange data during the repeating time intervals.

20 Claims, 41 Drawing Sheets

(51) Int. Cl.
H02J 50/10 (2016.01)
H02J 50/50 (2016.01)
H02J 7/02 (2016.01)
H02J 50/12 (2016.01)

(52) U.S. Cl.
CPC .......... H02J 50/80 (2016.02); H04B 5/0037 (2013.01); H04B 5/0093 (2013.01); H04B 5/0075 (2013.01)

(56) References Cited

U.S. PATENT DOCUMENTS

| | | |
|---|---|---|
| 2010/0320962 A1 | 12/2010 | Sekita |
| 2011/0115303 A1 | 5/2011 | Baarman |
| 2011/0177783 A1* | 7/2011 | Baarman .................. A61L 2/10 455/41.1 |
| 2011/0188267 A1* | 8/2011 | Lai ........................ H02M 3/335 363/17 |
| 2011/0199045 A1* | 8/2011 | Hui ........................ H02J 7/025 320/108 |
| 2011/0204711 A1 | 8/2011 | Norconk et al. |
| 2011/0210620 A1 | 9/2011 | Shinoda |
| 2011/0223859 A1 | 9/2011 | Atrash et al. |
| 2012/0063505 A1 | 3/2012 | Okamura et al. |
| 2012/0149303 A1 | 6/2012 | Moes et al. |
| 2012/0314745 A1 | 12/2012 | Tsai et al. |
| 2013/0026849 A1 | 1/2013 | Ohta et al. |
| 2013/0119776 A1* | 5/2013 | Kamata ................. B60L 11/182 307/104 |
| 2013/0147279 A1* | 6/2013 | Muratov ................. H02J 5/005 307/104 |
| 2014/0133186 A1* | 5/2014 | Balakrishnan .... H02M 3/33523 363/17 |
| 2014/0346890 A1* | 11/2014 | Haseno ................... H02J 5/005 307/104 |

FOREIGN PATENT DOCUMENTS

| | | |
|---|---|---|
| WO | 9916160 A2 | 4/1999 |
| WO | 2011121877 A1 | 10/2011 |
| WO | 2012049582 A1 | 4/2012 |
| WO | 2012109137 A2 | 8/2012 |

OTHER PUBLICATIONS

Atluri et al, "Design of a Wideband Power-Efficient Inductive Wireless Link for Implantable Biomedical Devices Using Multiple Carriers", Proceedings of the 2nd Internation IEEE EMBS Conference on Neural Engineering, 2005, p. V-IX.

Zhou et al, "A Non-Coherent DPSK Data Receiver With Interference Cancellation for Dual-Band Transcutaneous Telemetries", IEEE Journal of Solid-State Circuits, vol. 43, No. 9, 2008, pp. 2003-2012.

Liu et al, "Implantable Biomimetic Microelectronic Systems Design", IEEE Engineering in Medicine and Biology Magazine, vol. 24, 2005, pp. 66-74.

Wang et al, "Analysis of Dual Band Power and Data Telemetry for Biomedical Implants", IEEE Transactions on Biomedical Circuits and Systems, vol. 6, No. 3, 2012, pp. 208-215.

* cited by examiner

WIRELESS INDUCTIVE POWER TRANSFER

CROSS-REFERENCE TO PRIOR APPLICATIONS

This application is the U.S. National Phase application under 35 U.S.C. § 371 of International Application No. PCT/IB2013/061414, filed on Dec. 30, 2013, which claims the benefit of European Patent Application No. 13151004.2, filed on Jan. 11, 2013 and U.S. Provisional Application 61/892,560, filed on Oct. 18, 2013. These applications are hereby incorporated by reference herein.

FIELD OF THE INVENTION

The invention relates to inductive power transfer and in particular, but not exclusively, to an inductive power transfer system in accordance with the Qi wireless power transfer standard.

BACKGROUND OF THE INVENTION

Many systems require a wiring and/or electrical contacts in order to supply electrical power to devices. Omitting these wires and contacts provides for an improved user experience. Traditionally, this has been achieved using batteries located in the devices but this approach has a number of disadvantages including extra weight, bulk and the need to frequently replace or recharge the batteries. Recently, the approach of using wireless inductive power transfer has received increasing interest.

Part of this increased interest is due to the number and variety of portable and mobile devices having exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

As mentioned, most present day devices require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each power supply being dedicated to a specific device. Although, internal batteries may prevent the need for a wired connection to an external power supply, this approach only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers which have a tight coupling between the primary transmitter coil and the secondary receiver coil. By separating the primary transmitter coil and the secondary receiver coil between two devices, wireless power transfer between the devices becomes possible based on the principle of a loosely coupled transformer.

Such an arrangement allows a wireless power transfer to the device without requiring any wires or physical electrical connections. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html, where in particular the defined Standards documents can be found.

In order to support the interworking and interoperability of power transmitters and power receivers, it is preferable that these devices can communicate with each other, i.e. it is desirable if communication between the power transmitter and power receiver is supported, and preferably if communication is supported in both directions. An example of a wireless power transfer system allowing communication between a power receiver and a power transmitter is provided in US2012/314745A1.

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter.

However, a limitation of the Qi system is that it does not support communication from the power transmitter to the power receiver. Furthermore, load modulation such as developed for Qi may be suboptimal in some applications.

As an example, FIG. 1 illustrates a power supply path for typical induction heating appliance. The power provision comprises an AC/DC converter 101 which rectifies the input ac voltage (e.g. the mains). The rectified mains signal is fed to a DC/AC converter 103 (Inverter) which generates a high frequency drive signal which is fed to a resonant tank 105 (a tuned L-C circuit) and via this to a transmitter coil 107. The system includes a heating pan, which can be represented by a receiver coil 109 and a load R_Sole 111 (representing the Eddy current losses in the pan sole).

FIG. 2 illustrates the voltage waveforms of the power path of FIG. 1. The mains voltage Umains is rectified by the AC/DC converter 101 to the voltage Udc_abs. A large storage capacitor, which is used to buffer the rectified mains voltage, is normally not applied in these kinds of applications since it will add to the total mains harmonic distortion of this application. As a result, a varying DC voltage is generated by the AC/DC converter 101.

Because of the characteristics of the rectified voltage Udc_abs, the output voltage Uac_HF of the DC/AC converter 103 is shaped as shown in FIG. 2. The normal operating frequency of the inverter is in the order of 20 kHz to 100 kHz.

The transmitter coil 107, together with the receiver coil 109 and resistance R_sole, is basically the load of the DC/AC converter 103. However, due to the nature of this load (both inductive and resistive) a resonant circuit 105 is typically used in between the DC/AC converter 103 and this load in order to cancel the inductive part of the load. Furthermore, the resonant network 105 typically results in a reduction in the switching losses of the inverter typically used in the DC/AC converter 103.

Communication between receiver and transmitter in a system such as FIG. 1 is faced with multiple challenges and difficulties. In particular, there is typically a conflict between the requirements and characteristics of the power signal and the desires for the communication. Typically, the system requires close interaction between the power transfer and communication functions. For example, the system is designed based on the concept of only one signal being inductively coupled between the transmitter and the power receiver, namely the power signal itself. However, using the power signal itself for not only performing a power transfer but also for carrying information results in difficulties due to the varying nature of the power signal amplitude. For example, in order to modulate a signal on to the power signal, or to use load modulation, the power signal must have sufficient amplitude. However, this cannot be guaranteed for a power signal such as that of FIG. 2.

As a specific example, using a load modulation approach wherein the power receiver communicates data by load modulation (such as in the Qi system) requires that the normal load is relatively constant. However, this cannot be guaranteed in many applications.

E.g., if wireless power transfer is to be used to power a motor driven appliance (such as e.g. a blender), a power path similar to that of FIG. 1 can be used but with the load (corresponding to the heating pan) being replaced by a separate receive inductor (Rx coil), an AC/DC converter and the DC motor itself. Such a power path is illustrated in FIG. 3.

The typical voltage and current waveforms of such a wireless motor driven appliance are shown in FIG. 4. As illustrated, the motor current, Idc_motor, tends to be quite erratic and discontinuous. Near the zero crossings of the mains voltage, gaps appear in the motor current. This is caused by the rotation voltage of the motor. The DC/AC converter (Inverter) is only able to supply current to the motor if the voltage Uac_Rx is higher than the rotation voltage Udc_mot induced in the motor.

To control the speed (or torque) of the motor, a speed sensor (or current sensor) may be added to the system, together with a feedback loop from the speed sensor to the power transmitter. Because of the nature of the inverter (which could be a voltage or current source), the DC/AC converter (Inverter) is preferably incorporated in this feedback loop. Therefore communication is required between the appliance part (the power receiver) and the power transmitter part. This may be achieved by applying load modulation techniques at the appliance side, such that the load changes can be detected and demodulated at the transmitter side. This demodulated data can then include information of the motor speed (or torque), or indeed any other information that may e.g. be used to control the transmitter.

However, when a motor driven appliance draws current, the amplitude of this current is strongly related to the load of the motor. If the motor load is changing, the motor current is changing as well. This results in the amplitude of the inverter current also changing with the load. This load variation will interfere with the load modulation, resulting in degraded communication. Indeed, in practice it is typically very difficult to detect load modulation for loads that include a motor as part of the load. Therefore, in such scenarios, the number of communication errors is relatively high or the communication may utilize a very high data symbol energy, thereby reducing the possible data rate very substantially.

Hence, an improved power transfer system would be advantageous and in particular a system allowing improved communication support, increased reliability, increased flexibility, facilitated implementation, reduced sensitivity to load variations and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for transferring power to a power receiver using a wireless inductive power signal, the power transmitter comprising: an inductor for providing the wireless inductive power signal in response to a drive signal fed to the inductor; a power source for providing a power source signal; a power signal generator for generating the drive signal from the power source signal, the power signal generator comprising: a frequency converter arranged to generate a frequency of the drive signal to be higher than a frequency of the power source signal, and a limiter for restricting a power of the drive signal fed to the inductor to be below a threshold in repeating time intervals; a synchronizer for synchronizing the repeating time intervals to the power source signal; and a communication unit for exchanging data with the power receiver during the repeating time intervals.

The invention may provide an improved power transfer system. It may in many embodiments allow, support or facilitate improved communication between a power transmitter and a power receiver. The approach may in particular enable, facilitate or support communication based on inductive signals generated by the power receiver. The approach may be used for communication from power transmitter to power receiver and/or from power receiver to power transmitter.

The approach may allow increased separation between requirements and preferences for power transfer and for communication operations. It may in particular reduce the impact of operational characteristics of the power transfer on the communication operation, and vice versa. Specifically, the impact of variations in the power transfer load on the communication performance may be reduced or removed. The approach may allow that a power receiver can generate a wireless signal which it can provide to a coil of the power receiver resulting in a signal being induced in the inductor of the power transmitter. This power receiver generated signal may be used to inductively transfer data between power transmitter and power receiver. The approach may result in reduced sensitivity of the communication to level variations of the power source signal.

The synchronization to the power source signal may in many embodiments facilitate operation and/or provide a more reliable operation. In particular, it may reduce the impact of the communication on the power transfer, and specifically reduce or even minimize the reduction in power being transferred due to the communication. The approach may in many embodiments allow an improved communication and may facilitate synchronization between power transmitter and power receiver.

The synchronizer may be arranged to directly synchronize the repeating time intervals to the power source signal by analyzing, evaluating or measuring a property of the power source signal. For example, amplitude variations in the power source signal may be used to synchronize the repeating time intervals. However, in other embodiments, an indirect synchronization of the repeating time intervals to the power source signal may be achieved, e.g. by synchronizing the repeating time intervals to another signal which is itself synchronous with the power source signal. For example, the power source signal may be derived from another signal, and the synchronization of the repeating time intervals may be achieved by synchronizing to a property of this other signal.

The repeating time intervals may in many embodiments be synchronized to amplitude or signal level variations of the power source signal.

In many embodiments, the limiter may be arranged to disconnect or decouple the drive signal from the inductor during the repeating time intervals. The limiter may thus restrict the power of the drive signal fed to the inductor by not feeding the drive signal to the inductor during the repeating time intervals.

The limiter may typically restrict the power to no more than at most 20%, 10% or 5% of the maximum power of the drive signal. In many embodiments, the drive signal may be disconnected from the inductor during the repeating time intervals thereby limiting the power of the drive signal being fed to the inductor to nil.

The power signal generator may e.g. be arranged to operate in a power transfer mode and a communication mode. The power signal generator may operate in the communication mode during the repeating time intervals. In the power transfer mode, the drive signal drives the inductor to provide the wireless indicative power signal. In the communication mode, the drive signal does not drive the inductor, and specifically the drive signal may not be fed to the inductor. In the communication mode, the power transmitter may communicate with the power receiver. The communication mode may include the power transmitter generating a communication signal and feeding this to the inductor. Alternatively or additionally, communication mode may include the power transmitter detecting or demodulating a communication signal received by the inductor, e.g. corresponding to a signal being inducted by an inductive communication signal provided from the power receiver. The communication may be restricted to the repeating intervals.

In some embodiments, all communication between the power transmitter and power receiver may be in the repeating time intervals. Thus, in many embodiments no communication between power transmitter and power receiver takes place outside the repeating time intervals.

The frequency converter may in many embodiments be a DC to AC converter. The power source signal may be a varying level DC signal which is converted into an AC drive signal. The frequency converter may include an inverter.

The frequency converter may in many embodiments generate the drive signal by including an operation that corresponds to a multiplication of the power source signal and a further signal having a higher frequency. The further signal may correspond to a square-wave signal with two levels, and the multiplication operation may be implemented using a switching circuit, such as an inverter, driven by a switch signal with a higher frequency than the power source signal.

The drive signal may in many embodiments be generated in response to an amplitude modulation of the power source signal with a modulation signal having a higher frequency than the power source signal. The limiter may in such an embodiment be arranged to restrict the power of the power drive signal by operations on the drive signal, or may e.g. restrict the power by restricting a power of the power source signal being amplitude modulated (or in case of e.g. a multiplication by restricting an amplitude of the modulating signal).

The power source signal may in many embodiments be generated from a low frequency AC signal with a frequency below 100 Hz. Specifically, the power source signal may be generated from a mains signal with a typical frequency of 50 Hz or 60 Hz. In many embodiments, the power source signal may be a full wave rectified version of the mains derived AC signal. Thus, the frequency of the power source signal may typically be 100 Hz or 120 Hz. In most embodiments, the frequency of the power source signal will be no higher than 400 Hz.

The frequency of the drive signal will typically be at least 10 kHz, 20 kHz or even 50 kHz. The drive signal may be a signal corresponding to an amplitude varying carrier with a carrier frequency of at least 10 kHz, 20 kHz or even 50 kHz and a maximum frequency of the amplitude variations of no more than 400 kHz (frequencies up to 400 kHz may for example be used in airplanes). The drive signal may in many scenarios correspond to an amplitude modulated carrier with the carrier signal being provided by the frequency converter and the amplitude modulating signal being the power source signal.

The repeating time intervals may be periodically repeating time intervals. In many embodiments, the repeating time intervals may have a duty cycle of no more than 10%, 5% or even in some embodiments 1%.

In accordance with an optional feature of the invention, the power source signal is a varying DC power signal.

This may provide improved performance and may reduce complexity in many embodiments. The approach may be particularly suitable for introducing communication to systems wherein a power source signal, such as the supply voltage to a drive circuit for driving the inductor, is non-constant. The power source signal may for example be generated by half or full wave rectification of an AC input signal. The smoothing may be absent and/or insufficient to reduce the ripple to low values. For example, the ripple on the power supply voltage may be no less than 25% or even 50% of the maximum value.

The power source signal may specifically have a varying voltage with the voltage of the signal changing with time.

In accordance with an optional feature of the invention, the repeating time intervals correspond to time intervals for which a level of the power source signal is below a threshold.

This may provide improved communication and/or improved power transfer. It may in particular synchronize the repeating time intervals to times when the power transfer provided by the power transmitter is less significant.

The threshold may be selected dependent on the individual embodiment or scenario. In some embodiments, the repeating time intervals may be synchronized to repeating, and possibly periodic, minima of the power source signal. Specifically, the repeating time intervals may be selected such that they include, and often center on, time instants corresponding to local minima of the level of the power source signal.

In accordance with an optional feature of the invention, the synchronizer is arranged to synchronize the repeating time intervals to periodic amplitude variations in the power source signal.

This may provide a particularly advantageous operation and in many scenarios allow both reduced interference to communication, reduced impact on power transfer, and/or facilitated synchronization between the power transmitter and the power receiver.

In accordance with an optional feature of the invention, the power source signal comprises a ripple component overlaid a DC component, and the synchronizer is arranged to synchronize the repeating time intervals to the ripple component.

The power source signal may specifically be a combination of a ripple signal component, a constant signal component, and possibly other signal components, such as a noise signal component. The synchronizer may measure temporal characteristics of the ripple signal component and synchronize the repeating time intervals to these temporal characteristics. For example, a synchronization to the minima of the ripple signal component may be performed. The approach may allow improved operation.

In accordance with an optional feature of the invention, the power source is arranged to generate the power source signal in response to a rectification of an AC signal, and wherein the repeating time intervals are synchronized to zero crossings of the AC signal.

This may provide improved communication and/or improved power transfer. It may in particular synchronize the repeating time intervals to times when the power transfer provided by the power transmitter is less significant.

Specifically, the repeating time intervals may be selected such that they include, and often center on, time instants corresponding to zero crossings of the AC signal.

In accordance with an optional feature of the invention, the limiter is arranged to decouple the inductor from the frequency converter during the repeating time intervals.

This may allow low complexity and/or provide an improved separation between the power transfer and communication operations thereby resulting in improved communication.

In accordance with an optional feature of the invention, the communication unit comprises a carrier generator for generating a carrier signal and providing it to the inductor during the repeating time intervals.

This may provide a particularly advantageous approach for many embodiments and in many scenarios. It may in particular reduce complexity of the power receiver. The carrier signal may be used to carry information by the carrier signal being modulated by the power transmitter or by the power receiver.

In accordance with an optional feature of the invention, the communication unit comprises a modulator for modulating data onto the carrier signal during the repeating time intervals.

This may provide a particularly advantageous approach in many embodiments and in many scenarios. It may in particular reduce complexity of the power receiver. The modulation may for example be an amplitude modulation, frequency modulation and/or phase modulation of the carrier.

In accordance with an optional feature of the invention, the communication unit comprises a demodulator for demodulating a load modulation of the carrier signal during the repeating time intervals.

This may provide a particularly advantageous approach in many embodiments and in many scenarios. It may in particular reduce complexity of the power transmitter.

In accordance with an optional feature of the invention, a frequency of the carrier signal is different from a frequency of the drive signal.

The invention may allow individual optimization of the signals for respectively power transfer and communication operations. The approach may for example allow facilitated modulation and/or demodulation, and may in many cases allow an increased data rate of the communication.

The frequency of the carrier signal may in particular be higher than the drive signal.

In accordance with an optional feature of the invention, the communication unit comprises a modulator for load modulating a load of the inductor during the repeating time intervals.

In some embodiments, the power receiver may generate a carrier signal which can be used by the power transmitter to communicate data to the power receiver by load modulation of the carrier. The approach may for example reduce complexity of the transmitter, and may in particular reduce or remove the power supply requirements for the power transmitter during the repeating time intervals In accordance with an optional feature of the invention, the communication unit comprises a demodulator for demodulating a modulated carrier signal induced in the inductor by the power receiver during the repeating time intervals.

In some embodiments, the power receiver may generate a modulated carrier signal which can be used by the power receiver to communicate data to the power transmitter during the repeating time intervals. The approach may for example reduce complexity of the transmitter, and may in particular reduce or remove the power supply requirements for the power transmitter during the repeating time intervals In accordance with an optional feature of the invention, the communication unit comprises a communication inductor for communicating with the power receiver during the repeating time intervals.

In some embodiments, the power transmitter may comprise two inductors with one being used for communication and one being used for power transfer. The two inductors may be coupled. However, due to the time separation between communication and power transfer, such coupling does not result in unacceptable interference between the operations.

The approach may allow separate optimization of the inductors for the individual functions.

In accordance with an optional feature of the invention, the power signal generator is arranged to determine a duration of the repeating time intervals in response to data received from the power receiver.

This may provide improved performance and/or operation in many scenarios. It may allow the power receiver to control at least part of the communication and may for example allow the power receiver to control the communication bandwidth provided by the repeating time intervals. This may allow the power transmitter and the system to adapt to different requirements of different power receivers, and thereby may allow improved and customized trade-off between e.g. power transfer capabilities and communication capabilities. In accordance with an optional feature of the invention, the limiter is arranged to couple a power dissipation element to the inductor at initiation of a repeating time interval.

This may provide improved performance, and in particular reduced power consumption and reduced interference during communication.

In accordance with an optional feature of the invention, the coupling of the power dissipation element to the inductor is an inductive coupling.

This may provide facilitated implementation and/or improved performance.

In some embodiments, the power dissipation element may be coupled to a communication coil which is inductively coupled to the inductor of the power transmitter.

In accordance with an optional feature of the invention, the frequency converter comprises a switch bridge for generating the drive signal, and the limiter may be arranged to restrict the power signal by gradually changing a relative phase of switch elements of the switch bridge. At the onset of a repeating time interval, the phase may be gradually shifted (e.g. with a transition duration of no less than 200 μs, or no less than 5% of the duration of the repeating time interval). This may provide facilitated implementation and/or improved performance.

In accordance with an optional feature of the invention the frequency converter comprises a switch bridge for generating the drive signal, and the limiter is arranged to restrict the power signal by instantaneously changing drive signals for all switch elements of the switch bridge to switch all switch elements off. This may provide facilitated implementation and/or improved performance. The switch elements may specifically be e.g. FETs or IBGTs having internal diodes, and the switch elements may be arranged such that at least some of the internal diodes may conduct current from the coil to the power source when all switch elements are switched off. This may reduce the overall power consumption as the energy stored in the resonance circuits/magnetic field may be fed back to the power source.

In accordance with an aspect of the invention, there is provided power receiver for receiving power from a power transmitter using a wireless inductive power signal, the power receiver comprising: an inductor for receiving the power signal; a load coupler for coupling the power signal to a load, the load coupler being arranged to decouple the load from the inductor during repeating time intervals; a synchronizer for synchronizing the repeating time intervals to amplitude variations of the power signal; and a communication unit for exchanging data with the power transmitter during the repeating time intervals.

The invention may provide an improved power transfer system. It may in many embodiments allow, support or facilitate improved communication between a power transmitter and a power receiver. The approach may in particular enable, facilitate or support communication based on inductive signals generated by the power receiver. The approach may be used for communication from power transmitter to power receiver and/or from power receiver to power transmitter.

The approach may allow increased separation between the requirements and preferences for power transfer and the requirements and preferences for communication operations. It may in particular reduce the impact of operational characteristics of the power transfer on the communication operation, and vice versa. Specifically, the impact of variations in the power transfer load on the communication performance may be reduced or removed. The approach may allow that a power receiver can generate a wireless signal which it can provide to a coil of the power receiver resulting in a signal being induced in the inductor of the power transmitter. This power receiver generated signal may be used to inductively transfer data between the power transmitter and the power receiver. The approach may result in reduced sensitivity of the communication to level variations of the power source signal.

The synchronizer may be arranged to synchronize the repeating time intervals to repeating, and possibly periodic, minima of the power signal. Specifically, the repeating time intervals may be selected such that they include, and often center on, time instants corresponding to local minima of the level/amplitude of the power signal.

It will be appreciated that the comments provided with respect to the power transmitter apply mutatis mutandis as appropriate to the power receiver.

In accordance with an optional feature of the invention, the communication unit comprises a carrier generator for generating a carrier signal and providing it to the inductor during the repeating time intervals.

In accordance with an optional feature of the invention, the communication unit comprises a modulator for modulating data onto the carrier signal during the repeating time intervals.

In accordance with an optional feature of the invention, the communication unit comprises a demodulator for demodulating a load modulation of the carrier signal during the repeating time intervals.

In accordance with an optional feature of the invention, the communication unit comprises a modulator for load modulating a load of the inductor during the repeating time intervals.

In accordance with an optional feature of the invention, the communication unit comprises a demodulator for demodulating a modulated carrier signal induced in the inductor by the power transmitter during the repeating time intervals.

In accordance with an optional feature of the invention, the communication unit comprises a communication inductor for communicating with the power transmitter during the repeating time intervals.

In accordance with an optional feature of the invention, the power receiver is arranged to couple a power dissipation element to the inductor at initiation of a repeating time interval.

This may provide improved performance, and in particular reduced power consumption and reduced interference during communication.

In accordance with an optional feature of the invention, the coupling of the power dissipation element to the inductor is an inductive coupling.

This may provide facilitated implementation and/or improved performance.

In some embodiments, the power dissipation element may be coupled to a communication coil which is inductively coupled to inductor of the power receiver.

According to an aspect of the invention there is provided a method of operation for a power transmitter transferring power to a power receiver using a wireless inductive power signal, the power transmitter comprising an inductor for providing the wireless inductive power signal in response to a drive signal fed to the inductor; and the method comprising: providing a power source signal; generating the drive signal from the power source signal, the generating comprising: generating a frequency of the drive signal to be higher than a frequency of the power source signal, and restricting a power of the drive signal fed to the inductor to be below a threshold in repeating time intervals; synchronizing the repeating time intervals to the power source signal; and exchanging data with the power receiver during the repeating time intervals.

According to an aspect of the invention there is provided a method of operation for a power receiver receiving power from a power transmitter using a wireless inductive power signal, the power receiver comprising an inductor for receiving the power signal and a load coupler for coupling the power signal to a load; and the method comprising: the load coupler decoupling the load from the inductor during repeating time intervals; synchronizing the repeating time intervals to amplitude variations of the power signal; and exchanging data with the power transmitter during the repeating time intervals.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 5:
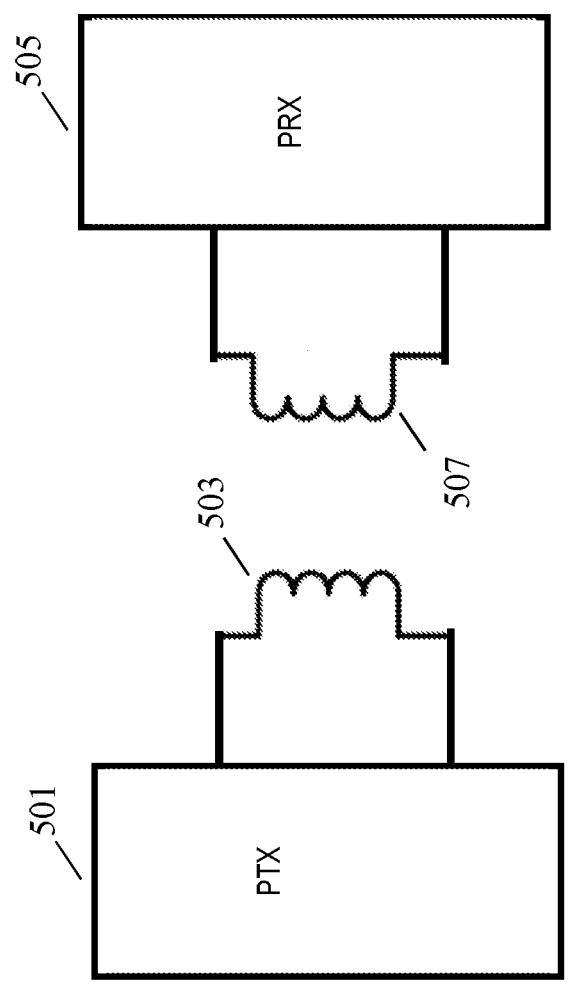
FIG. 5 illustrates an example of a power transfer system comprising a power transmitter and a power receiver in accordance with some embodiments of the invention.

FIG. 5 illustrates an example of a power transfer system in accordance with some embodiments of the invention. The power transfer system comprises a power transmitter 501 which includes (or is coupled to) a transmitter coil/inductor 503. The system further comprises a power receiver 505 which includes (or is coupled to) a receiver coil/inductor 507.

The system provides a wireless inductive power transfer from the power transmitter 501 to the power receiver 505. Specifically, the power transmitter 501 generates a power signal which is propagated as a magnetic flux by the transmitter coil 503. The power signal may typically have a frequency between around 20 kHz to 200 kHz. The transmitter coil 503 and the receiver coil 507 are loosely coupled and thus the receiver coil picks up (at least part of) the power signal from the power transmitter 501. Thus, the power is transferred from the power transmitter 501 to the power receiver 505 via a wireless inductive coupling from the transmitter coil 503 to the receiver coil 507. The term power signal is mainly used to refer to the inductive signal between the transmitter coil 503 and the receiver coil 507 (the magnetic flux signal), but it will be appreciated that by equivalence it may also be considered and used as a reference to the electrical signal provided to the transmitter coil 503, or indeed to the electrical signal of the receiver coil 507.

In the following, the operation of the power transmitter 501 and the power receiver 505 will be described with specific reference to an embodiment in accordance with the Qi standard (except for the herein described (or consequential) modifications and enhancements). In particular, the power transmitter 501 and the power receiver 505 may substantially be compatible with the Qi Specification version 1.0 or 1.1 (except for the herein described (or consequential) modifications and enhancements).

To control the power transfer, the system may proceed via different phases, in particular a selection phase, a ping phase, an identification and configuration phase, and a power transfer phase. More information can be found in chapter 5 of part 1 of the Qi wireless power specification.

Initially, the power transmitter 501 is in the selection phase wherein it merely monitors for the potential presence of a power receiver. The power transmitter 501 may use a variety of methods for this purpose, e.g. as described in the Qi wireless power specification. If such a potential presence is detected, the power transmitter 501 enters the ping phase wherein a power signal is temporarily generated. The power receiver 505 can apply the received signal to power up its electronics. After receiving the power signal, the power receiver 505 communicates an initial packet to the power transmitter 501. Specifically, a signal strength packet indicating the degree of coupling between power transmitter and power receiver is transmitted. More information can be found in chapter 6.3.1 of part 1 of the Qi wireless power specification. Thus, in the Ping phase it is determined whether a power receiver 505 is present at the interface of the power transmitter 501.

Upon receiving the signal strength message, the power transmitter 501 moves into the Identification & Configuration phase. In this phase, the power receiver 505 keeps its output load disconnected and communicates to the power transmitter 501 using load modulation. The power transmitter provides a power signal of constant amplitude, frequency and phase for this purpose (with the exception of the change caused by load-modulation). The messages are used by the power transmitter 501 to configure itself as requested by the power receiver 505. The messages from the power receiver 505 are not communicated continuously but are communicated in intervals.

Following the Identification and Configuration phase, the system moves on to the power transfer phase where the actual power transfer takes place. Specifically, after having communicated its power requirement, the power receiver 505 connects the output load and supplies it with the received power. The power receiver 505 monitors the output load and measures the control error between the actual value and the desired value of a certain operating point. It communicates such control errors to the power transmitter 501 at a minimum rate of e.g. every 250 ms to indicate these errors to the power transmitter 501 as well as the desire for a change, or no change, of the power signal. Thus, in the power transfer phase, the power receiver 505 also performs load modulation of the power signal in load modulation intervals in order to communicate information to the power transmitter 501.

The power transfer system of FIG. 5 utilizes communication between the power transmitter 501 and the power receiver 505.

An approach for communication from a power transmitter to a power transmitter has been standardized in the Qi Specification version 1.0 and 1.1.

In accordance with this standard, a communication channel from the power receiver to the power transmitter is implemented by using the power signal as carrier. The power receiver modulates the load of the receiver coil. This results in corresponding variations in the power signal at the power transmitter side. The load modulation may be detected by a change in the amplitude and/or phase of the transmitter coil current, or alternatively or additional by a change in the voltage of the transmitter coil. Based on this principle, the power receiver can modulate data which the power transmitter demodulates. This data is formatted in bytes and packets. More information can be found in the "System description, Wireless Power Transfer, Volume I: Low Power, Part 1: Interface Definition, Version 1.0 July 2010, published by the Wireless Power Consortium" available via http://www.wirelesspowerconsortium.com/downloads/wireless-power-specification-part-1.html, also called the Qi wireless power specification, in particular chapter 6: Communications Interface.

It is noted that the Qi wireless power specification versions 1.0 and 1.1 define only communication from the power receiver to the power transmitter, i.e. it defines only a unidirectional communication.

The system of FIG. 5 uses a different approach to communication than that disclosed in the Qi wireless power specification versions 1.0 and 1.1. However, it will be appreciated that this different approach to communication may be used together with other communication approaches, including the communication approach of the Qi wireless power specification versions 1.0 and 1.1. For example, for a Qi type system, the communication approach of Qi wireless power specification versions 1.0 and 1.1 may be used for all communication that is specified to be performed by the Qi wireless power specification versions 1.0 and 1.1, but with additional communication being supported by the different approach described in the following. For example, the approach of the Qi wireless power specification versions 1.0 and 1.1 may be used to communicate data from the power receiver 505 to the power transmitter 501 with the new approach being used to communicate data from the power transmitter 501 to the power receiver 505.

In the system of FIG. 5, communication is specifically performed in dedicated repeating time intervals. The repeating time intervals will henceforth be referred to as communication time intervals. During the communication time intervals, the power transfer is terminated or reduced to a lower level thereby reducing the impact of the power transfer operation on the communication operation. Also, during the communication intervals, the power receiver 505 will typically decouple its power load from the receive inductor 507 so that the power transfer signal is not loaded by this, thereby reducing the impact of load variations on the communication performance.

During the communication intervals, a communication carrier signal may be generated and this communication carrier signal may then be modulated to carry information. The carrier may be generated by the power transmitter 501 and/or the power receiver 505. The modulation may be performed by the device generating the carrier, e.g. the carrier may be amplitude modulated, frequency modulated and/or phase modulated. In this way, data may be communicated from the device generating the carrier to the other device. Alternatively or additionally, the modulation may be performed by the device not generating the carrier, e.g. by load modulation of the carrier signal. In this way data may be communicated from the device not generating the carrier to the device generating the carrier.

Figure 6:
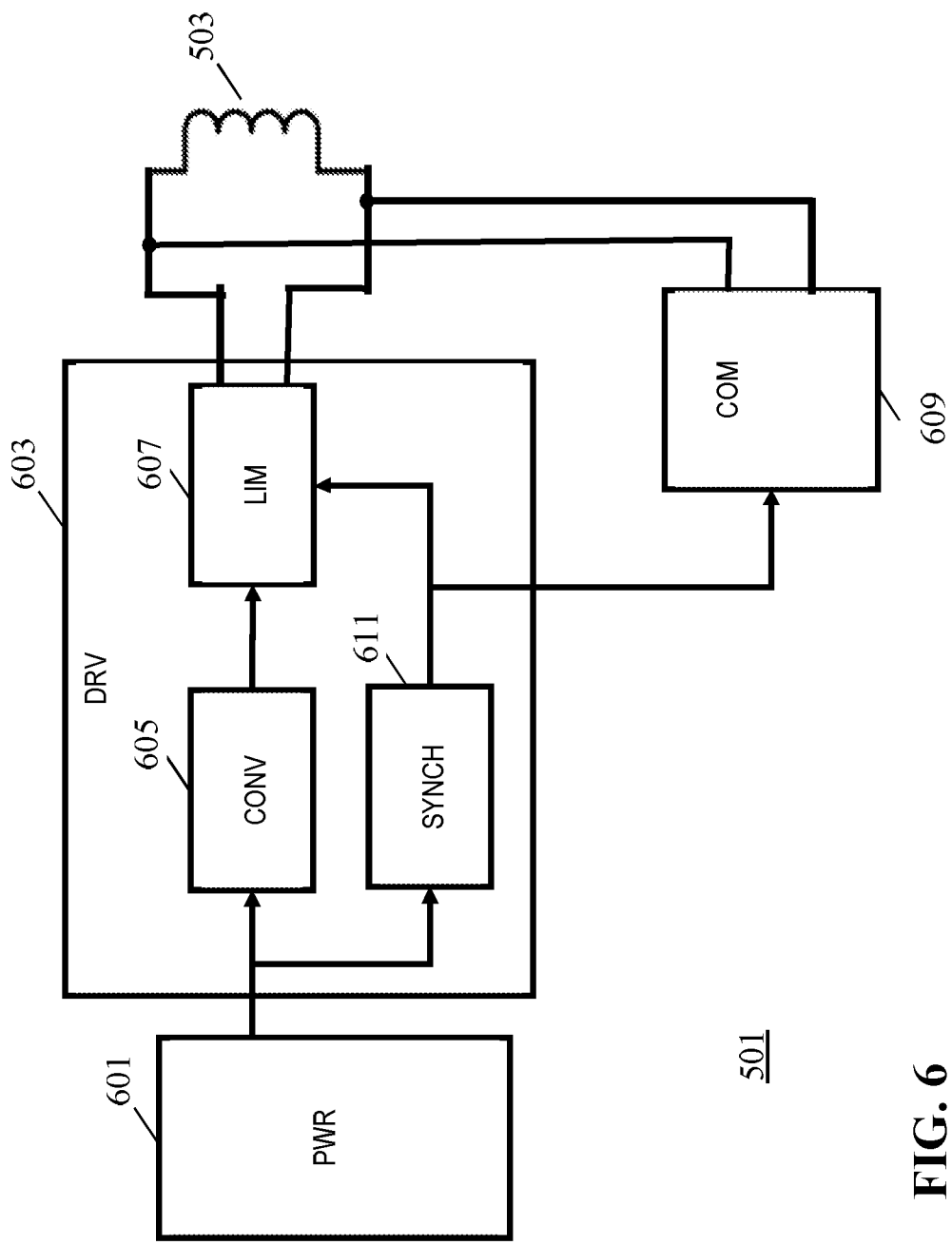
FIG. 6 illustrates an example of elements of a power transmitter in accordance with some embodiments of the invention.

FIG. 6 illustrates an example of some elements of the power transmitter 501 of FIG. 5.

The power transmitter 501 comprises a power source 601 which generates a power source signal. The power source 601 is specifically in the example an AC to DC converter which receives an AC signal and generates a DC signal with a varying level.

Figure 1:
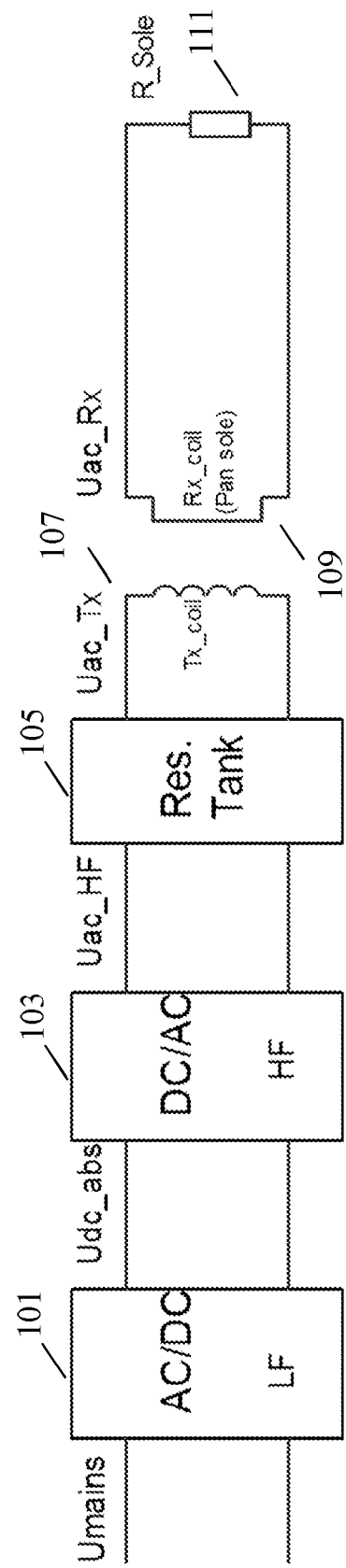
FIG. 1 illustrates an example of a power transfer system in accordance with prior art.
Figure 2:
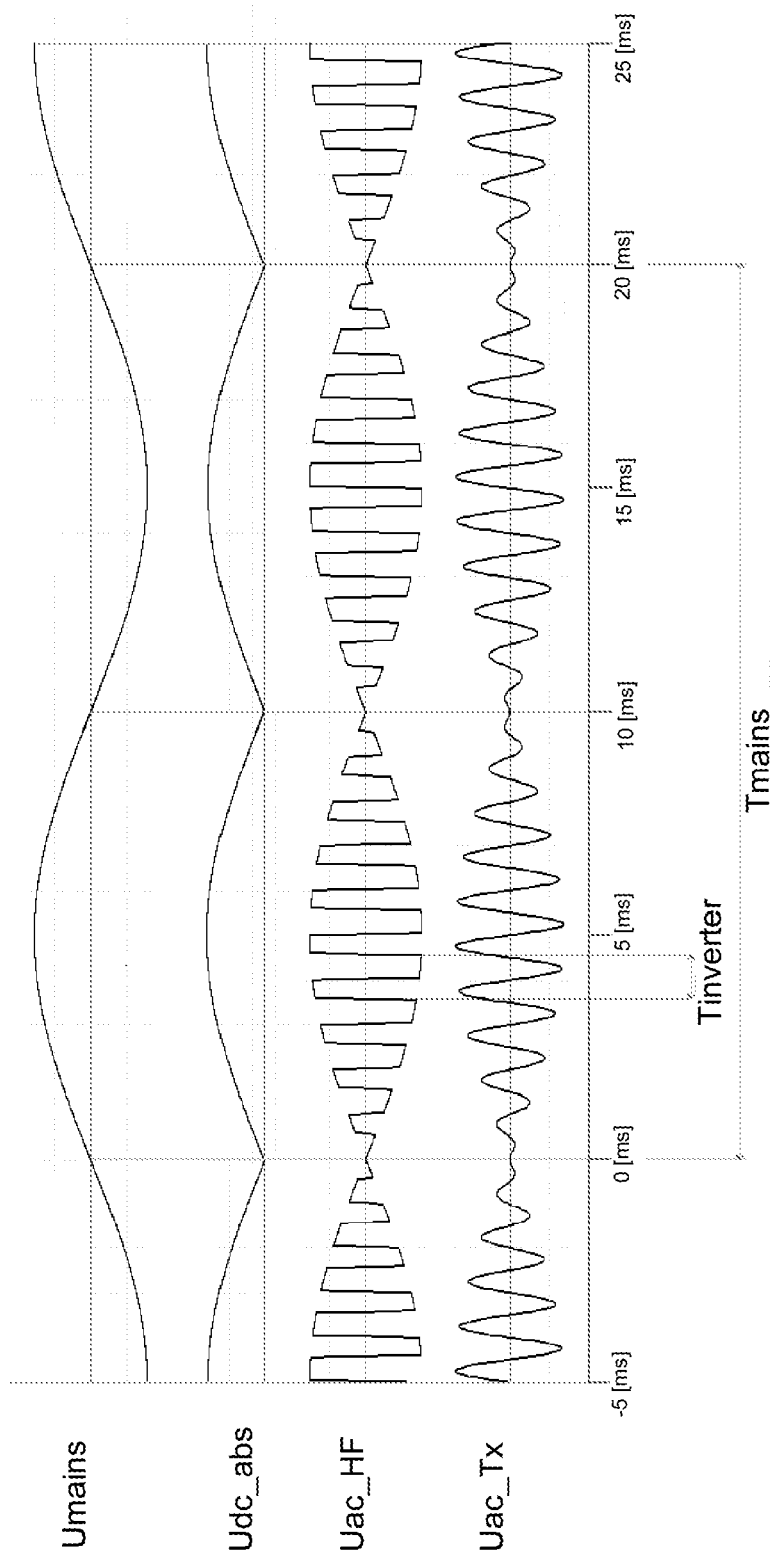
FIG. 2 illustrates an example of some signals of a power transfer system.
Figure 3:
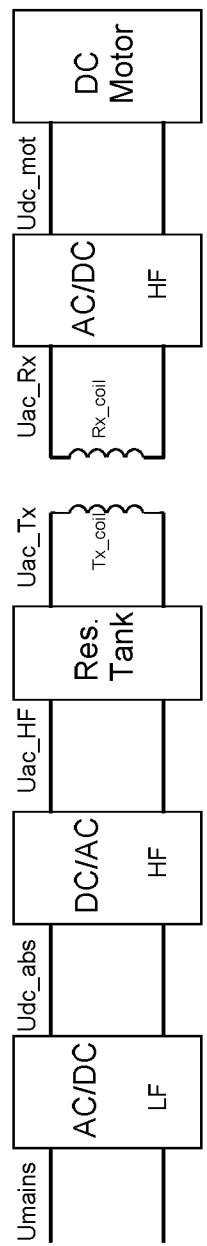
FIG. 3 illustrates an example of a power transfer system in accordance with prior art.

In the specific example, the power source 601 receives a mains derived sine wave signal with a frequency of 50 Hz or 60 Hz. The power source 601 performs a full wave rectification of the sine wave signal. Thus a power source signal corresponding to the Udc_abs signal of FIG. 2 is generated.

In the specific example, the power source 601 does not include any smoothing capacitor and thus the power source signal corresponds to a full wave rectified sine wave signal. However, in other embodiments, the power source 601 may comprise a capacitor which smoothes the rectified signal thereby generating a power source signal with less level variation. However, in most embodiments the capacitor may be relatively small resulting in a power source signal with a level that varies substantially, at least for some loads. E.g. in many scenarios, the ripple may be at least 25% or 50% of the full load.

Thus, a DC power source signal is generated which has a varying voltage. The varying voltage is due to the variations of the AC level and thus the DC power source signal is a periodic signal with a period of twice the frequency of the mains, i.e. with a period of 10 msec for a 50 Hz input signal.

The power source 601 is coupled to a power signal generator 603 which receives the power source signal and which from this generates a drive signal for the inductor 503 which is coupled to the power signal generator 603.

The power signal generator 603 specifically comprises a frequency converter 605 which is arranged to generate the frequency of the drive signal to be higher than the frequency of the power signal. The frequency converter may increase a frequency of the drive signal relative to the power signal. The inductor 503 is driven by a drive signal which has a substantially higher frequency than the frequency of the power source signal. The period of the power source signal is typically no less than 2.5 msec or even 5 msec (corresponding to a frequency of 400 Hz or 200 Hz respectively). However, the drive signal typically has a frequency of at least 20 kHz to 200 kHz. During power transfer intervals, i.e. the intervals between the communication intervals, the drive signal may specifically be given as:

$$d(t)=p(t) \cdot x(t)$$

where p(t) is the power source signal and x(t) is a signal with a higher frequency than p(t), and typically with a much higher frequency (e.g. typically 100 times higher or more). In order to reduce losses, x(t) is typically an AC signal, i.e. it has an average value of zero.

x(t) may for example be a sine wave. However, in the example of FIG. 6, x(t) corresponds to a square wave signal. The frequency conversion is in the example performed by a switching operation rather than by a multiplication. Specifically, the frequency converter 605 comprises a switch circuit to which the power source signal is provided as a supply voltage and which couples to the inductor 503 via switch elements that provides an effect corresponding to the multiplication of the power source signal and a frequency conversion signal x(t).

Figure 7:
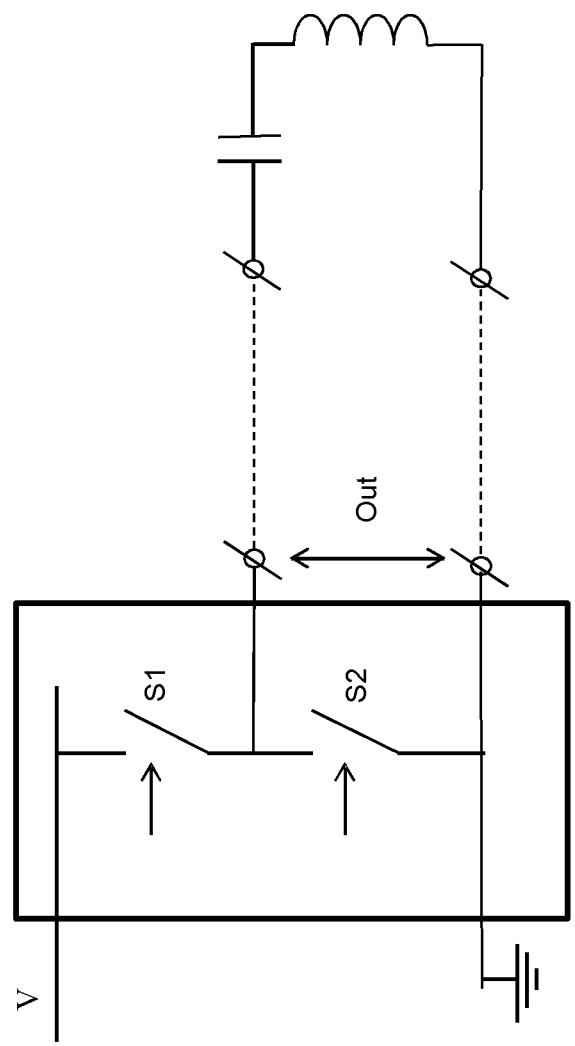
FIG. 7 illustrates an example of an inverter suitable for a power transmitter in accordance with some embodiments of the invention.
Figure 8:
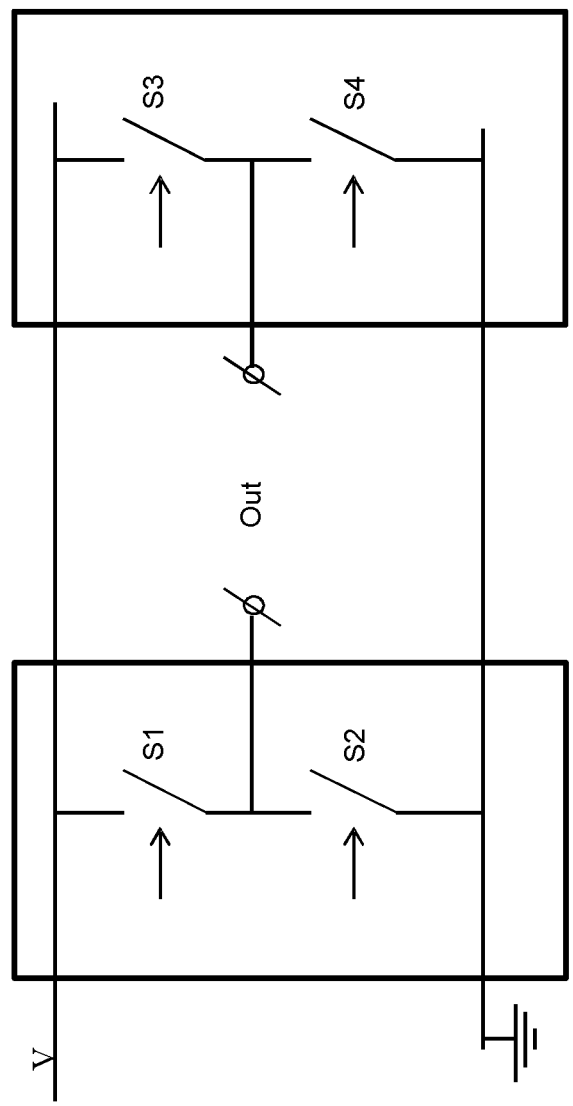
FIG. 8 illustrates an example of an inverter suitable for a power transmitter in accordance with some embodiments of the invention.

In the system of FIG. 6, the frequency converter 605 includes a drive circuit in the form of an inverter which generates an alternating signal from the varying DC Voltage of the power source signal being used as a supply voltage. FIG. 7 shows an example of a half-bridge inverter. The switches S1 and S2 are controlled such that they are never closed at the same time. Alternatingly S1 is closed while S2 is open, and S2 is closed while S1 is open. The switches are opened and closed with the desired frequency, thereby generating an alternating signal at the output. FIG. 8 shows a full-bridge inverter. The switches S1 and S2 are controlled such that they are never closed at the same time. Similarly, the switches S3 and S4 are controlled such that they are never closed at the same time. Alternatingly switches S1 and S4 are closed while S2 and S3 are open, and then S2 and S3 are closed while S1 and S4 are open, thereby creating a square wave signal at the output. The switches are opened and closed with the desired frequency.

In the system of FIG. 6, the signal generated by the frequency converter 605 is not directly fed to the transmitter coil 503. Rather, the signal is fed to a limiter 607 which is arranged to restrict the power of the drive signal that is fed to the inductor such that this power is below a given threshold during the repeating time intervals, i.e. during the communication intervals. The output of the limiter 607 is fed to the transmitter coil 503. Typically this coupling includes a resonant circuit (which may be considered part of the limiter 607).

As a specific example, the limiter 607 may simply restrict the power of the signal being fed to the transmitter coil 503 by disconnecting the transmitter coil 503 from the output of the frequency converter 605. Thus, in the example, the signal from the frequency converter 605 is coupled to the transmitter coil 503 during power transfer intervals which are interrupted by communication intervals in which the signal from the frequency converter 605 is not coupled to the transmitter coil 503.

The limiter 607 may also be an intrinsic part of the inverter. As a specific example, the switches in a full bridge inverter, which are normally switched with a phase difference, meaning that at least part of the time the switches S1 and S4 are closed while S2 and S3 are open and vice versa, generation of the square wave can be stopped by the switching without phase difference meaning that switches S1 and S3 are closed while S2 and S4 are open and vice versa. In general, the strength of power signal can be controlled by the phase in the full bridge. The more the switches are in phase the lower the amplitude of the power signal, the more the switches are out-of phase, the higher the amplitude of the power signal.

Figure 4:
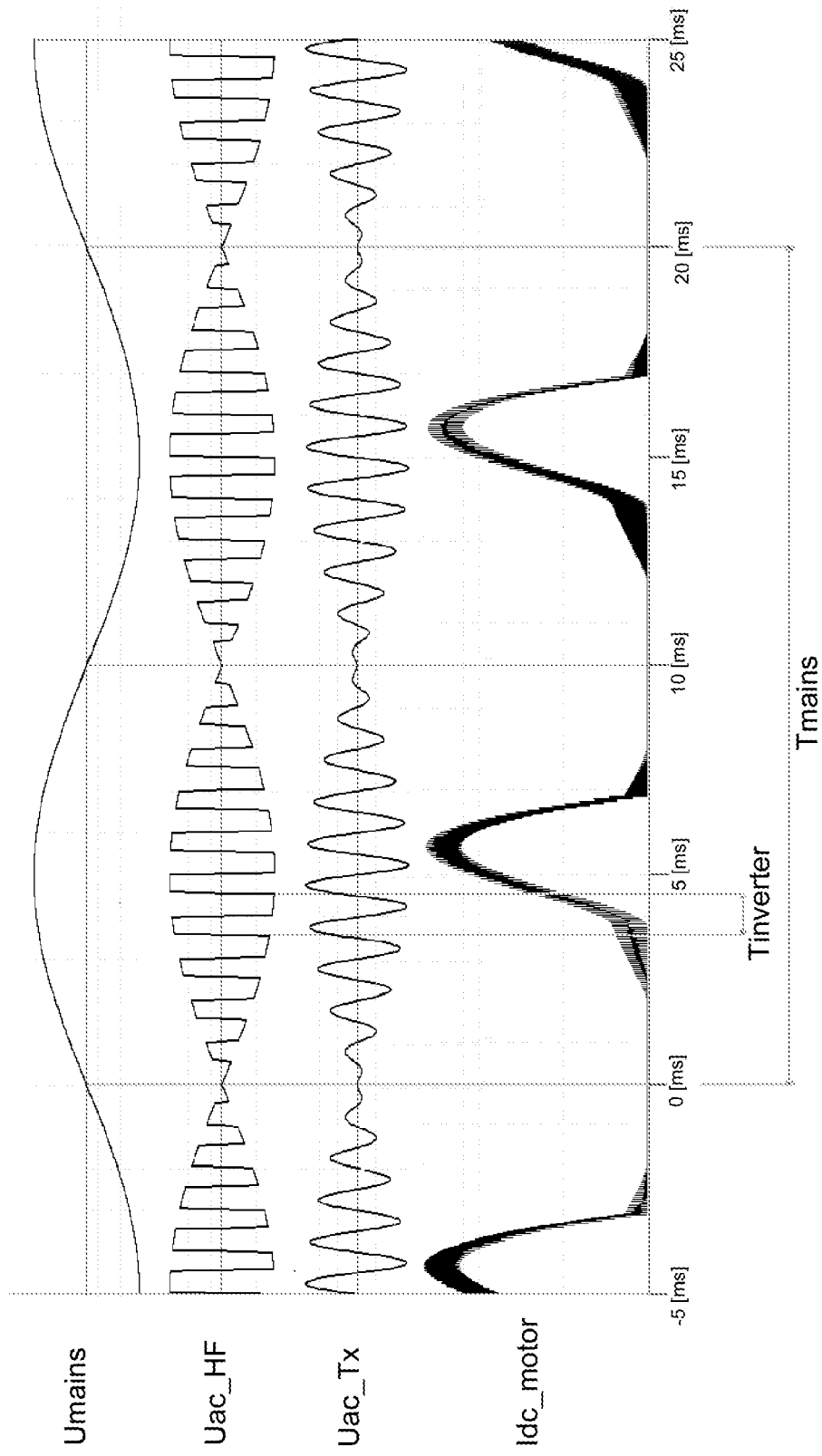
FIG. 4 illustrates an example of some signals of a power transfer system.
Figure 9:
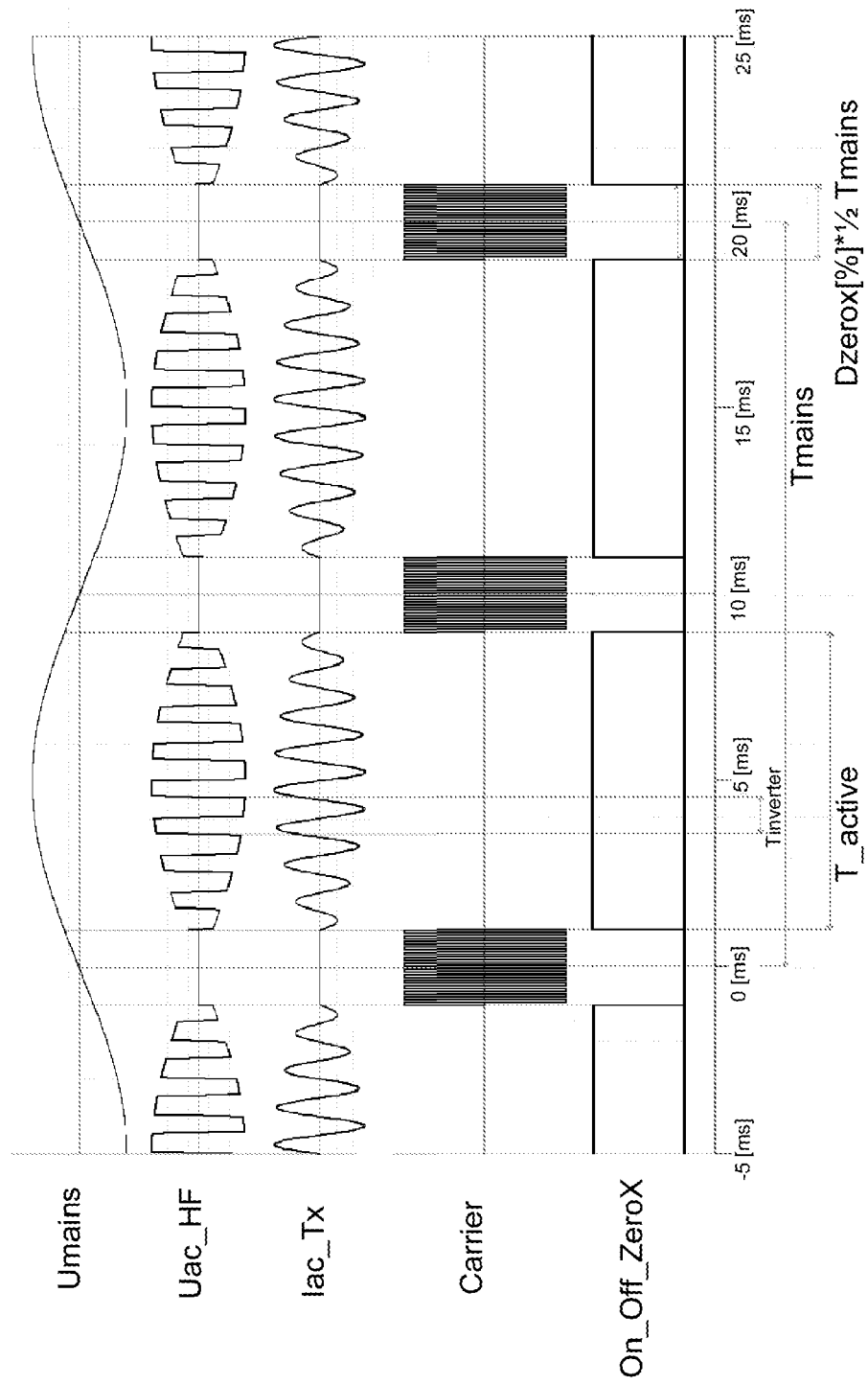
FIG. 9 illustrates an example of some signals of a power transfer system in accordance with some embodiments of the invention.

FIG. 9 illustrates an example of the signals that may occur in the power transmitter 501 of FIG. 6. The figure first shows the signal Umains which is the mains signal fed to the power source. This signal is full wave rectified to generate a signal level varying power source signal corresponding to Udc_abs as shown in FIG. 2. The frequency converter 605 then converts this to a high frequency signal corresponding to Uac_HF of FIGS. 2 and 4. However, rather than just feeding this signal to the transmitter coil 503/resonant circuit, the signal is gated (i.e. connected and disconnected) in accordance with the gate signal On_Off_ZeroX signal of FIG. 9. When this gate signal has a high value, the power transfer signal generated by the frequency converter 605 is coupled to the transmitter coil 503/resonant circuit and when this gate signal has a low value, the power transfer signal generated by the frequency converter 605 is not coupled to the transmitter coil 503/resonant circuit. Thus the resulting signal after gating is shown as Uac_HF of FIG. 9 which after smoothing by the resonant circuit becomes signal Uac_Tx of FIG. 9. Thus, the power transfer signal fed to the transmitter coil 503 corresponds to the signal Uac_Tx of FIG. 9 in this specific example.

As an example, the limiter 607 may be incorporated with the half or full bridge inverter. When the gate signal On_Off_ZeroX signal has a low value, all the switches of the half or full bridge inverter can be switched into the non-conducting state, making the power signal not coupled to the transmitter coil The gating signal thus defines power transfer intervals in which the power transfer drive signal is fed to the transmitter coil 503. These power transfer intervals are interrupted by repeating time intervals in which the power transfer signal is not fed to the transmitter coil 503. In the system of FIG. 6, these repeating time intervals are instead used for communication between the power transmitter 501 and the power receiver 505, i.e. they are used as communication intervals.

Specifically, the power transmitter 501 comprises a transmitter communication unit 609 which is arranged to communicate with the power receiver 505 during the communication intervals.

The communication may specifically be achieved by a carrier being generated during the communication intervals, e.g. a carrier corresponding to the signal denoted Carrier in FIG. 9 may be generated, and this carrier can then be modulated to communicate data. The carrier can be generated by the power transmitter 501 or by the power receiver 505. Similarly, modulation of the carrier may be by the device generating the carrier (e.g. by amplitude modulating the carrier) or by the complementary device (typically by load modulation).

The power transmitter 501 additionally comprises a synchronizer 611 which is arranged for synchronizing the repeating time intervals to the power source signal. Specifically, the synchronizer 611 is arranged to control the timing of the repeating time intervals in dependence on variations in the power source signal. For example, the synchronizer 611 may be arranged to isolate an AC component from the power source signal and to synchronize the repeating time intervals to periodic variations in the AC component.

The synchronization of the repeating time intervals to the power source signal may allow the impact on the power transfer of introducing dedicated time intervals for communication to be minimized. For example, the timing of the repeating time intervals may be selected to coincide with intervals wherein the power of the power signal is at the lowest. It may also in many scenarios facilitate the synchronization between the power transmitter and the power receiver as the power signal typically comprises signal components that are dependent on the power source signal, and which accordingly reflect the variations in the power source signal. Therefore, the power receiver may be able to synchronize to the variations in the power signal, and this synchronization may inherently also synchronize the power receiver to the variations in the power source signal. Thus, a common synchronization can be achieved without requiring dedicated synchronization information to be exchanged, and thus can be achieved with a reduced overhead.

Figure 10:
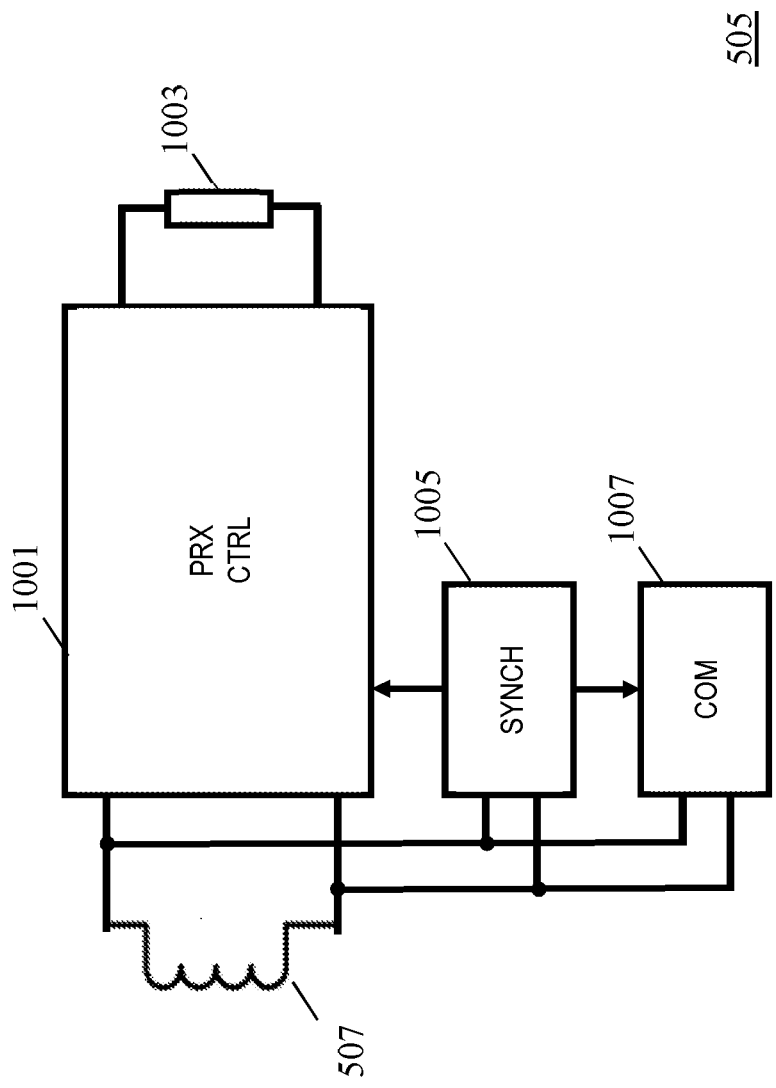
FIG. 10 illustrates an example of elements of a power receiver in accordance with some embodiments of the invention.

FIG. 10 illustrates the power receiver 505 of FIG. 5 in more detail.

The receiver coil 507 is coupled to a power receiver controller 1001 which comprises various functionality for operating the power transfer function, and is in the specific example arranged to operate the power receiver 505 in accordance with the Qi standard. For example, the power receiver 505 may be arranged to perform the Identification and Configuration as well as the power transfer phases of the Qi standard.

The power receiver controller 1001 is arranged to receive the power signal and to extract the power during the power transfer intervals. The power receiver controller 1001 is coupled to a power load 1003 which is the load powered from the power transmitter 1001 during the power transfer phase. The power load 1003 may be an external power load but at least part of it is often a loading by the power receiver device itself, such as e.g. by a battery, display or other functionality of the power receiver (e.g. for a smart phone the power load may correspond to the combined functionality of the smart phone).

The power receiver controller 1001 furthermore comprises functionality for coupling and decoupling the power signal received from the inductor 507 to the load. Specifically, during the power transfer intervals, the power receiver controller 1001 couples the power signal to the load (possibly via intervening circuitry). However, during the communication intervals the power receiver controller 1001 decouples the inductor from the load 1003. Thus, during the communication intervals, the load 1003 does not have any impact on the receiver coil 507 loading, and thus has no impact on the wireless inductive signal.

In some embodiments, the power signal may be used to directly feed the load, e.g. a signal corresponding to Uac_Tx of FIG. 9 may be fed to the load 1003. This may for example be suitable for applications wherein the load is a heating element. However, in many embodiments, the load 1003 may desire a stable and substantially constant DC voltage. In such a case, the power receiver controller 1001 may comprise a rectifier, a smoothing/ripple capacitor and a voltage regulator. The power signal may be fed as the input to this functionality, and the coupling and decoupling may be arranged to connect/disconnect the inductor 507 from this circuitry. The smoothing/ripple capacitor may in such embodiments provide the energy to the load during the communication intervals.

In many embodiments, the load may be coupled and decoupled from the receiver coil 507 via a switching element such as a FET or a relay.

In other embodiments, such as e.g. for motor appliances, the load may be coupled and decoupled via the rectifier due to the characteristic behavior of the motor load. When the power signal is reduced due to the power limiter of the power transmitter, or due to the zero crossings of the mains signal of the power transmitter, the rotation voltage of the motor may be larger than the rectified voltage. This will cause as an effect, a disconnection of the load during the time interval in which the power signal is restricted.

This also happens if the power receiver controller 1001 comprises a rectifier and a smoothing/ripple capacitor with a certain load. If the voltage across the smoothing/ripple capacitor is larger than the rectified voltage, it causes the effect of a disconnection of the load during the time interval in which the power signal is restricted.

The power receiver 505 furthermore comprises a synchronizer 1005 which in the example of FIG. 10 is coupled directly to the receiver coil 507. The synchronizer 1005 is arranged to synchronize the repeating time intervals to an amplitude variation of the power signal. The synchronizer 1005 is arranged to generate a synchronization signal which indicates when the communication intervals occur. Thus, ideally, the synchronizer 1005 may generate a synchronization signal which corresponds to the gate signal On_Off_ZeroX of FIG. 9.

The synchronizer 1005 is coupled to the power receiver controller 1001 which is fed by the synchronization signal. The power receiver 505 can then use the synchronization signal to control the coupling and decoupling of the load 1003 to the receiver coil 507, i.e. the synchronization signal may be used directly as a gate signal for the switch element. The power receiver 505 further comprises a receiver communication unit 1007 which is arranged to communicate with the power transmitter 501 during the communication intervals.

As previously mentioned, the communication may specifically be achieved by a carrier being generated during the communication intervals, e.g. a carrier corresponding to the signal denoted Carrier in FIG. 9 may be generated, and this carrier can then be modulated to communicate data. The carrier can be generated by the power transmitter 501 or by the power receiver 505. Similarly, modulation of the carrier may be by the device generating the carrier (e.g. by amplitude modulating the carrier) or by the complementary device (typically by load modulation).

The system of FIG. 5 thus divides the operation into power transfer intervals and communication intervals. During the power transfer intervals, a power transfer signal is inductively coupled from the power transmitter 501 to the power receiver 505 thereby providing the wireless transfer of power. In some embodiments, no communication takes place during the power transfer intervals. In other embodiments, some communication may take place during power transfer intervals, e.g. the power transfer signal may be load modulated by the power receiver 505 in accordance with the Qi standard version 1.0 and 1.1.

During the communication intervals, data can be communicated between the power receiver 505 and the power transmitter 501 but with no power transfer being performed. Specifically, the power transfer signal is not fed to the transmitter coil 503 and the power load 1003 is not coupled to the receiver coil 507. Thus, no electromagnetic fields are induced or modified due to the power transfer operation, and therefore a much cleaner electromagnetic environment is created for communicating data by wireless induction. Specifically, no power transfer signals occur at the transmitter coil 503 or receiver coil 507, and thus these coils may specifically be used for communication of data without the power transfer operation degrading the communication performance.

The power transmitter 501 and power receiver 505 may thus apply a cyclically repeated time-slotted frame in which one slot (the communication intervals) is reserved for data communication and a second slot (the power transfer intervals) is reserved for power transfer. This specifically allows the conditions and parameters (e.g. frequency, amplitude, signal shape) for data transfer to be optimized in the data communication slot while the conditions and parameters for power transfer can be optimized in the power transfer slot. Furthermore, the power transfer operation will not degrade the communication.

The communication intervals will typically have relatively short duration compared to the duration of the power transfer intervals in order to reserve more time for the power transfer. Typically, the duration of the communication interval will be less than 10% or even 5% of the total frame given by the duration of a power transfer interval and a communication interval. In many embodiments, the repeating time intervals (the communication intervals) will have a duration of no less than 1 ms and no more than 5 ms. This may in many embodiments provide an advantageous trade-off between communication and power transfer requirements and may specifically provide a suitable communication bandwidth without unduly reducing the power transfer capability of the system.

In the system, the timing of the communication intervals are not random but are synchronized to the level variations of the power source signal. Specifically, the communication intervals are synchronized to the level variations such that they occur when the levels are below a given threshold, and specifically the communication intervals are synchronized such that they occur around minima of the power source signal. The communication intervals can specifically be selected such that they are centered on the time instants corresponding to the minimum values of the power source signal.

In examples such as that of FIG. 9, these minima occur at the times of zero-crossings of the AC signal which is fed to the power source 601. Thus, in the example, the power transmitter 501 may include a zero crossing detector which detects the zero crossings of the input mains (derived) signal. These zero crossings may then be used to adjust the timing of the communication intervals such that these are centered on the zero crossings.

In other embodiments, the power signal generator 603 may e.g. time the communication intervals to occur at minima which do not coincide with the zero crossings of the AC input signal. For example, if the power source 601 comprises a smoothing capacitor which results in a power source signal which is smoothed but still has a very high ripple, the minima will no longer coincide with the zero crossings. In this case, these minima may be detected directly in the power source signal and used to time the communication intervals.

In many embodiments, the synchronizer 611 may be arranged to directly synchronize to the power source signal by detecting the changes in the power source signal and adjusting the timing of the repeating time intervals accordingly.

For example, a capacitor may be used to remove the DC component of the power source signal. The resulting AC signal may be filtered to remove or reduce noise while allowing the periodic low frequency variations (typically at 50-60 Hz (or double that for full wave rectification)) to remain. The resulting AC signal may e.g. be provided to a Schmitt trigger to generate a square wave signal with binary values. This signal may be input to a phase locked loop which synchronizes an output signal to the input square wave signal. The output signal may be generated to have a desired duty cycle and possibly with a desired time offset relative to the transitions in the input square wave signal. The output signal from the phase locked loop may then be used directly to control the limiter 607 and the communication unit 609.

The synchronizer 611 may specifically be arranged to synchronize the repeating time intervals to the ripple of the power source signal. For example, the power source signal may be generated by a (full wave) rectification of an AC signal followed by smoothing using a capacitor as a temporary energy reservoir. Depending on the size of the capacitor and the power drawn, the resulting power source signal may be a DC signal with possibly an approximately constant voltage. However, even in this case, some variation due to the variations in the input AC signal will typically be present. Such a variation is known as a ripple voltage (or more generally the periodic variation may be considered a ripple voltage), and the synchronizer 611 may synchronize the repeating time intervals to the ripple variations. For example, the approach described in the previous paragraph may be used, e.g. combined with a suitable amplification of the ripple AC signal prior to the Schmitt trigger.

In some embodiments, the synchronizer 611 may not directly synchronize the repeating time intervals to the power source signal by evaluating the power source signal itself but may instead base the synchronization on a signal which itself is synchronized to the power source signal, and specifically on a signal which is derived from the power source signal or from which the power source signal is derived.

Specifically, the synchronizer 611 may synchronize the repeating time intervals to the AC power signal which by the power source 601 is converted into a varying DC signal (e.g. as a rectified and possibly smoothed signal). E.g., the AC input signal may be fed directly to the synchronizer 611 which may include a zero crossing detector. The timings of the repeating time intervals may then be synchronized to the timing of these zero crossings.

It will be appreciated that the synchronizer 1005 of the power receiver 505 may use any suitable approach for synchronizing to the communication intervals introduced by the power transmitter 501. For example, if the power transmitter 501 does not introduce a carrier, the signal induced by the power transmitter 501 may have a characteristic corresponding to that of the signal Uac_Tx of FIG. 9. The synchronizer 1005 can then proceed to detect the time intervals in which the induced power signal is zero, and can then synchronize to these detections. If the power transmitter 501 generates a carrier signal in the communication intervals, the synchronizer 1005 may proceed to detect the presence of this carrier signal and synchronize to these detections. The carrier may e.g. be separated from the power transfer signal by a difference in levels (or that no change in level occurs for the carrier) or by a difference in frequency e.g. by introducing a frequency selective processing (e.g. by filtering the signal with a band pass filter corresponding to the frequency of the carrier).

The synchronizer 1005 may specifically include an envelope detector which may detect the variations of the amplitude of the received power signal. For example, the envelope of the received power signal may be detected to correspond to the envelope of the signal Uac_Tx of FIG. 9. The envelope (or amplitude) detector may be limited to a suitable frequency range corresponding to the switch frequency of the frequency converter 605. This may e.g. be achieved by the synchronizer 611 itself including a filter or may be achieved by the receive coil 507 being part of a resonance circuit tuned to a frequency close to the switch frequency. In such embodiments, the impact of a carrier during the repeating time intervals may be reduced resulting in the detected envelope more closely corresponding to only the power transfer signal.

The resulting envelope or amplitude signal may then be used by the synchronizer 1005 to determine the local timing of the repeating time intervals. For example, the times at which the amplitude falls below a given threshold may be considered to correspond to the beginning of a new repeating time interval. In many embodiments, the amplitude signal generated by the amplitude detection may be used as a control signal to a timing loop, such as e.g. a phase locked loop. Such an approach may provide increased accuracy and reliability in many scenarios.

Thus, the synchronizer 1005 may synchronize the repeating time intervals of the power receiver to substantially coincide with the repeating time intervals of the power transmitter by detecting amplitude variations in the power source signal. Thus, no additional or dedicated synchronization information or data needs to be exchanged or communicated between the entities.

In the previous examples, the power transfer signal from the frequency converter 605 is only coupled to the transmitter coil 503 during the power transfer intervals. However, it will be appreciated that in other embodiments, the signal may be fed to the transmitter coil 503 also during the communication intervals but with the power of the signal fed to the transmitter coil 503 being restricted by the limiter to be below a given threshold. The threshold may be a fixed and predetermined value, or may e.g. be a variable threshold. For example, the maximum power of the power transfer signal being fed to the transmitter coil 503 during the communication intervals may be adjusted based on the error rate for the communication taking place in the communication intervals. For example, if the error rate increases above a given level, the power threshold is reduced and if the error rate decreases below a given level, the power threshold is increased.

It will also be appreciated that the limiter 607 may use any suitable approach for controlling the power of the signal being fed to the transmitter coil 503 during the communication intervals. For example, the limiter 607 may provide a gain signal which sets the amplitude of the signal generated by the frequency converter 605.

It will also be appreciated that whereas the limiter 607 in the example of FIG. 6 follows the frequency converter 605 and operates directly on the power transfer signal generated by the frequency converter 605, other arrangements may be used in other embodiments. For example, in some embodiments, the limiter 607 may be situated before the frequency converter 605 and may e.g. operate directly on the power source signal. As an example, the power source signal may only be provided to the inverter of the frequency converter 605 during power transfer intervals and may be disconnected from this during communication intervals.

In some embodiments, the communication during the communication intervals is performed using a carrier signal which is generated by the power transmitter 501, and specifically by the transmitter communication unit 609. Thus, in these examples, the transmitter communication unit 609 generates a carrier signal and feeds it to the transmitter coil 503 during the communication intervals.

In the example of FIG. 6, the transmitter communication unit 609 directly feeds the signal to the transmitter coil 503, but it will be appreciated that it in other examples this may be via circuitry that is also used for the power transfer signal during power transfer intervals. E.g. an output drive circuit, the inverter and/or the resonance circuit may be reused for the communication carrier signal.

In some embodiments, the transmitter communication unit 609 may furthermore comprise a modulator which is arranged to modulate the carrier signal during the communication intervals. Thus, data to be communicated from the power transmitter 501 to the power receiver 505 can be modulated onto the carrier signal being fed to the transmitter coil 503.

It will be appreciated that any suitable modulation can be used, including for example amplitude modulation, spread spectrum modulation, phase modulation and/or frequency modulation.

In such examples, the receiver communication unit 1007 comprises a demodulator which is capable of demodulating the carrier signal. For example, an AM, FM or PM demodulator may be included.

The approach may provide reliable communication from the power transmitter 501 to the power receiver 505. As the modulated carrier is applied when no power transfer signal is applied (or when the power is sufficiently low), the interference caused by the power transfer can be maintained sufficiently low, or even removed completely in some embodiments/scenarios. Accordingly a very reliable communication can be achieved.

In some embodiments, the carrier generated by the transmitter communication unit 609 may be used for communicating data from the power receiver 505 to the power transmitter 501.

In particular, the transmitter communication unit 609 may apply an unmodulated constant level carrier signal to the transmitter coil 503. The receiver communication unit 1007 may in this example comprise functionality for load modulating the carrier signal.

Specifically, the receiver communication unit 1007 may be arranged to modify a load applied to the receiver coil 507 in accordance with a predetermined pattern that depends on the data being communicated.

Furthermore, the transmitter communication unit 609 may in such an example comprise a demodulator arranged to demodulate the load modulation of the carrier signal introduced by the receiver communication unit 1007.

As the load modulation is performed in the communication intervals where the power transfer signal may not be fed to the transmitter coil 503, a constant carrier signal is applied to the transmitter coil 503. Furthermore, as the power load 1003 is disconnected, the loading of the receiver communication unit 1007 can be completely controlled by the load modulator. Accordingly, the load variations will be relatively easy and reliable to detect by the load demodulation circuit of the transmitter communication unit 609. Thus, a reliable communication of data from the power receiver 505 to the power transmitter 501 can be achieved.

Thus, based on the carrier signal generated and applied to the transmitter coil 503 by the transmitter communication unit 609, efficient communication can be achieved from the power receiver 505 to the power transmitter 501, and indeed from the power transmitter 501 to the power receiver 505. Thus, communication can be achieved from the power transmitter 501 to the power receiver 505 which is not possible in accordance with the current Qi specifications version 1.0 and 1.1.

It will also be appreciated that in some embodiments, the approach can be used to provide bidirectional communication, i.e. both communications from the power transmitter 501 to the power receiver 505 and from the power receiver 505 to the power transmitter 501. This may for example be achieved by alternating between the power transmitter 501 carrier modulation and the power receiver 505 load modulation in subsequent time intervals. As another example, each communication interval may be divided into two sub-intervals with one being used for communication from the power transmitter 501 to the power receiver 505, and the other being used for communication form the power receiver 505 to the power transmitter 501.

In some embodiments, the communication during the communication intervals is performed using a carrier signal which is generated by the power receiver 505, and specifically by the receiver communication unit 1007. Thus, in these examples, the receiver communication unit 1007 generates a carrier signal and feeds it to the receiver coil 507 during the communication intervals. Since there is no power transfer signal being fed to the transmitter coil 503 by the power transmitter 501, there is no conflict between this carrier signal and the power transfer.

In some embodiments, the receiver communication unit 1007 may furthermore comprise a modulator which is arranged to modulate the carrier signal during the communication intervals. Thus, data to be communicated from the power receiver 505 to the power transmitter 501 can be modulated onto the carrier signal being fed to the receiver coil 507.

It will be appreciated that any suitable modulation can be used, including for example amplitude modulation, spread spectrum modulation, phase modulation and/or frequency modulation.

In such examples, the transmitter communication unit 609 comprises a demodulator which is capable of demodulating the carrier signal. For example, an AM, FM or PM demodulator may be included.

The approach may provide reliable communication from the power receiver 505 to the power transmitter 501. As the modulated carrier is applied when no power transfer signal is applied (or when the power is sufficiently low), the interference caused by the power transfer is sufficiently low or even absent in many scenarios. Accordingly a very reliable communication can be achieved.

In some embodiments, the carrier generated by the receiver communication unit 1007 may be used for communicating data from the power transmitter 501 to the power receiver 505.

In particular, the receiver communication unit 1007 may apply an unmodulated constant level carrier signal to the receiver coil 507. The transmitter communication unit 609 may in this example comprise functionality for load modulating the carrier signal.

Specifically, the transmitter communication unit 609 may be arranged to modify a load applied to the transmitter coil 503 in accordance with a predetermined pattern that depends on the data being communicated.

Furthermore, the receiver communication unit 1007 comprises a demodulator arranged to demodulate the load modulation of the carrier signal introduced by the transmitter communication unit 609.

In the example, a constant carrier signal is fed to the transmitter coil 503. Furthermore, as the power load 1003 is disconnected, the loading of the receiver communication unit 1007 does not interfere with the load modulation by the transmitter communication unit 609. Accordingly, the load variations will be relatively easy and reliable to detect by the load demodulation circuit of the receiver communication unit 1007. Thus, a reliable communication of data from the power transmitter 501 to the power receiver 505 can be achieved.

Thus, based on the carrier signal generated and applied to the receiver coil 507 by the receiver communication unit 1007, efficient communication can be achieved from the power receiver 505 to the power transmitter 501, and indeed from the power transmitter 501 to the power receiver 505. Thus, communication can be achieved from the power transmitter 501 to the power receiver 505 which is not possible in accordance with the current Qi specifications version 1.0 and 1.1.

It will also be appreciated that in some embodiments, the approach can be used to provide bidirectional communication, i.e. both communications from the power transmitter 501 to the power receiver 505 and from the power receiver 505 to the power transmitter 501. This may for example be achieved by alternating between the power receiver carrier modulation and the power transmitter load modulation in subsequent time intervals. As another example, each communication interval may be divided into two sub-intervals with one being used for communication from the power transmitter 501 to the power receiver 505, and another being used for communication form the power receiver 505 to the power transmitter 501.

In the described setups, the characteristics of the power transfer signal and the communication carrier signal can independently be optimized for their individual purpose, i.e. for power transfer and for communication respectively. For example, the power level of the power transfer signal may be adapted to provide the desired power transfer to the power receiver 505, i.e. it may be adapted depending on the power load 1003. At the same time, the amplitude of the communication carrier may be kept constant, e.g. at a predetermined level.

In particular, the frequency may be selected differently for the power transfer signal and the communication carrier. In particular, the carrier signal may be set to have a significantly higher frequency to better support modulation, especially for higher data rates. Furthermore, separating the power transfer signal and the communication carrier in frequency as well as in time may provide reduced impact of one operation on the other and may facilitate implementation. For example, communication circuitry of the receiver communication unit 1007 may be isolated from the power transfer signal during the power transfer intervals using a filter with a bandwidth centered on the frequency of the communication carrier. The carrier frequency may for example be no less than twice, or even five times, higher than the frequency of the power transfer signal.

Figure 11:
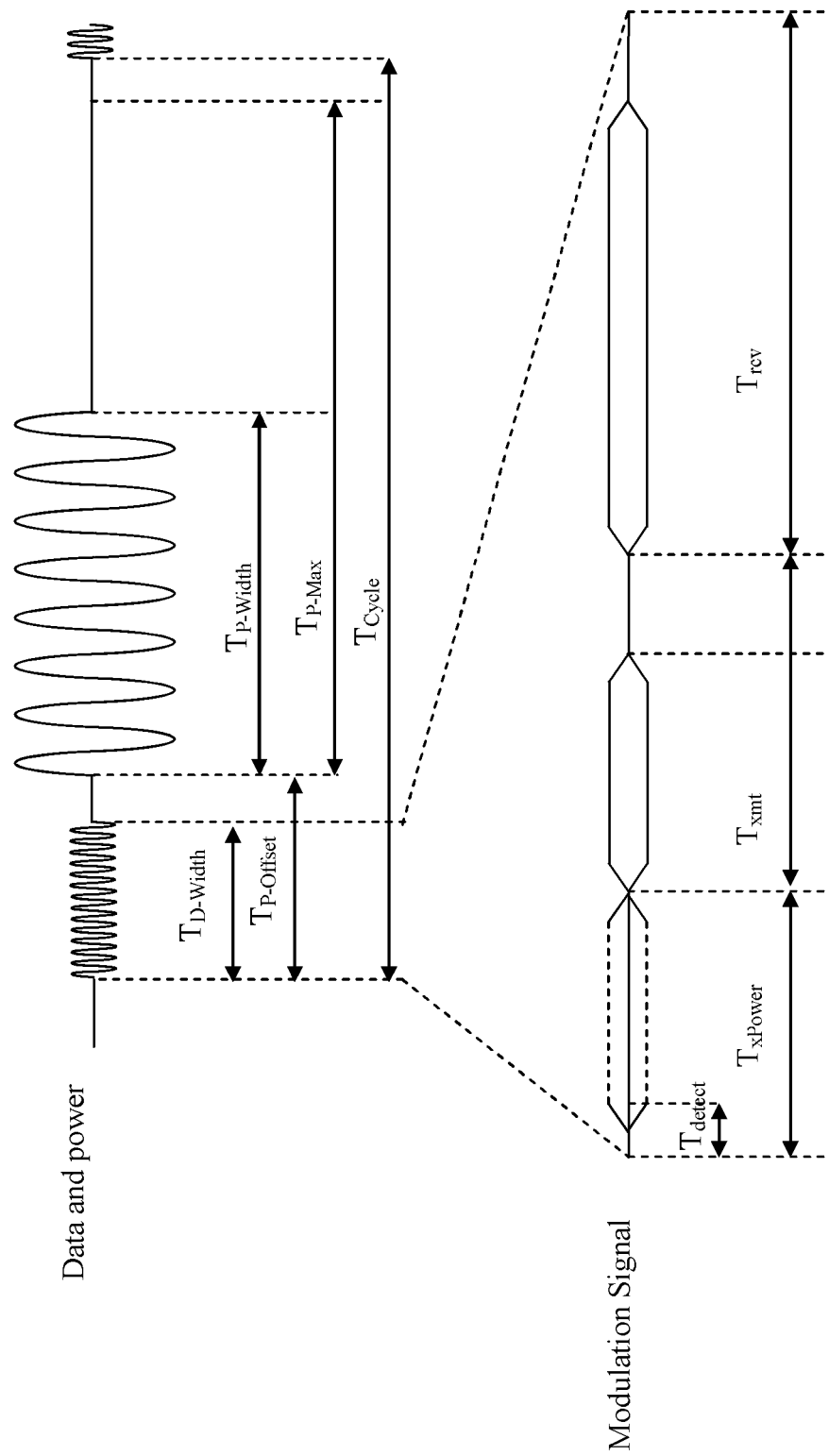
FIG. 11 illustrates an example of a time slot frame suitable for a power transfer system in accordance with some embodiments of the invention.

The described approaches may thus alternate between power transfer and communication during a frame. As an example, FIG. 11 illustrates a slotted frame which is divided into two main slots: the communication slot and the power transfer slot. In the example, the data communication slot indicates the beginning of the frame. The power transfer slot is positioned after the communication slot at an offset ($T_{P\text{-}Offset}$) from the beginning of the frame.

In the example, the data communication ($T_{D\text{-}Width}$) in the frame ends before the power transfer starts ($T_{D\text{-}Width} < T_{P\text{-}Offset}$).

The data communication slot is relative small and occupies a small part (e.g. 5%) of the cycle in order to leave a large part of the cycle for power transfer ($T_{P\text{-}Max}$). Some spare time is reserved in the frame to tolerate deviations ($T_{P\text{-}Max} + T_{P\text{-}Offset} < T_{Cycle}$).

The cycle time ($T_{Cycle}$), the offset time preceding the power transfer slot ($T_{P\text{-}Offset}$) and the maximum power transfer time ($T_{P\text{-}Max}$) might be fixed for all operational modes, e.g. for reasons of safety and reliability, robustness, uniformity, etc.

A transmitter periodically ($T_{Cycle}$) provides this frame to a receiver to allow for data communication and power transfer. The transmitter can modify the slots in the frame according to its operation mode.

The communication slot can in some embodiments be sub-divided into three sub-slots:

1. Power ($T_{xPower}$) which contains a smaller sub-section dedicated for detection of the power receiver.
2. Data transmission ($T_{xmt}$)
3. Data reception ($T_{rcv}$)

As a specific example, at the beginning of every cycle, the transmitter provides a low-power signal on which no data is modulated. If a power receiver is positioned near enough to the power transmitter, it will react to this signal, by providing a detectable (and recognizable) load of the signal. If the transmitter detects the reaction of a receiver within a certain time ($T_{detect}$), it will continue to provide this signal for a longer period of time (during $T_{xPower}$). If needed, the (detected) receiver can use this signal to power-up its electronics. Depending on the power levels used, the detection may take a few hundreds of microseconds (e.g. 0.2 ms) and the power-up action may take a few milliseconds (say 10 ms).

Immediately after this, the transmitter can send a (beacon) message to the receiver using e.g. amplitude modulation of the transmitted field ($T_{xmt}$). In reaction to the signal received from the transmitter, the receiver can sends a message back to the transmitter using load modulation (during $T_{rcv}$). Thus, bidirectional communication can be achieved.

The actual power signal width ($T_{P\_Width}$) may be smaller than the maximum ($T_{p\_Max}$). The transmitter can use pulse width modulation (PWM) to control the amount of power it provides to the receiver.

In the previous examples, the power transfer and the communication were both performed using the transmitter coil 503 and the receiver coil 507, i.e. the power transfer coils were also used for communication. However, in other embodiments, separate inductors/coils may be used for communication during the communication intervals. Thus, in some embodiments, the power transmitter 501 may comprise a communication inductor in addition to the transmitter coil 503, and the power receiver 505 may similarly comprise a communication inductor in addition to the receiver coil 507. Such an approach may allow the individual optimization of the inductors for their specific purpose. E.g. the carrier signal may have a higher frequency than the power transfer signal, and the communication inductors can be tuned to this higher frequency while still allowing the power transfer signals to be tuned to the power transfer signal frequency.

Also, the approach may in some embodiments add some spatial separation between the power transfer coils and the communication coils. However, typically these will be placed so close together that they will magnetically couple to each other. However, as power transfer and communication typically occur in different intervals, this does not introduce any interference (or at least the interference can be reduced to acceptable levels).

Figure 12:
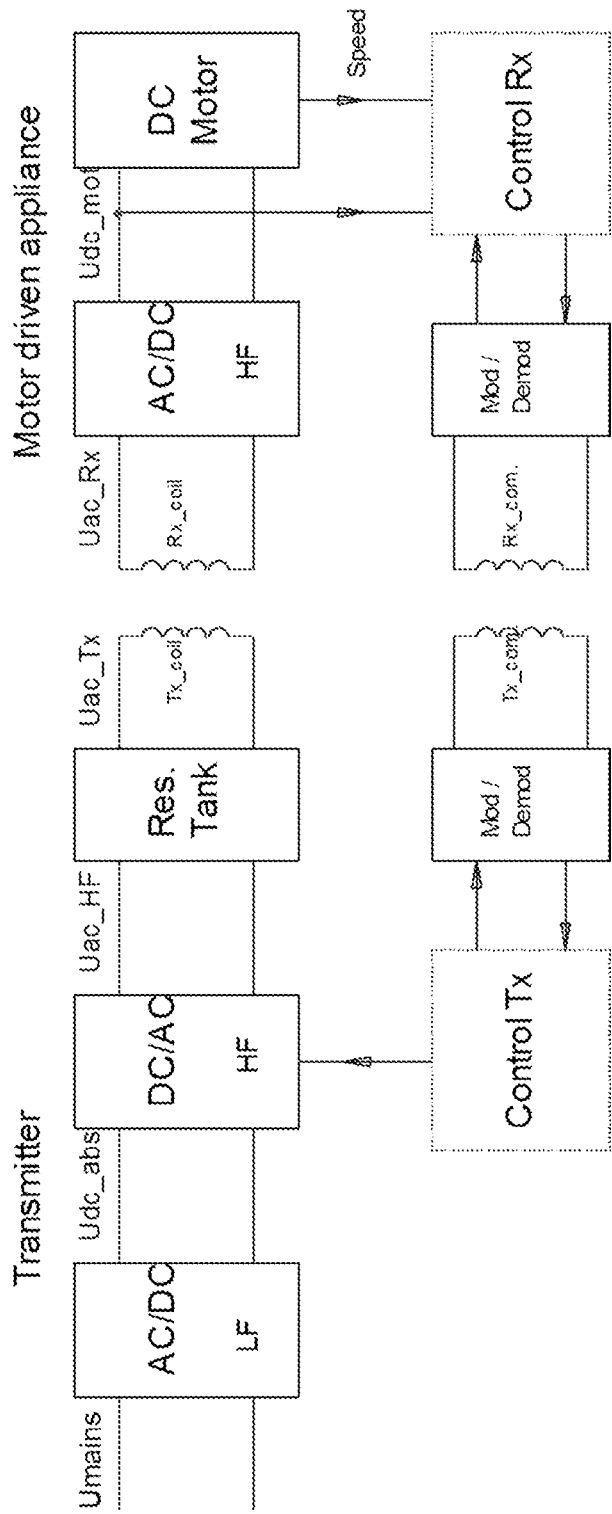
FIG. 12 illustrates an example of some signals of a power transfer system in accordance with some embodiments of the invention.

An example of a power transfer system wherein different inductors/coils are used for respectively the power transfer and the communication is shown in FIG. 12.

In this system, the transformer formed by the primary coil Tx_coil (transmitter side) and secondary coil Rx_coil (receiver) is designed such that the resonant frequency of the system is identical to the frequency of the power transfer signal. However, the data carrier signal and power signal can have different frequencies. Thus, the data carrier signal might not be optimally transmitted between the power coils. In FIG. 12 this is addressed by the addition of auxiliary communication coils Tx_com and Rx_com specially tuned to the data carrier signal frequency. Coils for power transfer and data transfer are thus separated. The advantages of this implementation include:

On the receiver side, the power transfer signal and the communication carrier signal do not share the same physical link. Thus, both communication and power transmission circuits can be independently designed and optimized.

Since the communication and power transmission circuits are galvanically isolated and are tuned to different frequencies, the influence of the large power transfer signal and appliance load variations will be attenuated on the communication channel.

Moreover, since the power level for the communication circuit is expected to be much smaller than the power level of the power transmission circuit, the auxiliary communication coils could be physically much smaller than the power transfer coil. Thus, the communication coil could be implemented in the same plane as the power transfer coil in order to limit the volume of the appliance.

In some cases, the communication coil could also be used to power some of the internal electronics of the appliance. In this case, this coil could also be employed for load modulation. Thus, the load modulation circuitry would be implemented with the circuitry used for powering the internal electronics.

In some embodiments, the system may be arranged to dynamically change a characteristic of the repeating time intervals, such as the exact timing or duration of the repeating time intervals.

In some such embodiments, the setting or change of the characteristic may be initiated by the power receiver rather than the power transmitter.

Specifically, the power receiver may be arrange to transmit request data to the power transmitter where the data can include requests for specific characteristics of the repeating time intervals. For example, the power receiver may transmit a request that the duration of the repeating time intervals should be of a given minimum. Upon receiving the message the power transmitter can proceed to determine the duration of the repeating time intervals. Specifically, it may set the duration of the repeating time intervals to the requested duration if possible, or to the nearest feasible value if the requested value cannot be accommodated (e.g. if this would prevent the power transmitter from providing the desired power transfer level).

The approach may for example allow increased flexibility and ability of the system to adapt to different scenarios. Indeed, some power receivers may be complex devices that require or benefit from a high level of communication interaction with the power transmitter whereas other power receivers may be relatively simple devices which do not support or require significant communication. In such systems, the approach may allow the duration of the repeating time intervals, and thus the resource allocated to communication rather than to power transfer, to be adapted to the specific requirements and preferences of the individual embodiment.

An issue with limiting of power during the repeating time intervals is that it may in many scenarios be desirable to perform the power transition (e.g. the switch off of power) relatively fast but that this be difficult to achieve without introducing undesirable effects. Indeed, in most systems, switching off (or more generally reducing the power level) of the power signal too quickly will often result in oscillations continuing beyond the time of switching off. Indeed, some energy may often be stored in e.g. capacitors or inductive elements, and specifically in tank or resonance circuits formed by the transmit and/or receive coils and associated capacitors. This energy may provide a signal which continues after the power signal has been switched off and may be referred to as ringing.

Figure 13:
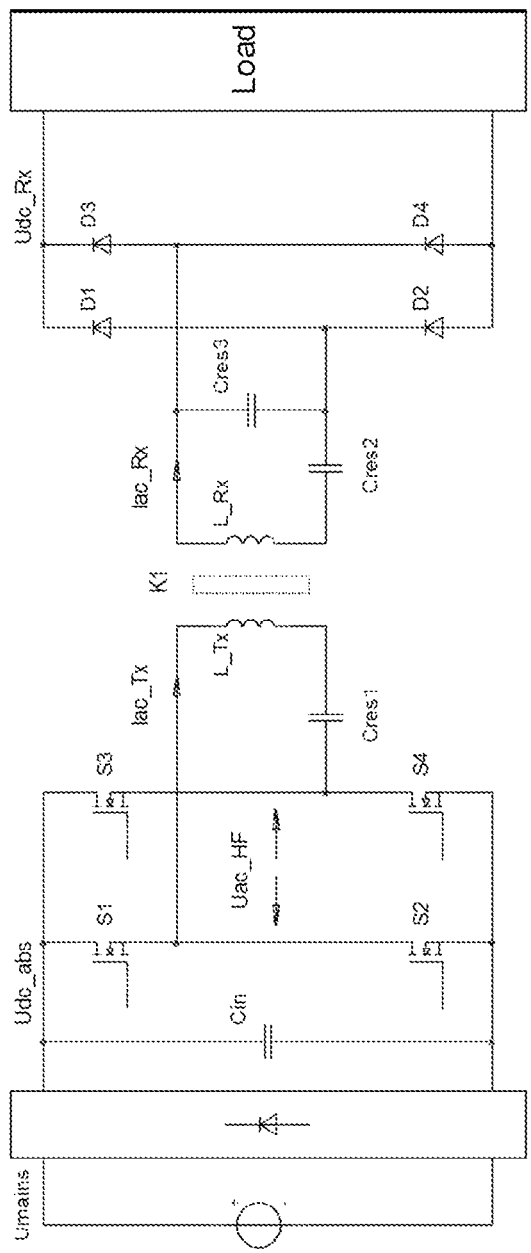
FIG. 13 illustrates an example of elements of a power transfer system in accordance with some embodiments of the invention.

In more detail, FIG. 13 may illustrate a typical power path for a wireless power transfer, e.g. for the power transfer system of FIGS. 5, 6 and 10.

In the example, a DC/AC converter (Inverter) (corresponding to the frequency converter 605 of FIG. 6) is based on a full bridge inverter (such as that of FIG. 8). IGBT's are used for the four switches S1, S2, S3 and S4. Depending on the power rating, the inverter could also be realized e.g. using IGBT's. In the system, a first resonance circuit or resonant tank is formed by capacitor Cres1 and transmitter coil Tx (corresponding to transmit coil 503) A second resonance circuit or resonant tank 2 is formed by the receiver coil Rx (corresponding to receive coil 507) and capacitors Cres2 and Cres3. The rectified voltage Udc_Rx is derived from the AC/DC converter (HF rectifier) which exists of diodes D1, D2, D3 and D4.

Figure 14:
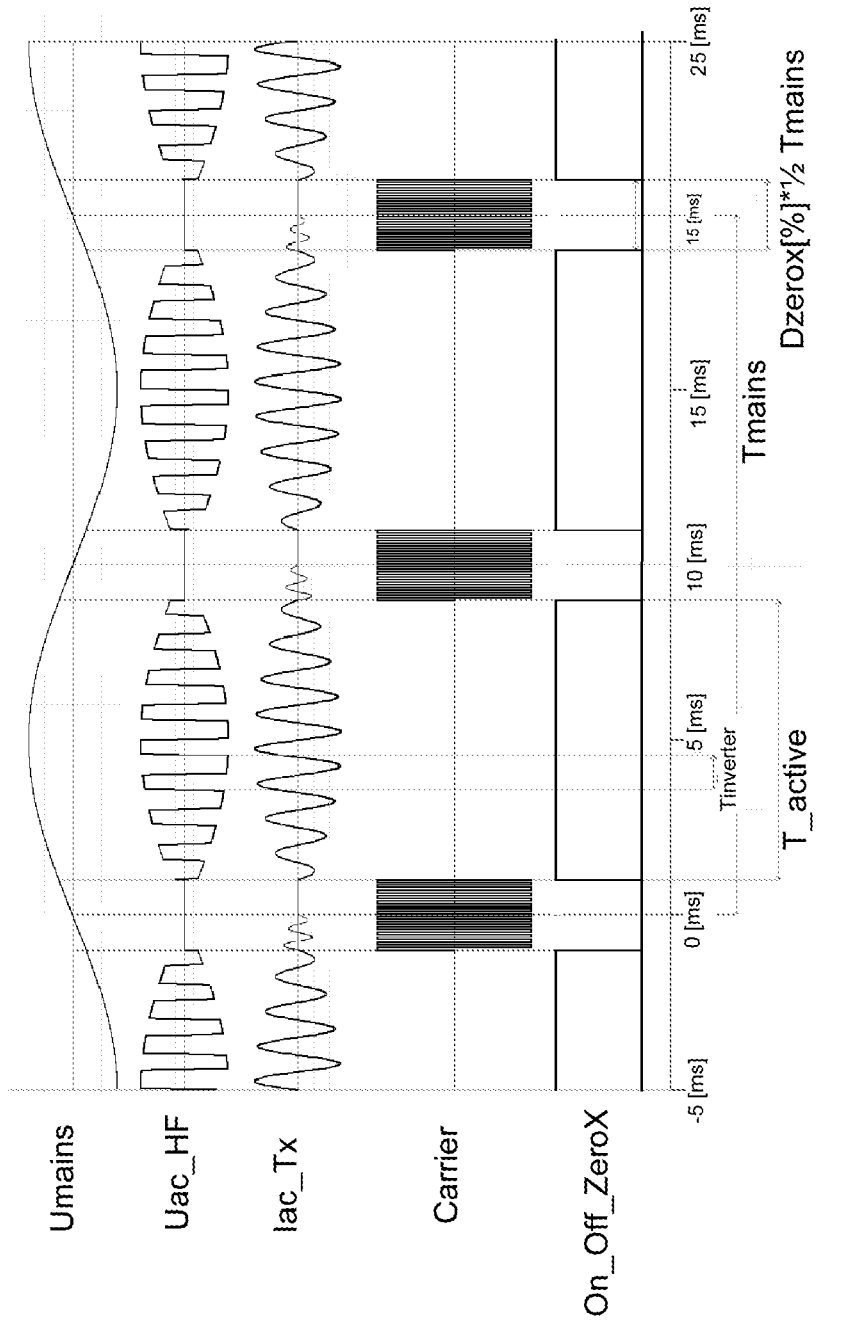
FIG. 14 illustrates an example of some signals of a power transfer system in accordance with some embodiments of the invention.

An example of the signals present in FIG. 13 is provided in FIG. 14. The signals correspond directly to those illustrated in FIG. 9.

Figure 15:
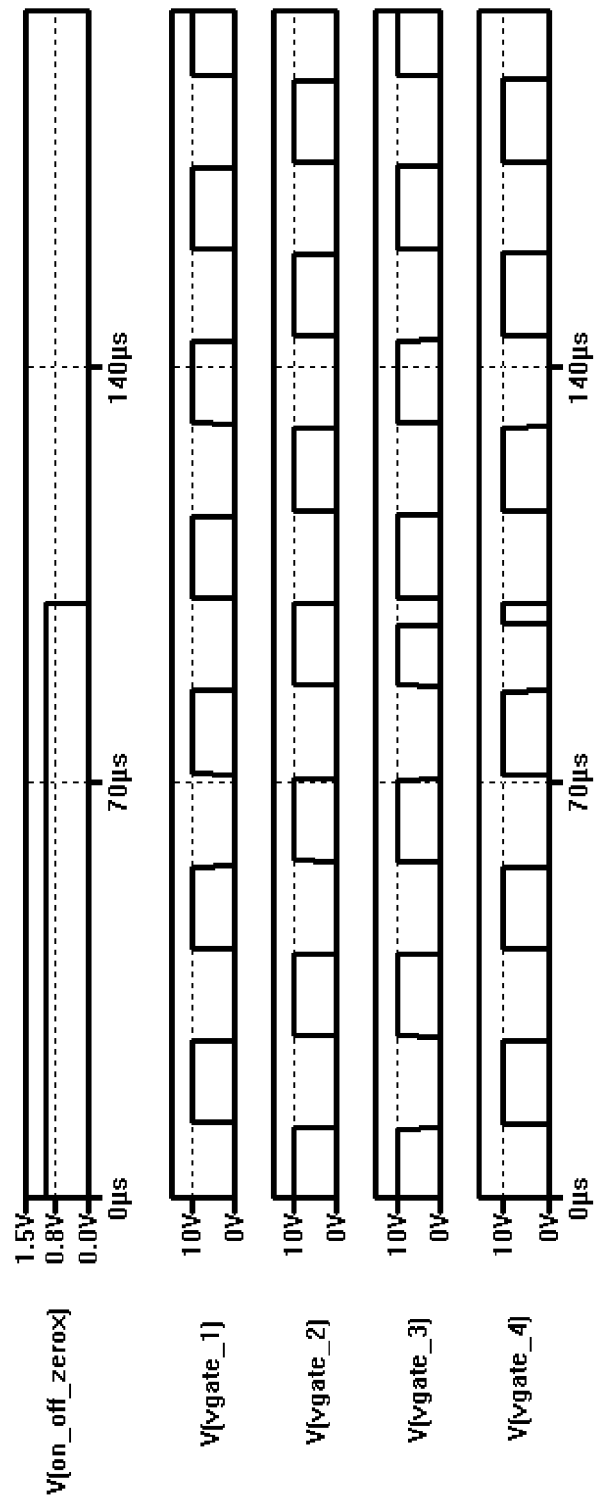
FIG. 15 illustrates an example of some signals of a power transfer system in accordance with some embodiments of the invention.

In the system, the inverter is arranged to inhibit its power transfer around the zero crossings of the input AC voltage in order to provide the repeating time intervals for communication. To inhibit the inverter, the phase between the switch drive signals for the left half side of the bridge (S1 and S2) and the switch drive signals for the right half side of the bridge (S3 and S4) may shifted to zero, i.e. the drive signals may be adjusted in time such that they are synchronous/identical between left half side of the bridge (S1 and S2) and the right half side of the bridge (S3 and S4). The corresponding gate drive signals are shown in FIG. 15. Thus, the inverter switches are changed from being driven in opposite phases thereby creating the high frequency drive signal, to being driven in phase resulting in no output signal (as either both S1 and S3 are simultaneously both on, or S2 and S4 are simultaneously both on).

Specifically, when the On_Off_ZeroX signal is high, the gate drive signals of the switches S1 and S3 are out of phase with each other (corresponding to a power transfer occurring). The same yields for the gate drive signals for the switches S2 and S4. When the On_Off_ZeroX signal is made low, the gate drive signals of the switches S1 and S3 as well as the gate drive signals of switches S2 and S4 are exactly in phase with each other (corresponding to no power transfer occurring).

FIG. 15 illustrates the resulting signals at the power transmitter side if the inverter is inhibited in this way. The voltage Uac_HF immediately drops to zero after the On_Off_ZeroX signal goes "Low". However, this is not the case with the coil current Iac_Tx which continues with some oscillations following the switch-off. Thus, some ringing occurs and it takes some time for the current Iac_Tx to reduce to zero. The reason for this phenomenon is that there is still some energy left in the reactive components inside the resonant tanks. Nevertheless, the 'ringing' time influences the effective width of the time window because the communication between the power receiver and the power transmitter or vice versa will suffer from the interference of the remaining signal.

In some embodiments, the power transmitter or power receiver comprises an attenuator which is arranged to cancel or reduce oscillations in the power path of the power transmitter and power receiver of the wireless power transmission system. These oscillations normally occur after the event of disabling the inverter during power transfer to realize the time window for communication between the power transmitter and power receiver.

In the following, a number of approaches for reducing the ringing time will be described. Due to the electro-magnetic coupling between the transmitter coil Tx and the receiver coil Rx, these means may be implemented at the power transmitter side, at the power receiver side, or at both sides.

The approaches at the power transmitter side may for example include:
  Gradually shifting the phase difference between drive signals of the inverter switches to zero before the communication slot
  Switching off all switches of the inverter
  Resistive shorting of the terminals of the transmitter coil Tx
  Resistive shorting of the transmitter coil L_Tx, using a separate coupled coil L_Taux
  Resistive shorting of the transmitter coil L_Tx, using the communication coil L_Tcom
  Ringing reduction means at the receiver side may for example include:
  Resistive shorting of the terminals of the receiver coil L_Rx by means of switches
  Resistive shorting of the terminals of the HF rectifier, by means of switches
  Resistive shorting of the terminals of capacitor Cres2 by means of switches
  Resistive shorting of the receiver coil L_Tx, using a separate coupled coil L_Raux
  Resistive shorting of the receiver coil L_Rx, using the existing communication coil L_Rcom.

In some embodiments, the frequency controller 605 is arranged to gradually restrict the power of the drive signal, e.g. by gradually reducing the power of the power source signal or by gradually modifying the phase relationship to an inverter. The restriction may for example be no less than 200 µs, or no less than 5% of the duration of the repeating time interval.

As a specific example, the power transmitter may be arranged to gradually shift the phase between the drive signals for the inverter switch transistors. This may effectively cause the inverter output voltage Uac_HF gradually from the initial value to zero before the communication window starts.

Specifically, in some embodiments, the frequency converter 605 may comprise a switch bridge for generating the drive signal, and the limiter may be arranged to restrict the power signal by changing a relative phase of switch elements of the switch bridge. At the onset of a repeating time interval, the phase may be gradually shifted (e.g. with a transition duration of no less than 200 µs, or no less than 5% of the duration of the repeating time interval). Depending on the configuration of the switch elements, the phase may e.g. be from the switch signals for two sets of switch elements being in phase to not being in phase (or vice versa).

Figure 16:
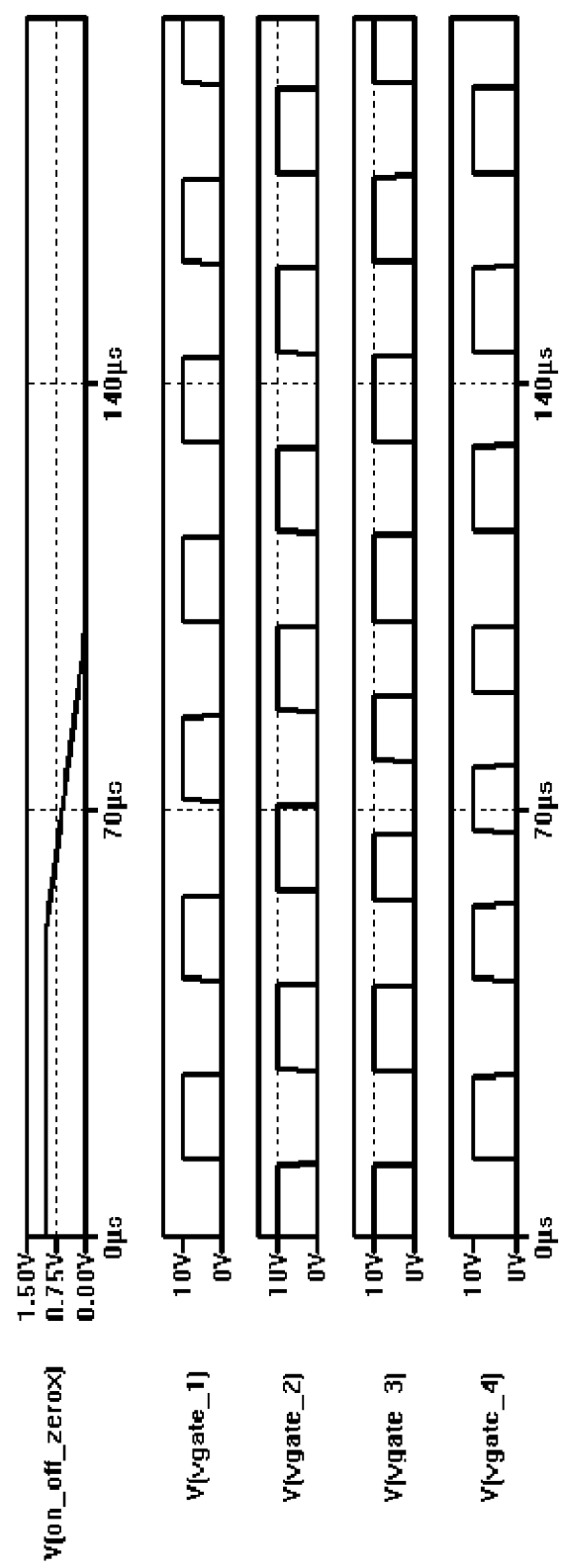
FIG. 16 illustrates an example of some signals of a power transfer system in accordance with some embodiments of the invention.

An example is provided in FIG. 16 which shows an example of a modified gate drive pattern using a gradually decreasing On_Off_zeroX signal. The On_Off_zeroX signal is in the example modified such that the transition from "high" to "low" is made gradually. The phases of the gate drive signals are made dependent on the values of the of On_Off_zeroX signal such that the gate drive signals for the switches S1 and S3 gradually change during a transition phase from being out of phase to being in phase with the gate drive signals for the switches S2 and S4.

Figure 17:
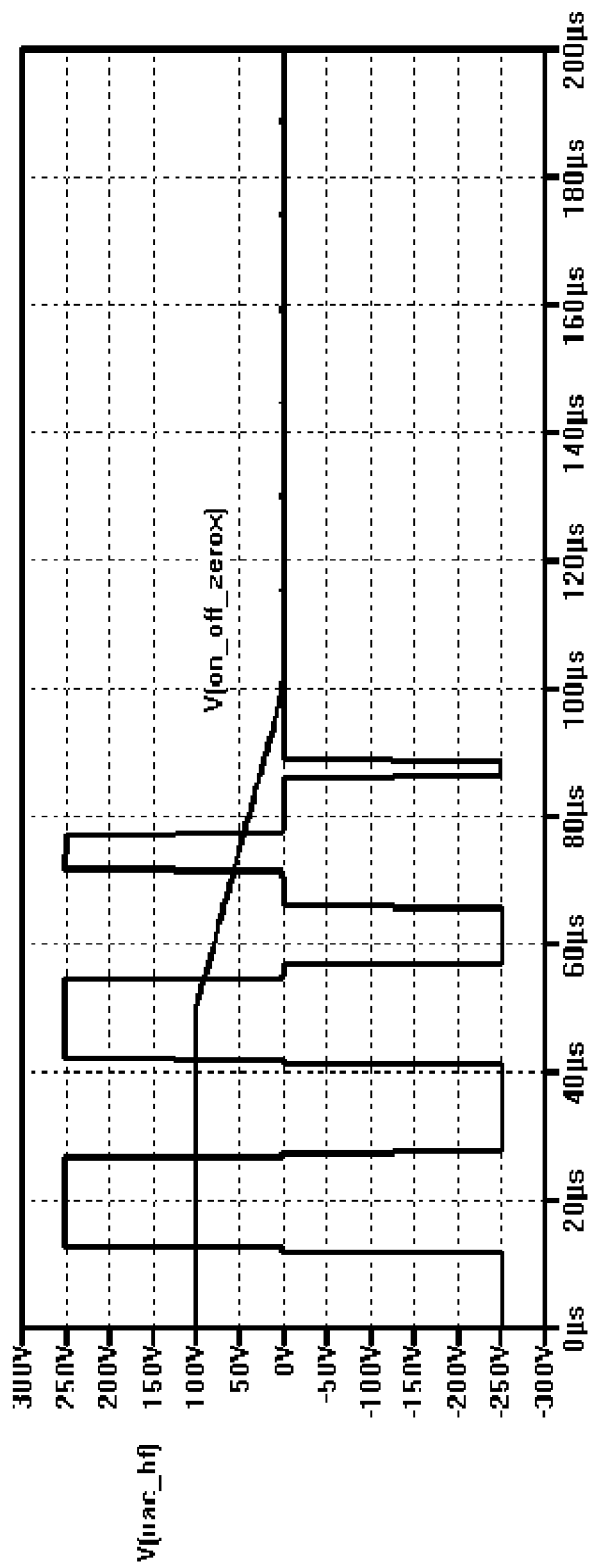
FIG. 17 illustrates an example of some signals of a power transfer system in accordance with some embodiments of the invention.
Figure 18:
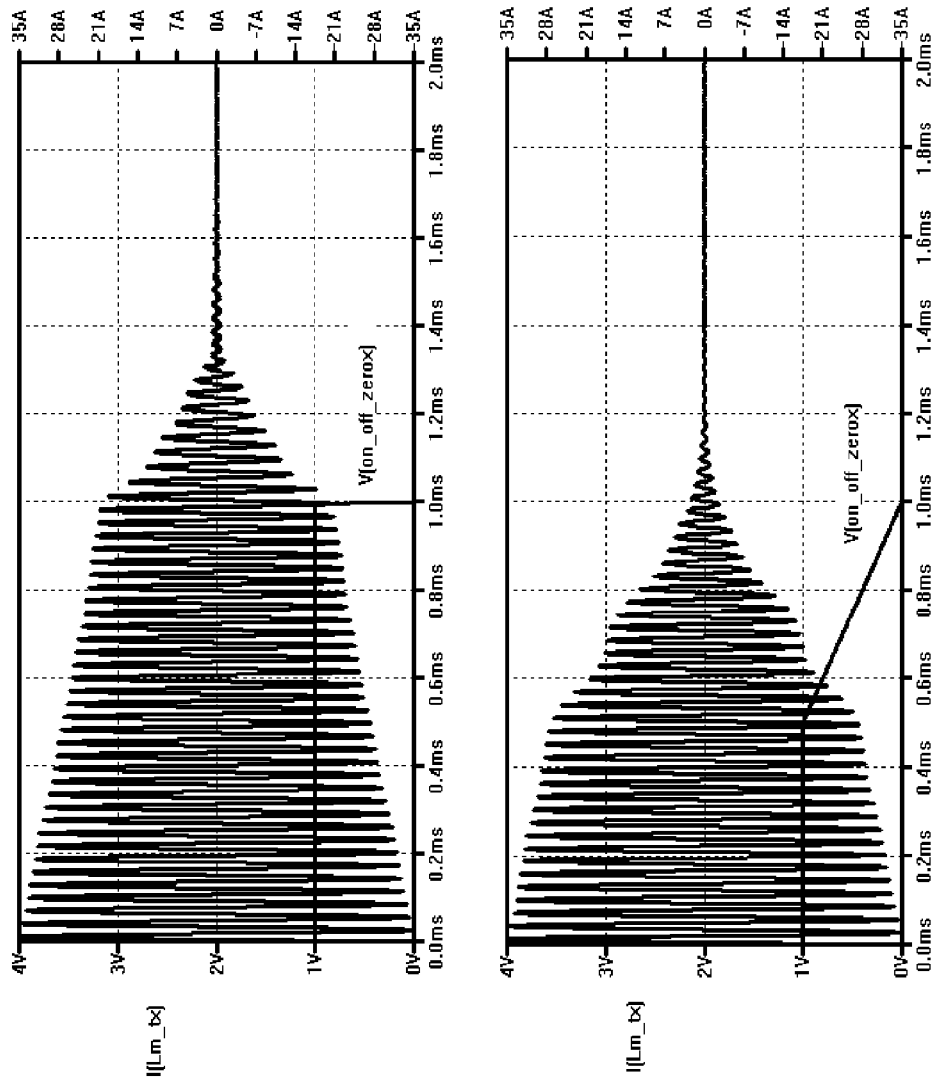
FIG. 18 illustrates an example of some signals of a power transfer system in accordance with some embodiments of the invention.

FIG. 17 illustrates the resulting output voltage Uac_HF of the inverter during the transition of the modified On_Off_zeroX signal. As can be seen, the amplitude of the inverter output voltage Uac_HF is gradually reduced to zero, in this example within 50 uSec. FIG. 18 illustrates the resulting current through the transmitter coil Iac_Tx. In the upper graph the inverter is disabled with the standard On_Off_zeroX signal. As can be seen, it takes some time for current Iac_Tx to reduce to zero, in this case 0.4 msec. In the lower graph the modified On_Off_zeroX signal is applied. The transition time is in the example 0.5 msec. As a result, the current Iac_Tx is reduced to almost zero when the disable signal is reduced to zero.

An additional advantage of the approach is that EMC requirements are easier to satisfy due to the power signal not being suddenly switched off thus causing higher mains harmonics.

In some embodiments, the frequency controller 605 comprises a full bridge switch circuit for coupling to the transmit coil 503 (such as e.g. in FIG. 13), and the limiter 607 is arranged to switch the drive signal to all switch elements of the full bridge switch off at the onset of a repeating time interval. Specifically, each switch element may be a transistor, such as an Insulated Gate Bipolar Transistor (IGBT), and the limiter may be arranged to switch the base/gate signal to zero at the onset of a repeating time intervals.

In some embodiments, the frequency controller 605 may comprise a switching bridge and at least one switch of the switching bridge is arranged to remove energy from a resonance circuit comprising the transmit coil at the onset of the repeating time interval. The switch may specifically remove energy by allowing a current to flow from the resonance circuit to the power signal generator 603 at the onset of the repeating time interval.

Specifically, in some embodiments, the frequency converter 605 may comprise a switch bridge for generating the drive signal, and the limiter 607 may be arranged to restrict the power signal by instantaneously changing drive signals for all switch elements of the switch bridge to switch all switch elements off. Thus, all switch elements may be switched off substantially instantaneously (say within 5 µs) at the onset of a repeating time interval. The switch elements may specifically be e.g. FETs or IBGTs having internal diodes, and the switch elements may be arranged such that at least some of the internal diodes is capable of conducting current from the coil to the power source when all switch elements are switched off.

Figure 19:
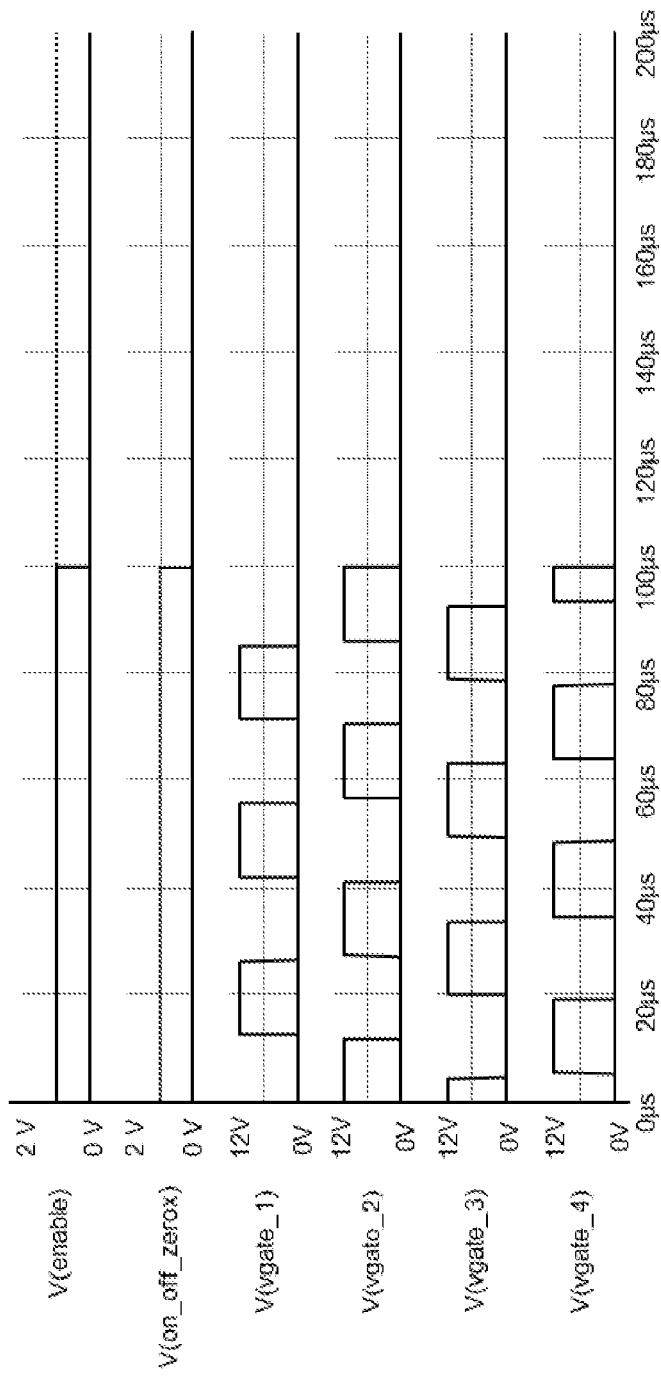
FIG. 19 illustrates an example of some signals of a power transfer system in accordance with some embodiments of the invention.

For example, when a fast changing On_Off_zeroX signal switches from high to low, the gate drive signals of the switches S1 and S3 may be changed instantaneously from being out of phase with the gate drive signals of the switches S1 and S4 to being in phase. Additionally, all gate drive signals may be switched to the signal level corresponding to the switch elements being switched off (when the Enable signal goes "low" to indicate the start of a new repeating time interval). An example is shown in FIG. 19.

Figure 20:
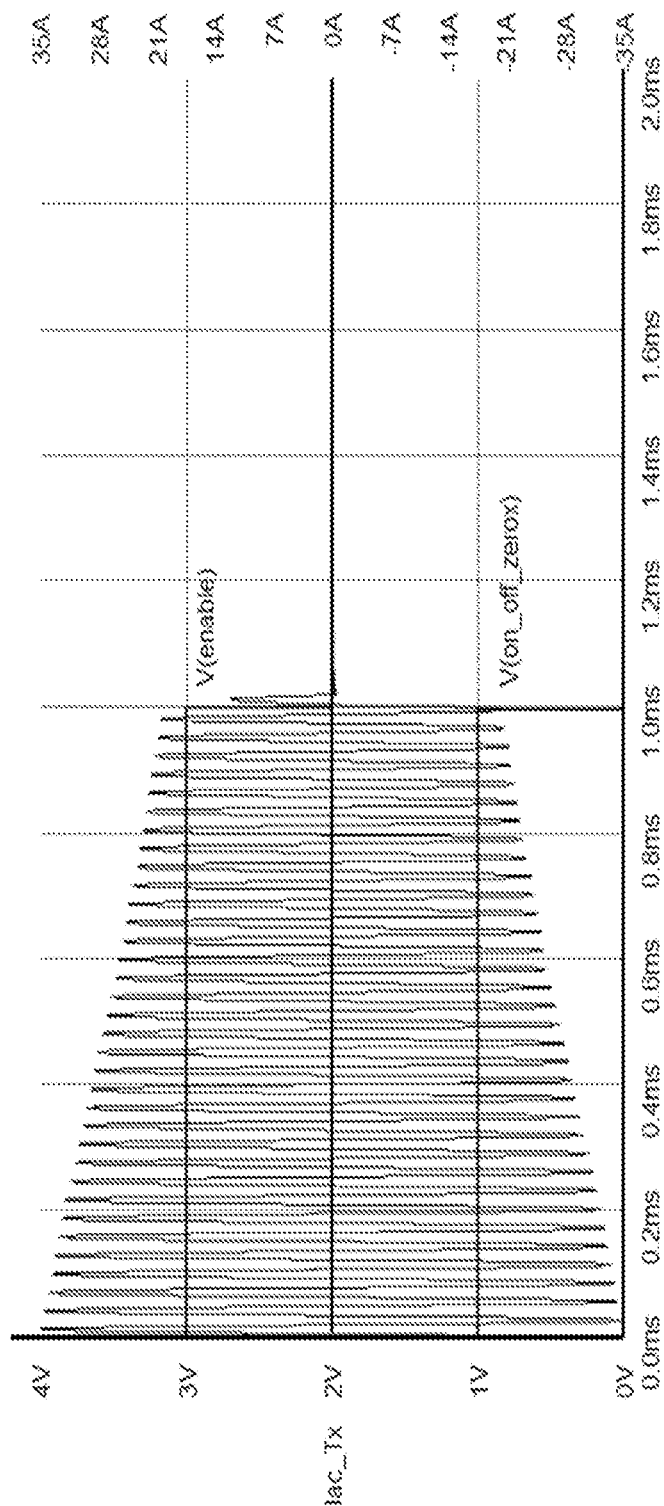
FIG. 20 illustrates an example of some signals of a power transfer system in accordance with some embodiments of the invention.
Figure 21:
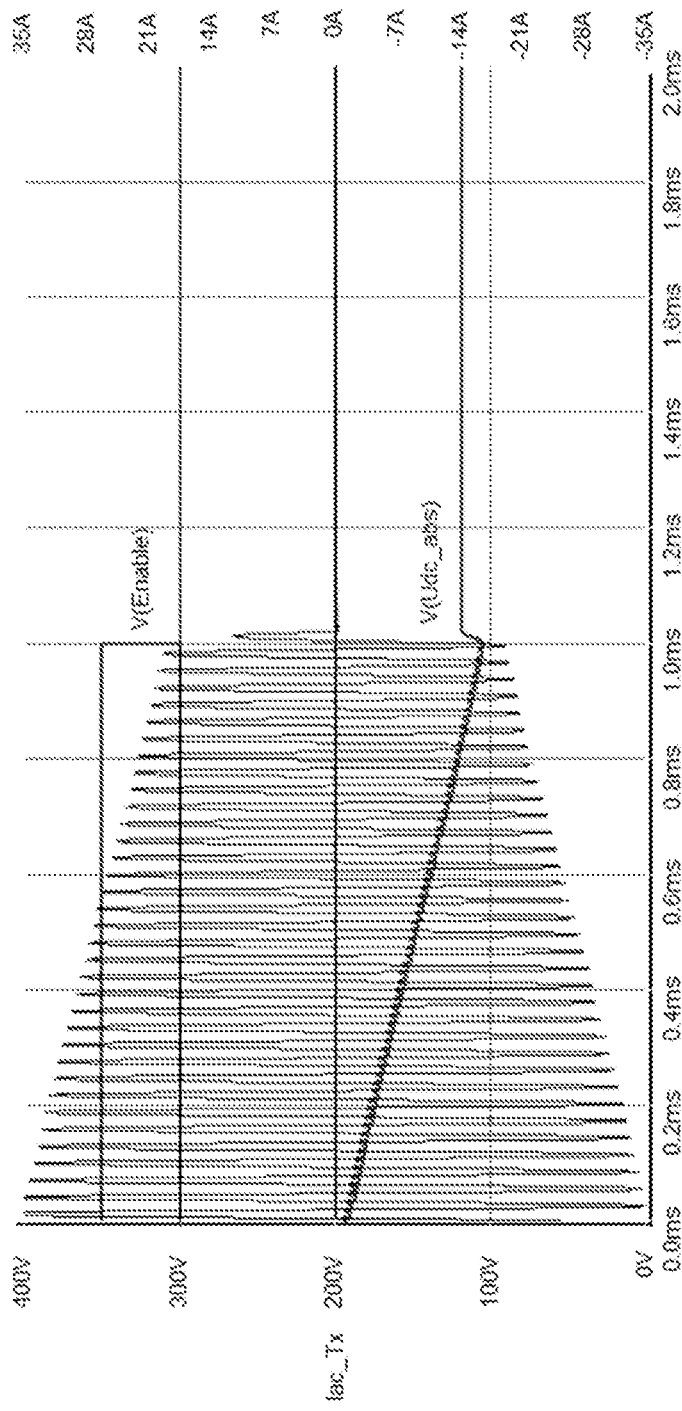
FIG. 21 illustrates an example of some signals of a power transfer system in accordance with some embodiments of the invention.

FIG. 20 illustrates an example of the resulting current Iac_Tx through the transmitter coil. The current through the transmitter coil exhibits a single half wave resonant stroke and then becomes zero. In the example, the energy of the resonant tanks is fed back via the parallel diodes of the IGBT's S1-S4 towards the input filter of the inverter (and thus the power signal generator during the single half wave resonant stroke. Since the energy is fed back to the input filter, it will not be lost but will re-charge the input capacitor Cin, resulting in a small increase of voltage Udc_abs as shown in FIG. 21.

In some embodiments, the limiter 607 may be arranged to couple a power dissipation element to the transmit coil at initiation of a repeating time interval. The power dissipation element may specifically be a resistor and in many embodiments the power dissipation element may be coupled directly across the transmit coil 503. The power dissipation element may be coupled to the transmit coil 103 such that it dissipates energy from a resonance circuit including the transmit coil 503 when coupled to this.

Figure 22:
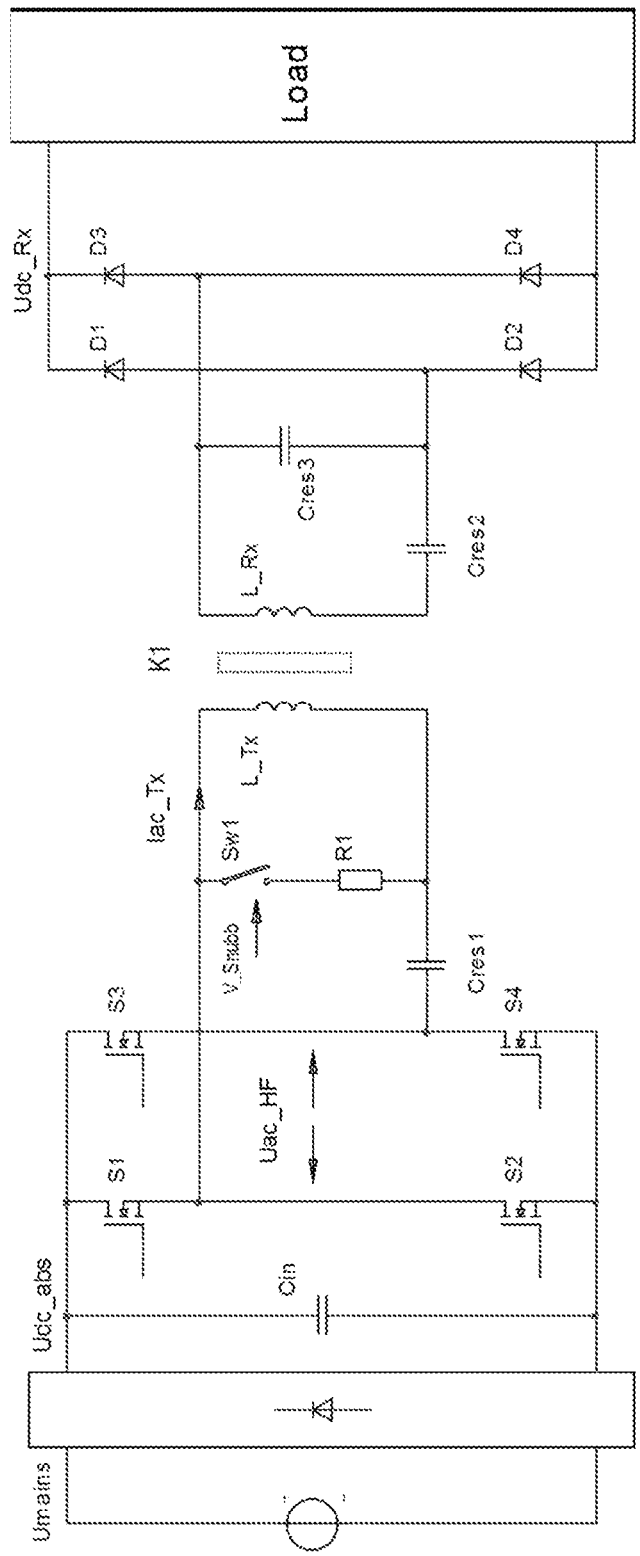
FIG. 22 illustrates an example of elements of a power transfer system in accordance with some embodiments of the invention.

FIG. 22 illustrates an example of such an embodiment.

In the example, a series connection of a switch SW1 and a power dissipation element, in the form of resistor R1, are connected to the terminals of the transmitter coil. The purpose of this arrangement is to absorb the stored energy in the resonant tanks at the onset of the repeating time interval. This is achieved by closing the switch SW1 when the On_Off_zeroX signal transitions to reflect the start of a new repeating time interval. In this way, the residual energy in the resonant tanks is absorbed by resistor R1 and the ringing is damped. The switch SW1 is in the example controlled by voltage signal "V_snubb". An additional advantage of the approach is that the resistive damping will also reduce e.g. higher frequency ringing in the system caused by parasitic capacitances.

Figure 23:
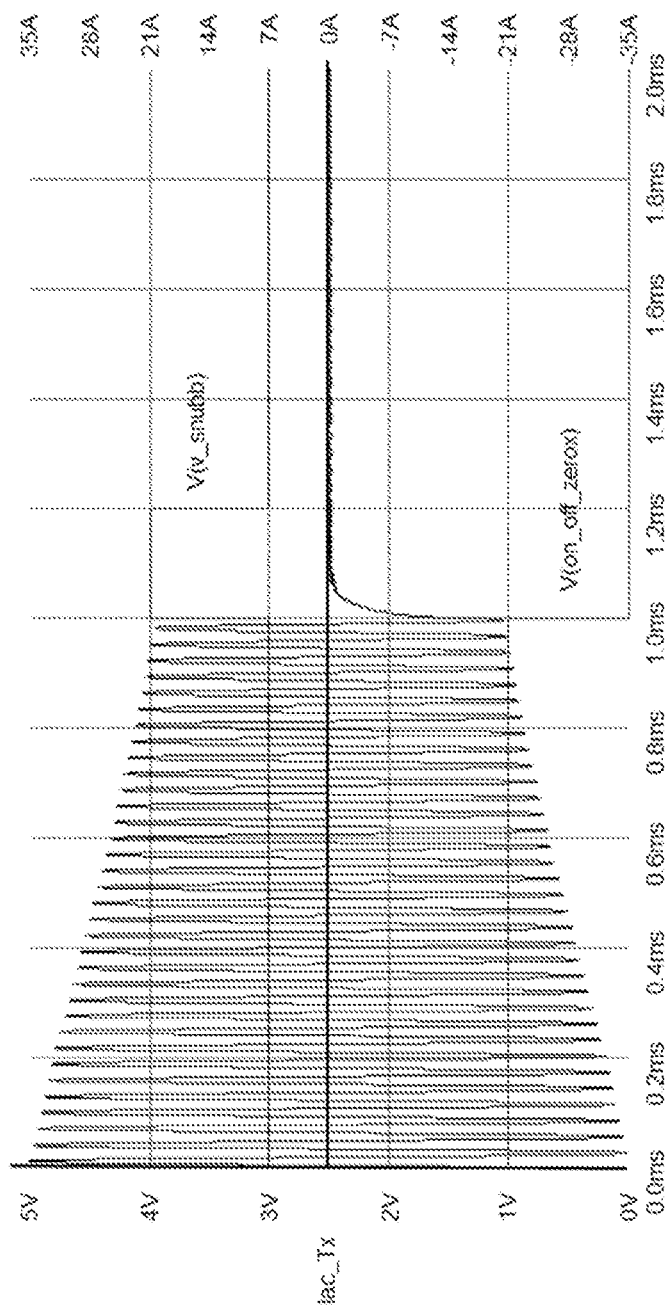
FIG. 23 illustrates an example of some signals of a power transfer system in accordance with some embodiments of the invention.

FIG. 23 illustrates an example of the current Iac_Tx through the transmitter coil. First, the inverter is inhibited in line with the instantaneously changing On_Off_zeroX signal, i.e. all switch elements may be instantaneously switched off. The transition time is negligible. At the same event the switch SW1 is brought in the conductive state thereby coupling the power dissipation element R1 to the transmit coil. As can be seen, the current Iac_Tx decays with a certain time constant to zero, dependent on R1 and L_Tx, at the event of the transition of signal "V_snubb".

Figure 24:
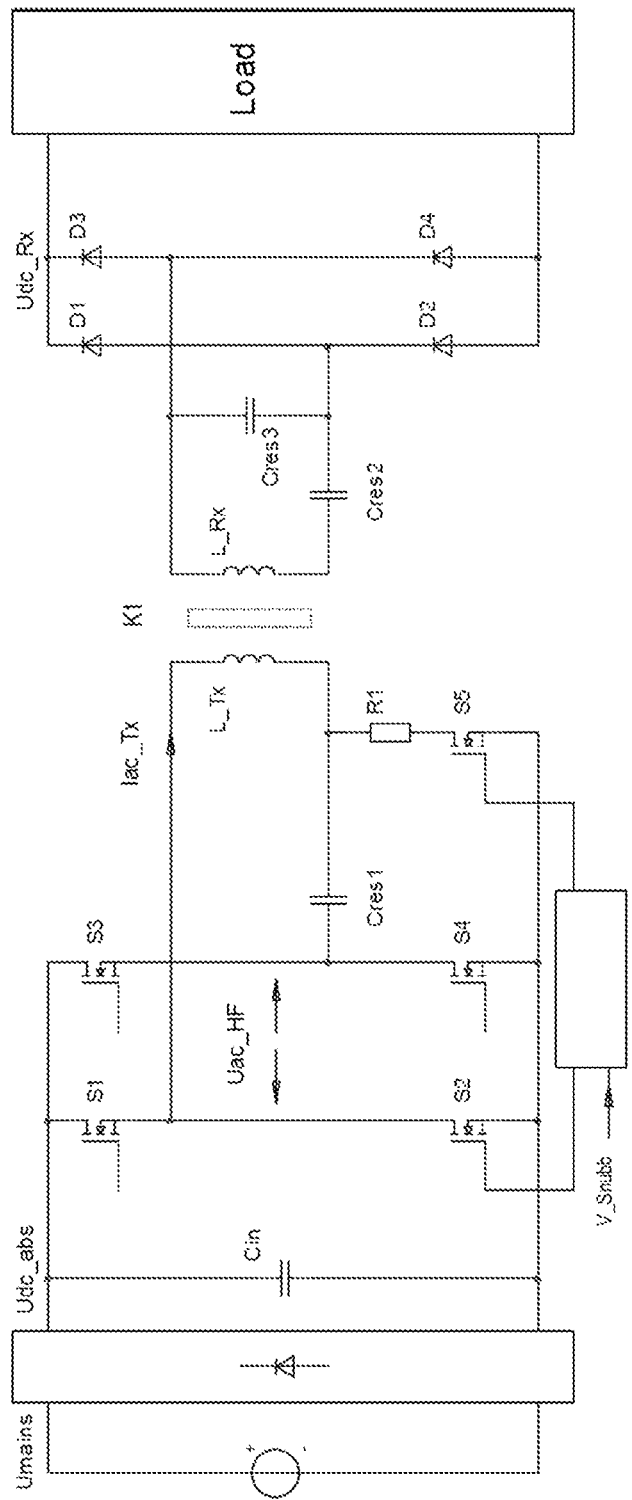
FIG. 24 illustrates an example of elements of a power transfer system in accordance with some embodiments of the invention.

In practice, the driving of the floating switch SW1 may not be straightforward. FIG. 24 illustrates an example wherein the power dissipation element is coupled only to one side of the transmit coil 503 via a separate switch element. In many scenarios, this may provide a more practical implementation as it can avoid the use of a floating switch element (one that is not switched relative to a fixed voltage, specifically ground). The example uses an additional grounded MOSFET S5 to couple and decouple the power dissipation element. Thus, the function of switch SW1 is now taken over by the grounded switches S2 and S5. By closing switches S2 and S5 when the On_Off_zeroX signal goes low, the residual energy in the resonant tanks will be absorbed by resistor R1.

Similar results can be obtained by connecting the power dissipation element and S5 to the terminals of Cres1 and a more practical implementation could e.g. be obtained by closing switch S4 instead of S2 together with S5.

In some embodiments, the coupling of the power dissipation element to the transmit coil may be an inductive coupling. Thus, the energy may be dissipated in a power dissipation element which is inductively coupled to the transmit coil and which accordingly may extract the power inductively, i.e. via an electromagnetic coupling.

Figure 25:
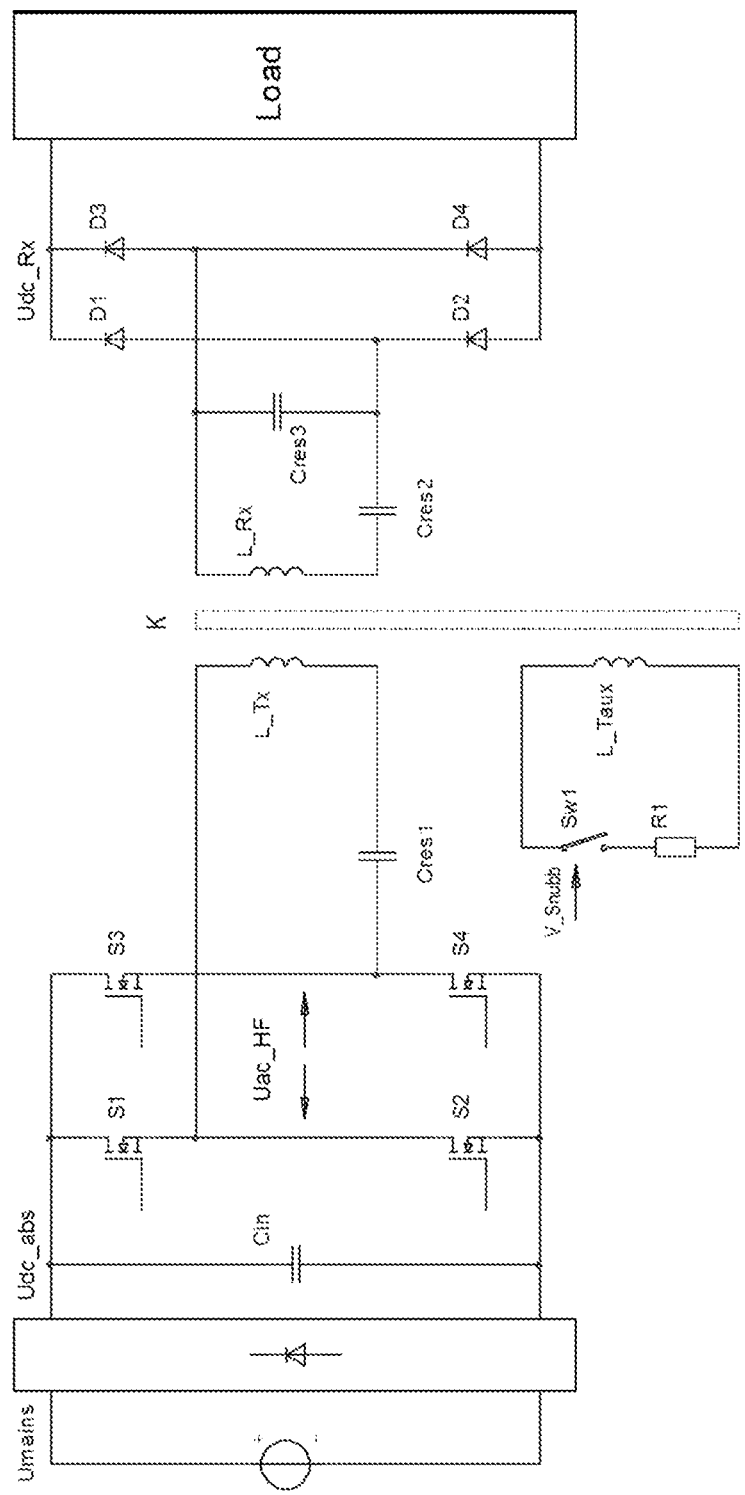
FIG. 25 illustrates an example of elements of a power transfer system in accordance with some embodiments of the invention.
Figure 26:
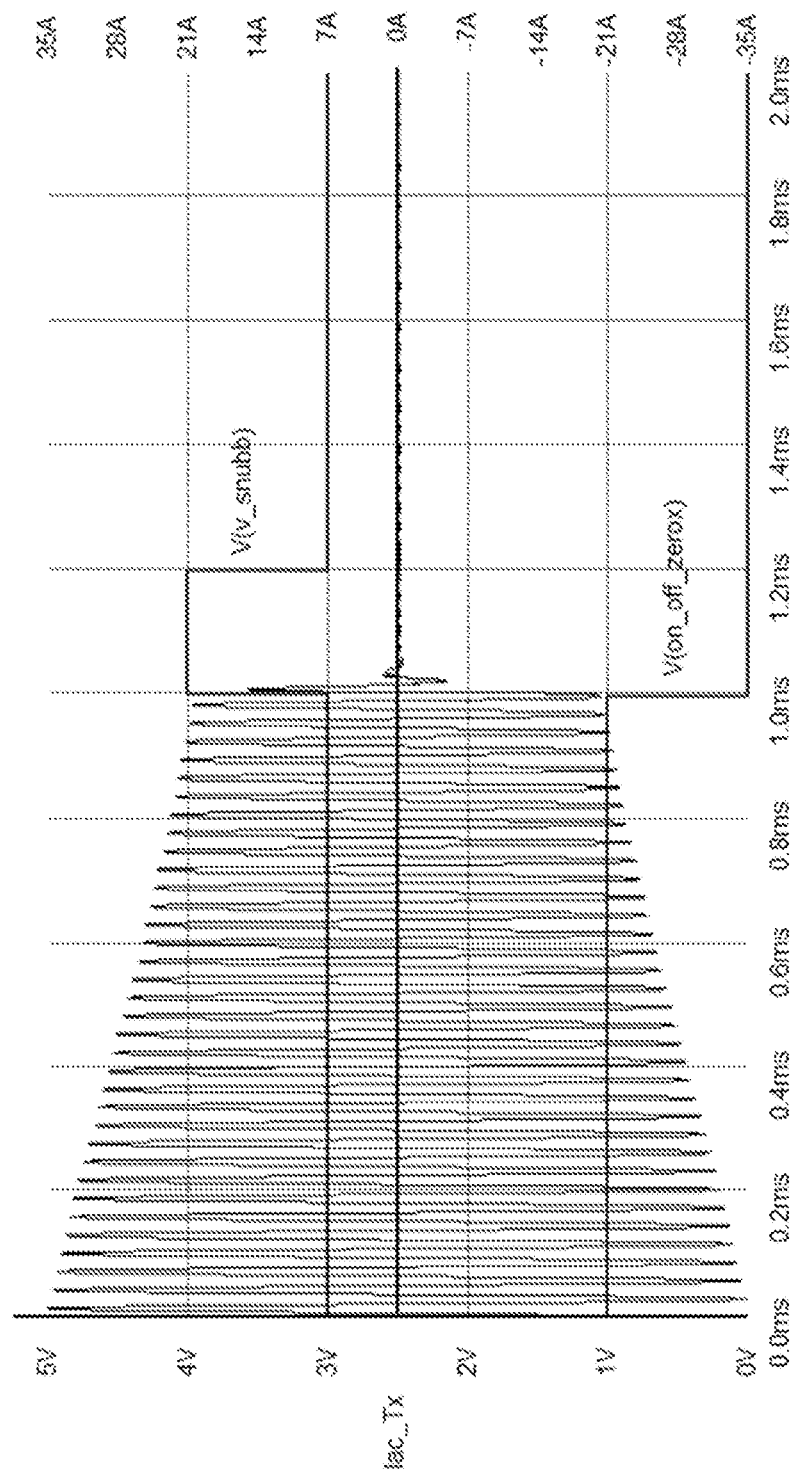
FIG. 26 illustrates an example of some signals of a power transfer system in accordance with some embodiments of the invention.

An example of this is illustrated in FIG. 25. In the example, the energy stored in the magnetic field is absorbed by a switchable resistive magnetic loop L_Taux, which is in close proximity and inductively coupled to the transmitter coil L_Tx. The switch SW1 is controlled by voltage signal "V_snubb". By closing switch SW1 when the On_Off_zeroX signal goes "low", the residual energy in the resonant tanks will be absorbed by resistor R1. FIG. 26 illustrates the resulting current Iac_Tx through the transmitter coil. In the example, the inverter is inhibited with the standard On_Off_zeroX signal and the switch SW1 is switched to the conductive state by means of voltage V_snubb.

In some embodiments, the power dissipation element may be coupled to a communication coil which is inductively coupled to the transmit coil. An example of such an arrangement is shown in FIG. 27.

Figure 27:
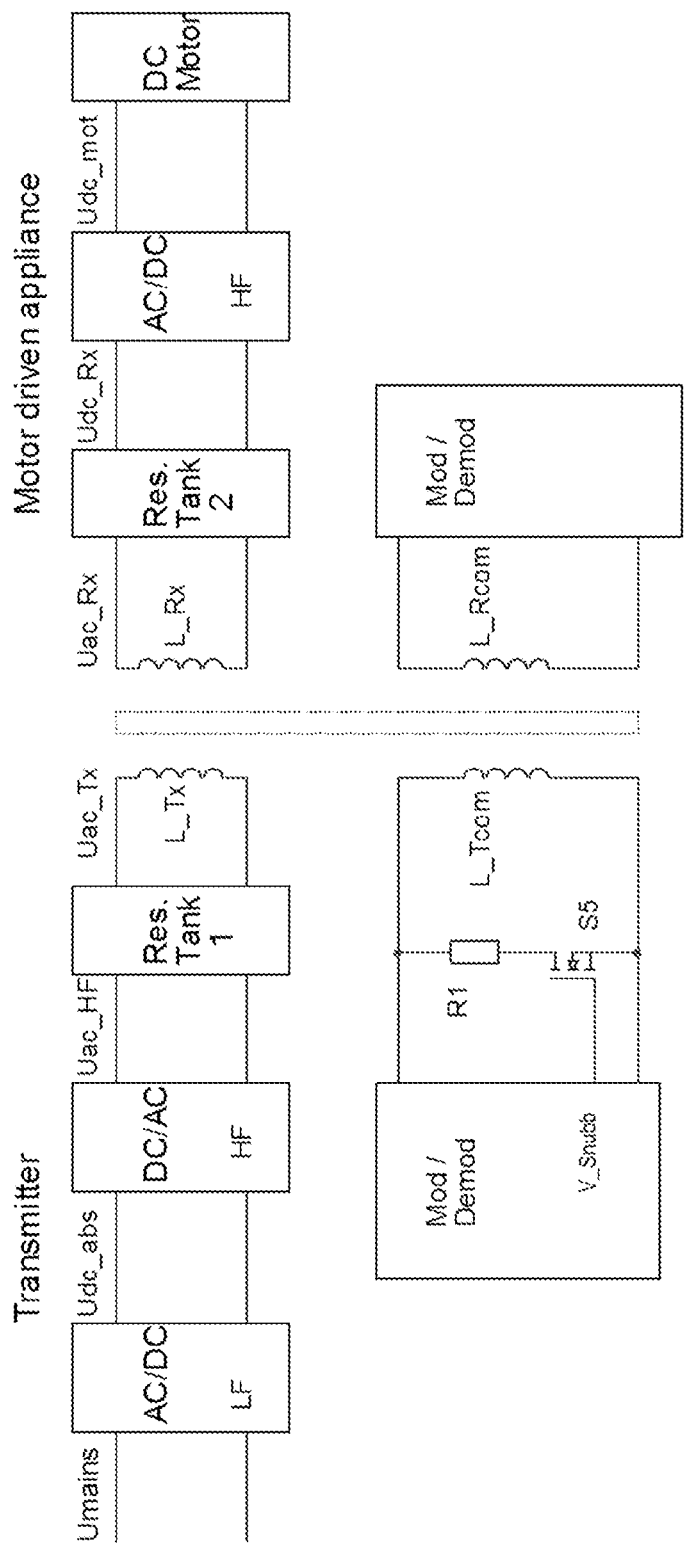
FIG. 27 illustrates an example of elements of a power transfer system in accordance with some embodiments of the invention.

FIG. 27 illustrates an example wherein a wireless power transfer system further comprises communication coils L_Tcom and L_Rcom. The coil L_Tcom will typically be located in the same magnetic plane as the transmit coil and accordingly it is possible to use this already existing coil for energy absorption purposes as well. By closing the low voltage switch S5 just after the On_Off_zeroX signal goes low, the residual energy in the resonant tanks will be absorbed by resistor R1.

The transmitter waveforms with resistive shorting of the transmitter coil L_Tx by means of the communication coil L_Tcom corresponds to the situation were the separate coupled coil L_Taux is used.

In the previous examples, the oscillations/ringing were reduced at the power transmitter side. However, alternatively or additionally the oscillations/ringing may be reduced at the power receiver side.

Figure 28:
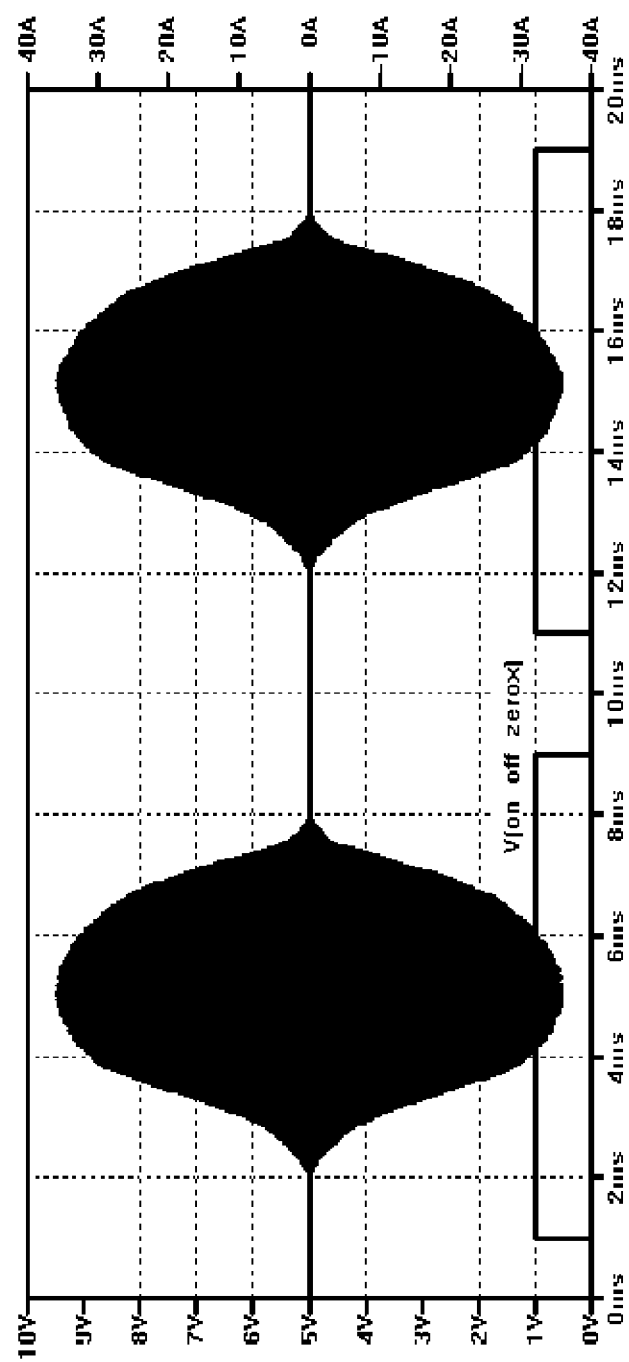
FIG. 28 illustrates an example of some signals of a power transfer system in accordance with some embodiments of the invention.
Figure 29:
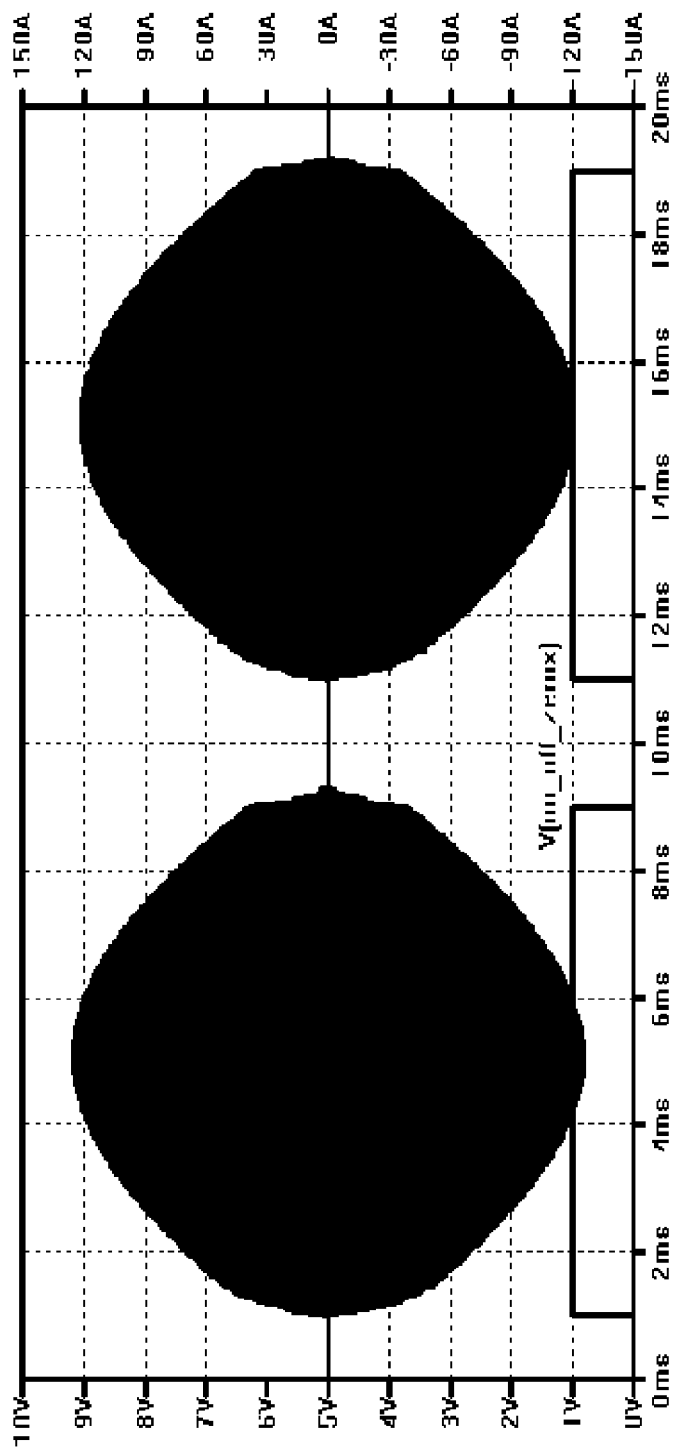
FIG. 29 illustrates an example of some signals of a power transfer system in accordance with some embodiments of the invention.

Specifically, FIGS. 28 and 29 illustrate examples of the receiver coil current Iac_Rx under two different load conditions. FIG. 28 illustrate an example of the power receiver current Iac_Rx if the load is a motor under steady state condition.

The receiver current is zero near the zero crossings of the original power transmitter AC signal. This is due to the fact that near the zero crossings the voltage across the receiver coil is smaller than the rotation voltage, and therefore no current will flow through the HF rectifier. Because the motor current is already zero near the zero crossings of the mains voltage, no special measures needs to be taken to reduce the ringing or to increase the zeroX window.

FIG. 29 illustrates the receiver coil current Iac_Rx when the motor is starting up from zero rpm. Because the rotation voltage of the motor is zero the current gap near the zero crossings of the mains voltage is much smaller. When the On_Off_ZeroX signal changes the receiver current Iac_Rx is not zero and therefore this limits the effective time window of the zero crossings. In other words, some ringing occurs after the On_Off_ZeroX signal changes.

In some embodiments, the limiter 607 may be arranged to couple a power dissipation element to the receive coil at initiation of a repeating time interval. The power dissipation element may specifically be a resistor and in many embodiments the power dissipation element may be coupled directly across the receive coil 503. The power dissipation element may be coupled to the receive coil 507 such that it dissipates energy from a resonance circuit including the receive coil 507 when coupled to this.

Figure 30:
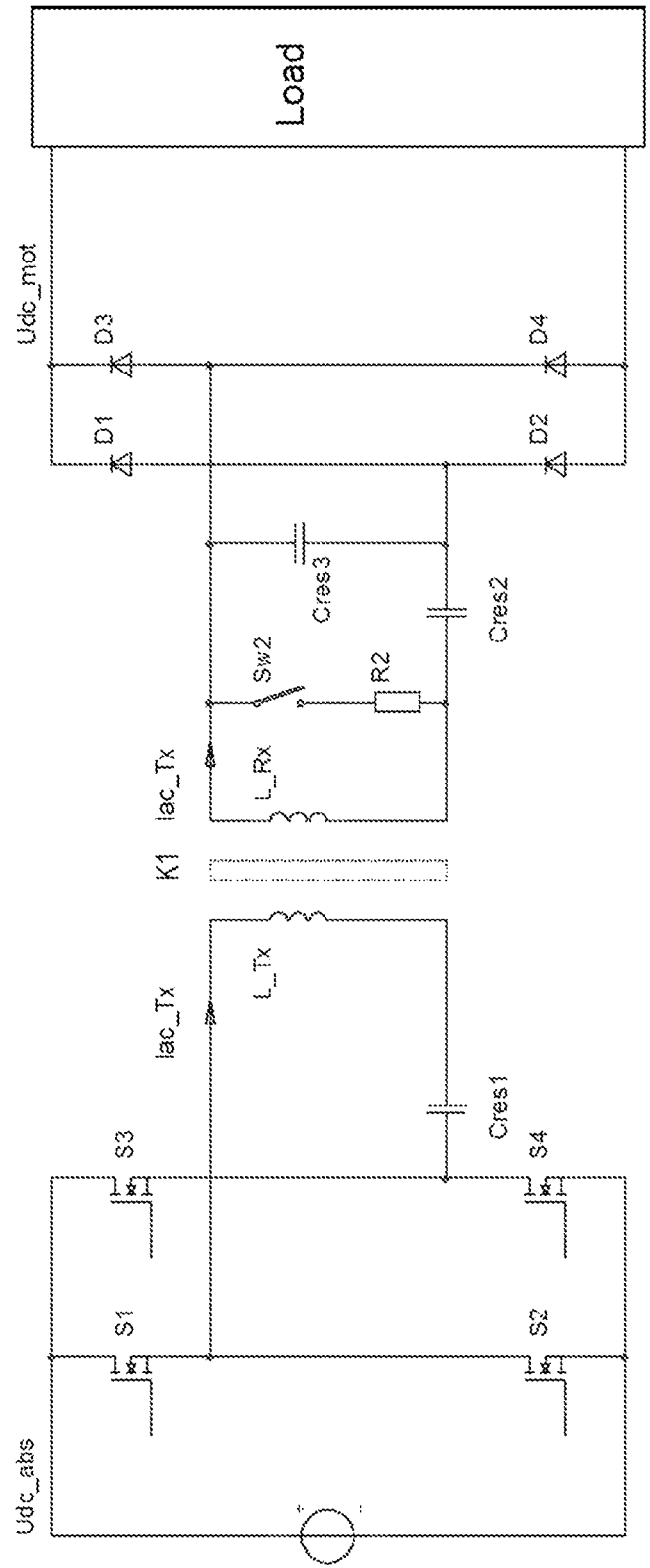
FIG. 30 illustrates an example of elements of a power transfer system in accordance with some embodiments of the invention.

FIG. 30 illustrates an example of such an embodiment.

In the example, a series connection of a switch SW2 and a power dissipation element in the form of resistor R2 are connected to the terminals of the receiver coil. The purpose of this arrangement is to absorb the stored energy in the resonant tanks at the onset of the repeating time interval. This is achieved by closing the switch SW2 when the On_Off_zeroX signal transitions to reflect the start of a new repeating time interval. In this way, the residual energy in the resonant tanks is absorbed by resistor R2 and the ringing is damped. The switch SW2 is in the example controlled by voltage signal "V_snubb".

Figure 31:
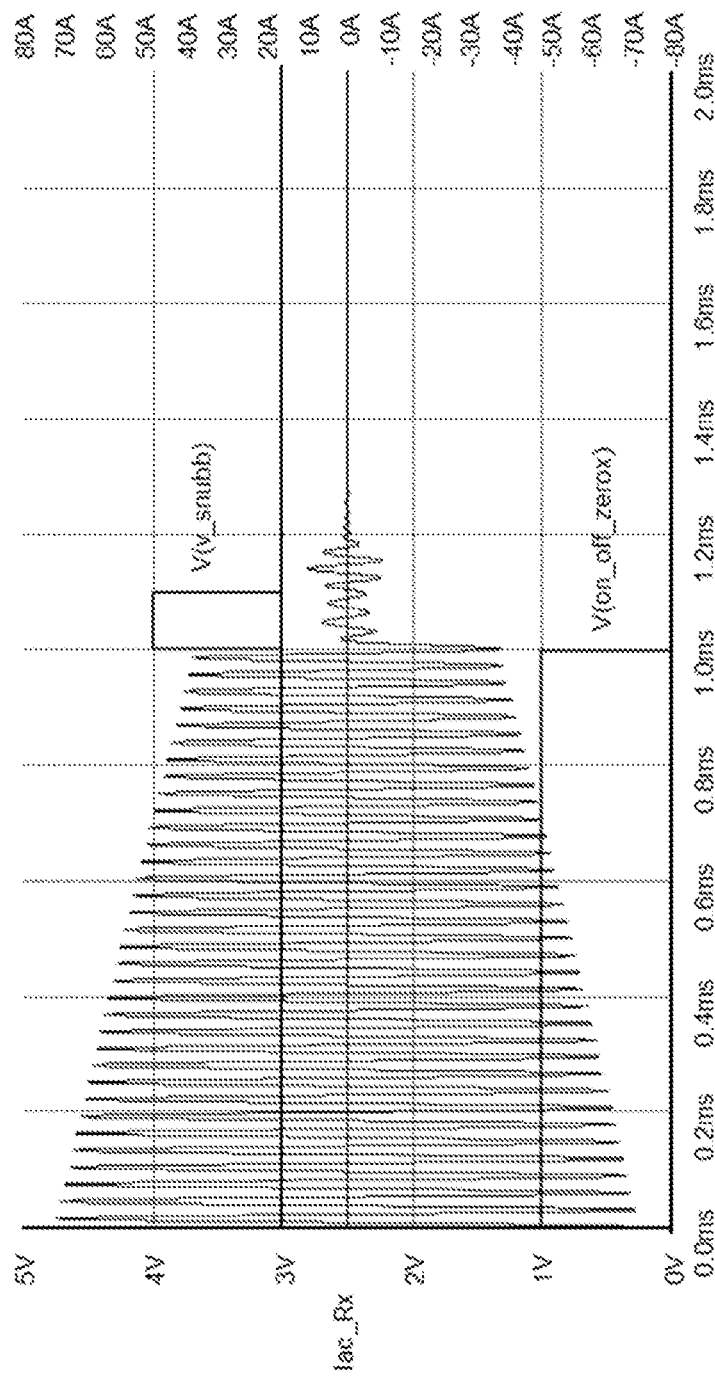
FIG. 31 illustrates an example of some signals of a power transfer system in accordance with some embodiments of the invention.

FIG. 31 illustrates an example of the current Iac_Rx through the power receiver coil. First, the inverter is inhibited with the standard On_Off_zeroX signal. The transition time is negligible. At the same time, the switch SW2 is switched to the conductive state thereby coupling the power dissipation element R2 to the receiver coil. As can be seen, the current Iac_Rx decays to zero with a certain time constant, dependent on R2 and L_Rx, at the event of the transition of signal "V_snubb".

Figure 32:
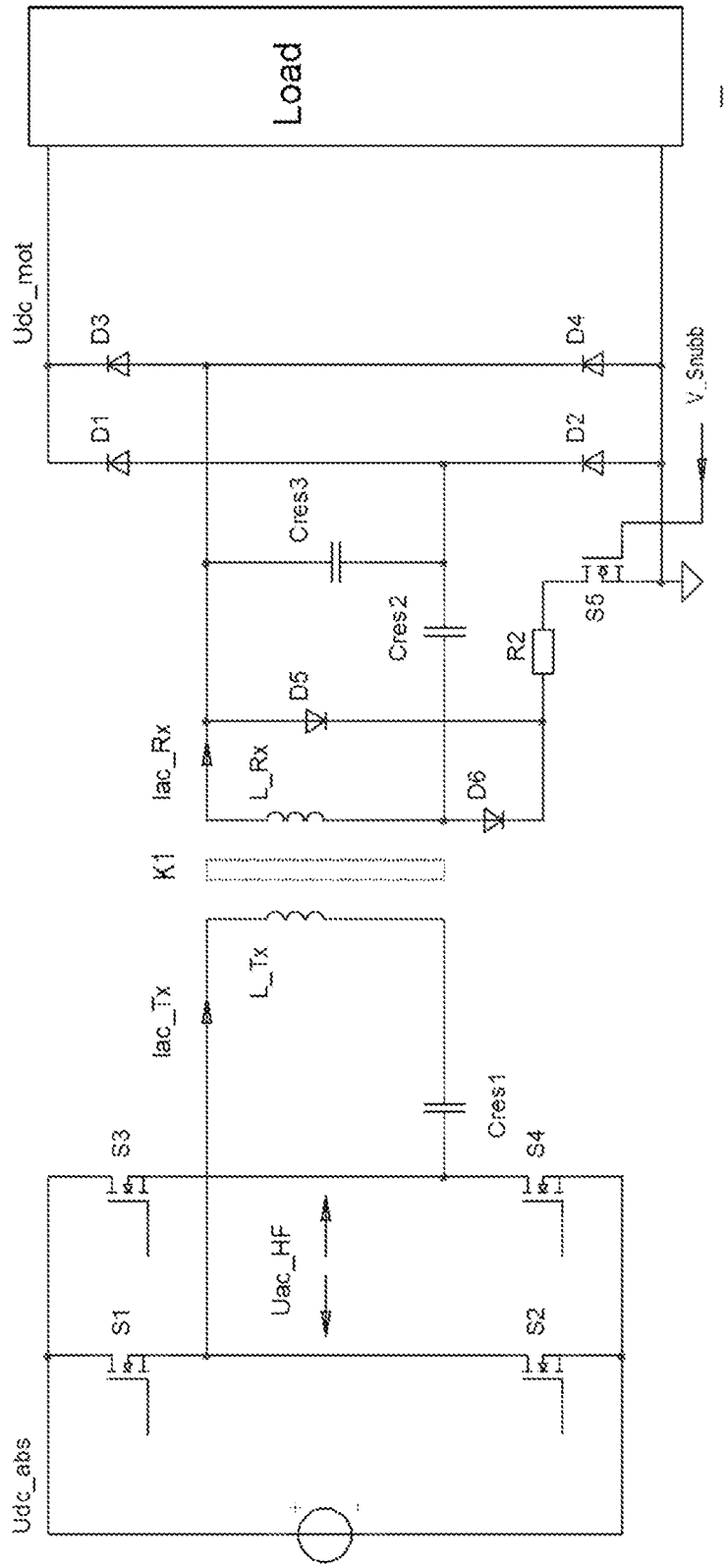
FIG. 32 illustrates an example of elements of a power transfer system in accordance with some embodiments of the invention.

In practice, the driving of the floating switch SW2 may not be straightforward. FIG. 32 illustrates an example wherein the power dissipation element is coupled to the receive coil using an additional grounded switch S5 which specially is a MOSFET. The function of the floating switch SW2 is now taken over by the switch S5. By closing the switch S5 when the On_Off_zeroX signal goes low, the residual energy in the resonant tanks will be absorbed by resistor R2.

Figure 33:
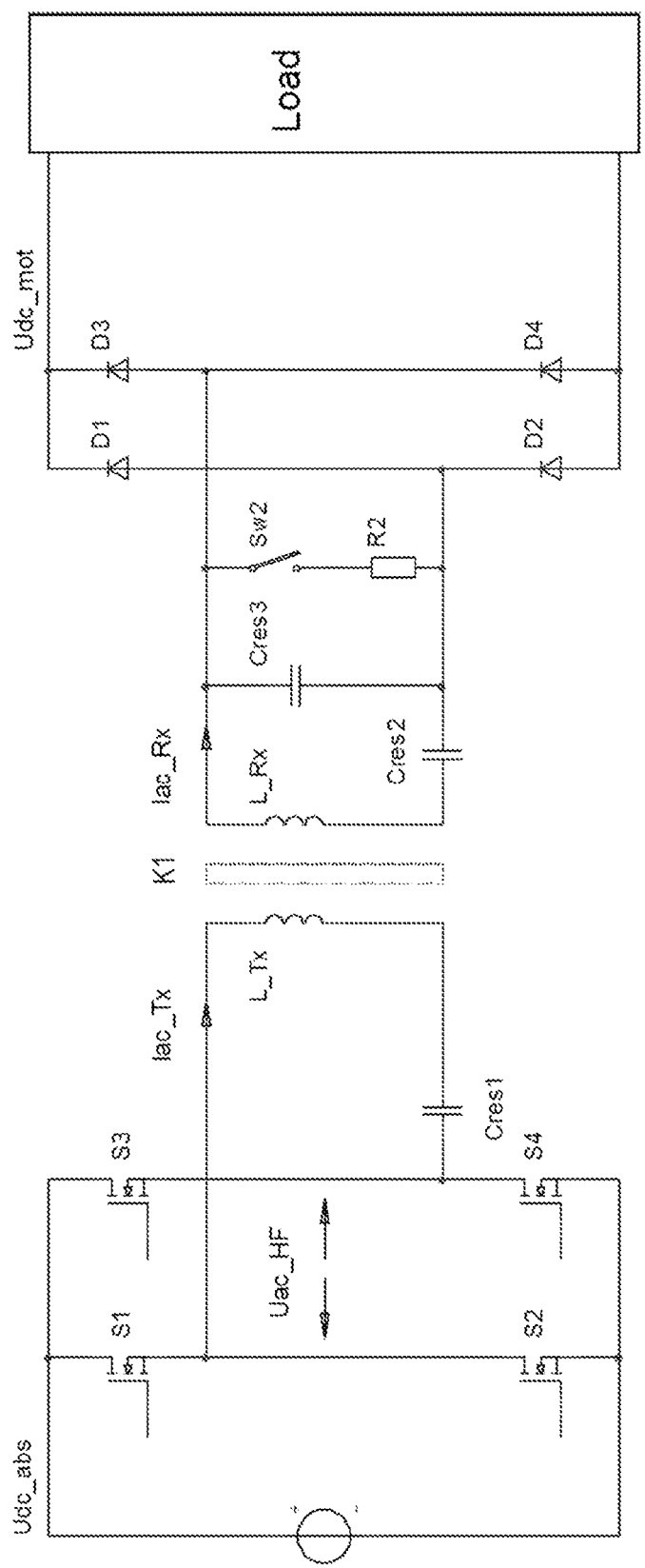
FIG. 33 illustrates an example of elements of a power transfer system in accordance with some embodiments of the invention.

Another example of a power dissipation element being coupled to the receive coil is shown in FIG. 33. In this example, the coupling is not by directly connecting the switch and power dissipation element to the receive coil but rather these are coupled to the receive coil via a capacitor Cres2.

In this example, the series connection of SW2 and Resistor R2 are specifically connected to the input terminals of the HF rectifier. However, the operation is equivalent to the operation of the example of FIG. 30.

Figure 34:
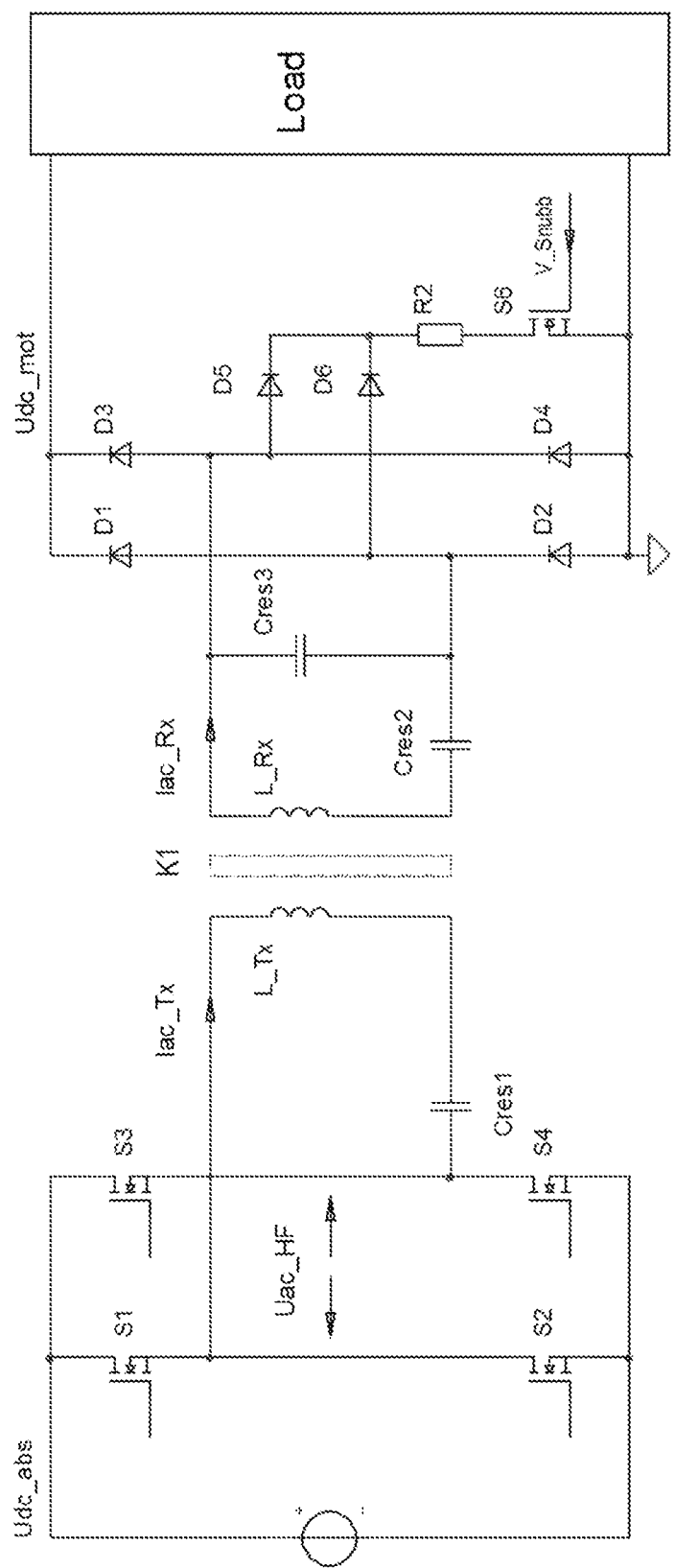
FIG. 34 illustrates an example of elements of a power transfer system in accordance with some embodiments of the invention.
Figure 35:
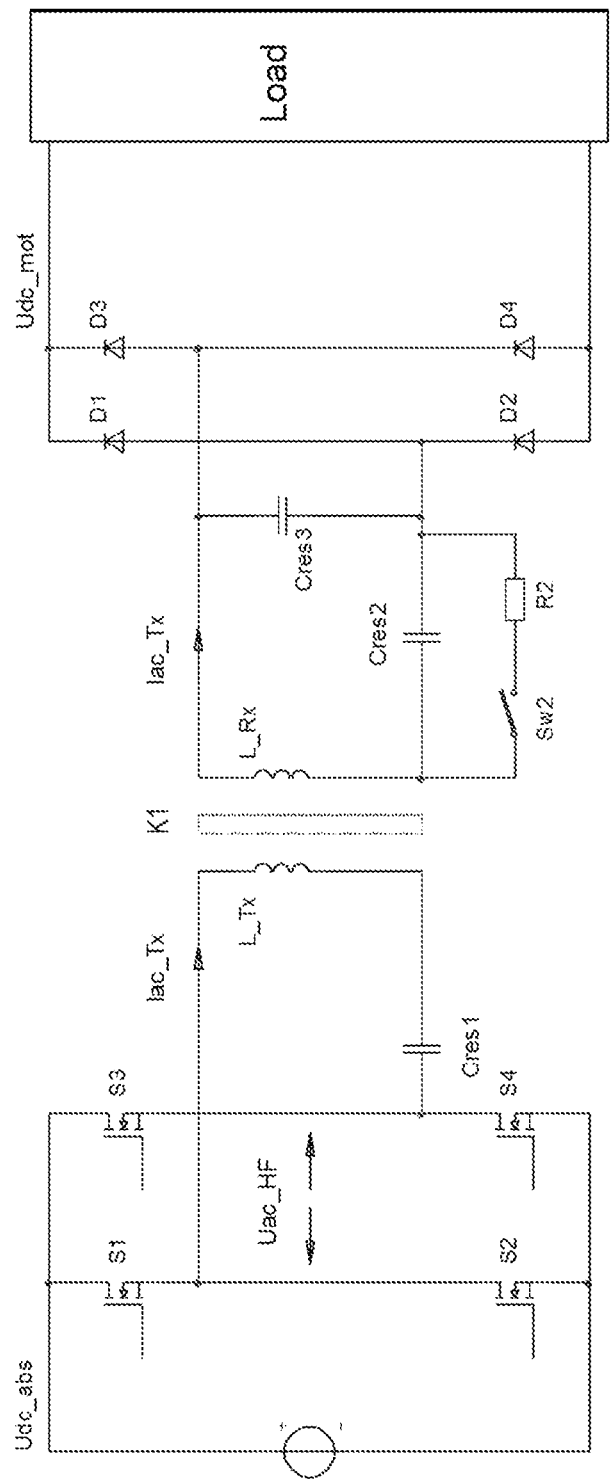
FIG. 35 illustrates an example of elements of a power transfer system in accordance with some embodiments of the invention.
Figure 36:
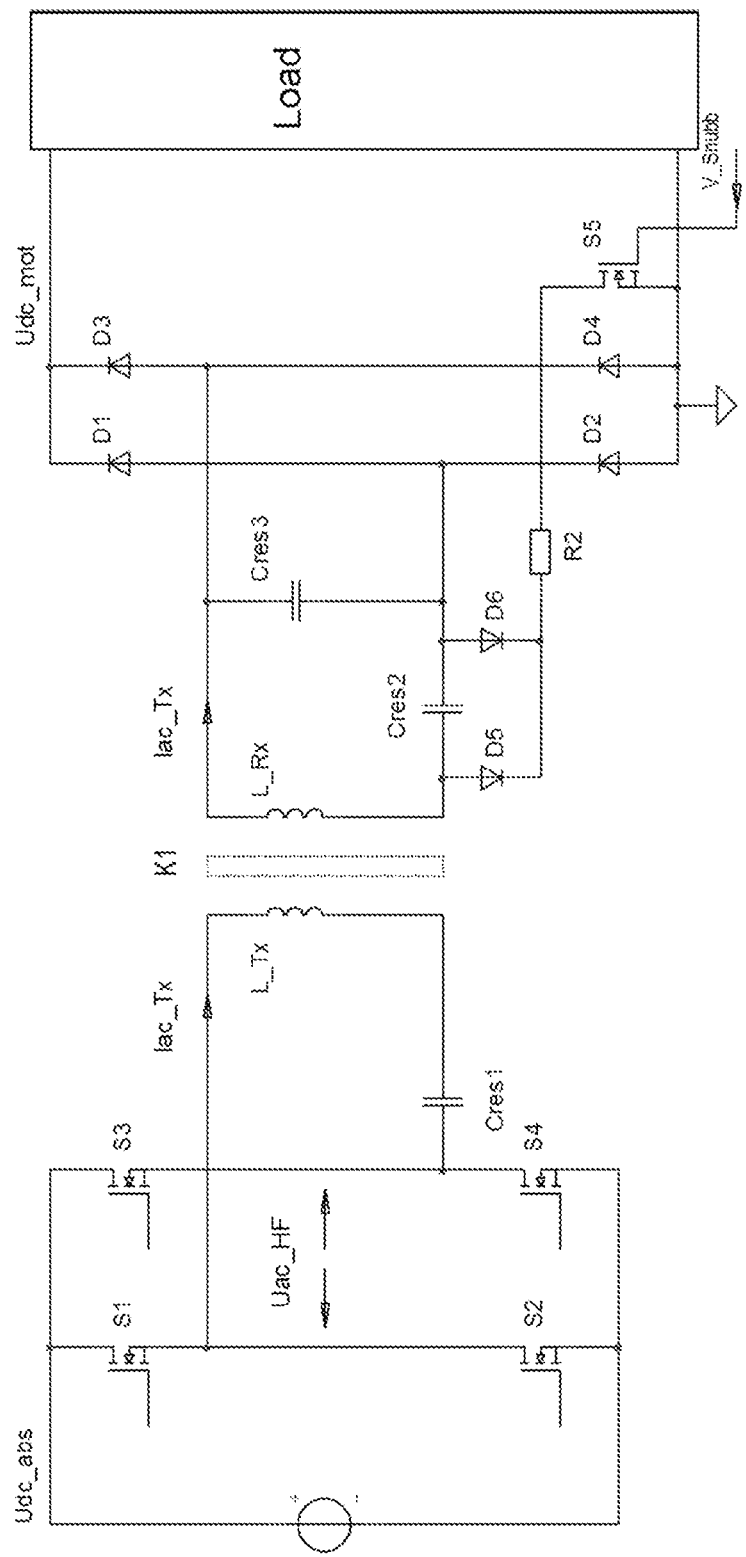
FIG. 36 illustrates an example of elements of a power transfer system in accordance with some embodiments of the invention.

Yet another example is illustrated in FIG. 34. The example corresponds to that of FIG. 33 but avoids the use of a floating switch element. Another example is provided in FIG. 35 wherein the switch element Sw2 and resistor R2 are coupled across one of the capacitors Cres2 being part of the resonance circuit including the receive coil. FIG. 36 illustrates a corresponding example which avoids the use of a floating switch.

In some embodiments, the coupling of the power dissipation element to the power receiver coil may be an inductive coupling. Thus, the energy may be dissipated in a power dissipation element which is inductively/electro-magnetically coupled to the receiver coil and which accordingly may extract the power inductively, i.e. via an electromagnetic coupling.

Figure 37:
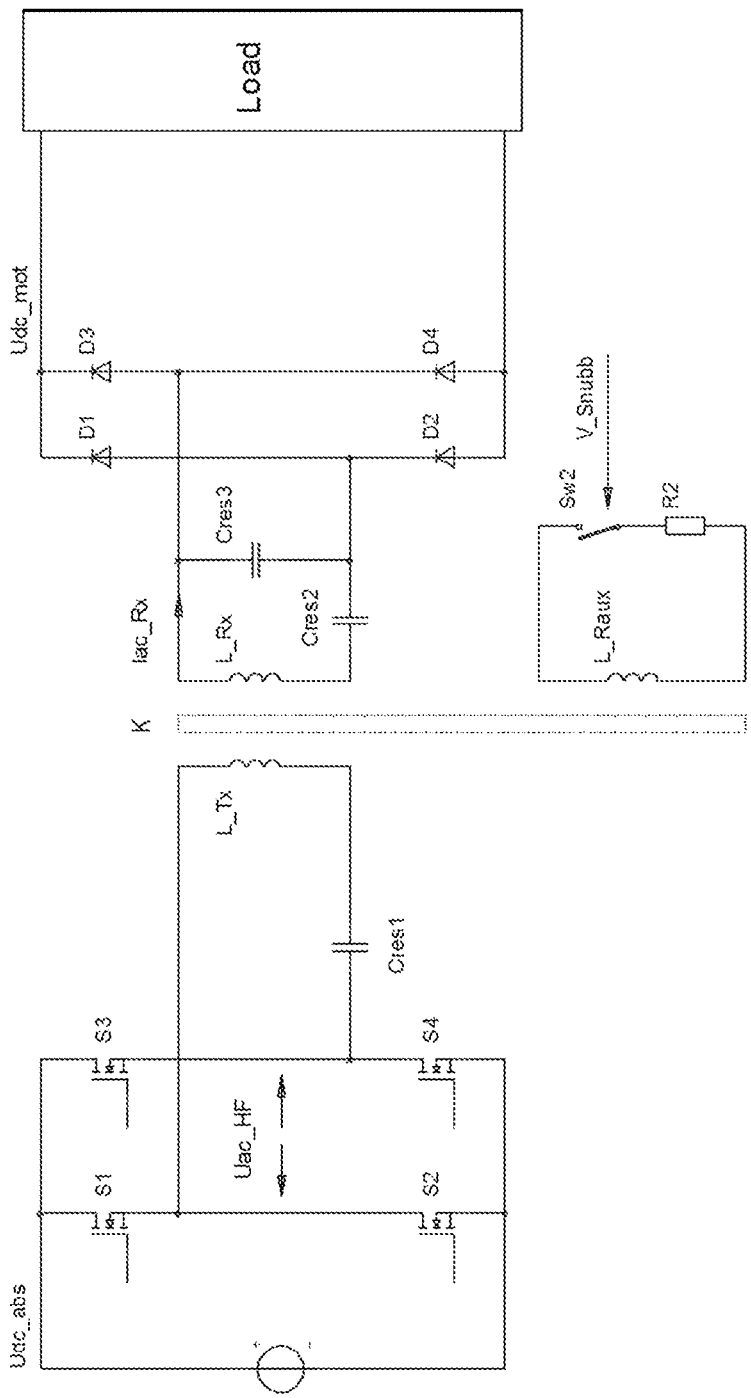
FIG. 37 illustrates an example of elements of a power transfer system in accordance with some embodiments of the invention.

An example of this is illustrated in FIG. 37. In the example, the energy stored in the magnetic field is absorbed by a switchable resistive magnetic loop L_Raux, which is in close proximity and inductively coupled to the power receiver coil L_Rx. The switch SW2 is controlled by voltage signal "V_snubb". By closing switch SW2 when the On_Off_zeroX signal goes "low", the residual energy in the resonant tanks will be absorbed by resistor R2.

Figure 38:
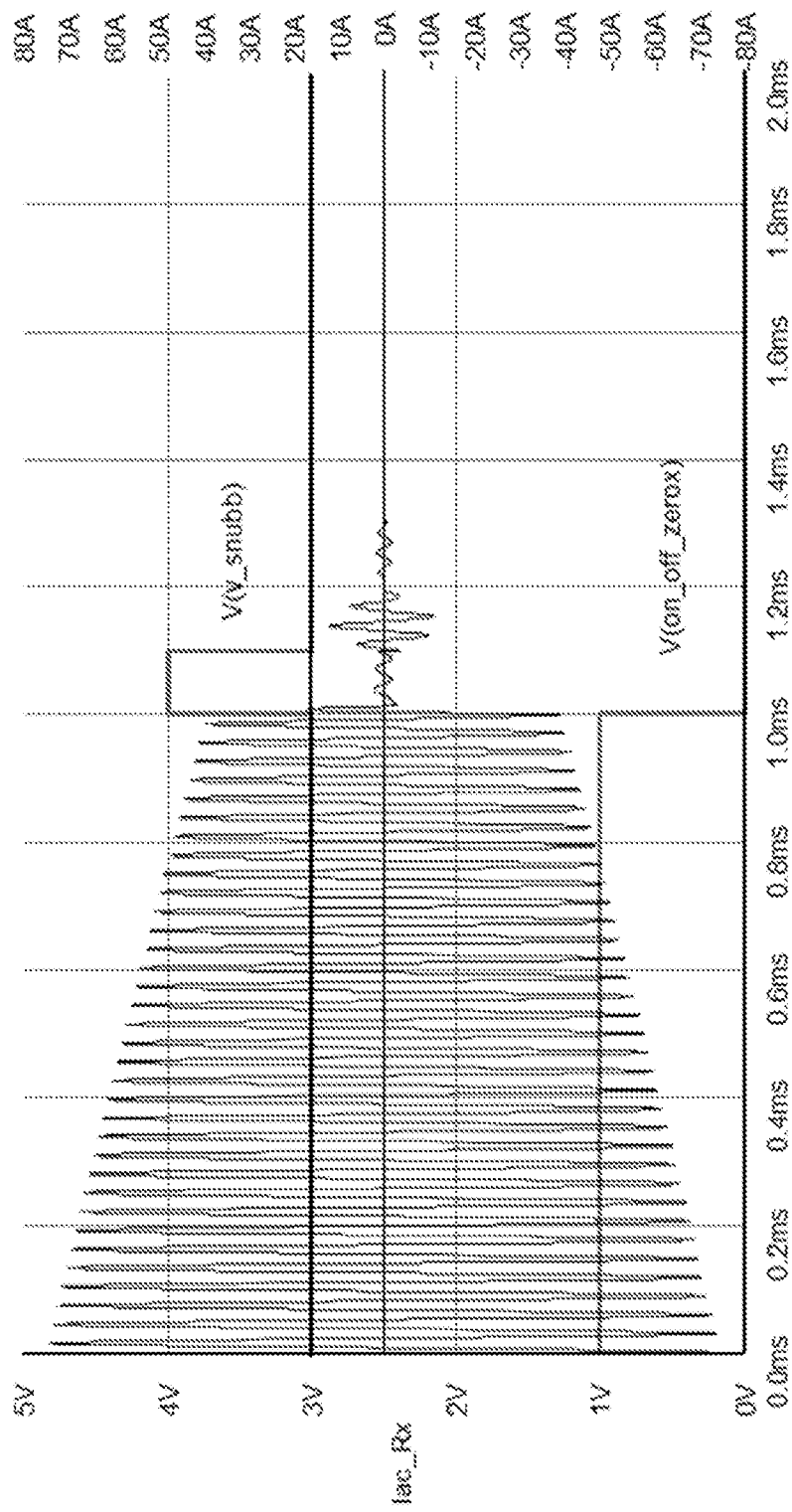
FIG. 38 illustrates an example of some signals of a power transfer system in accordance with some embodiments of the invention.

FIG. 38 illustrates the resulting current Iac_Rx through the power receiver coil. In the example, the inverter is inhibited with the standard On_Off_zeroX signal and the switch SW2 is switched to the conductive state by means of voltage V_snubb.

In some embodiments, the power dissipation element may be coupled to a communication coil which is inductively coupled to the power receiver coil. An example of such an arrangement is shown in FIG. 39.

Figure 39:
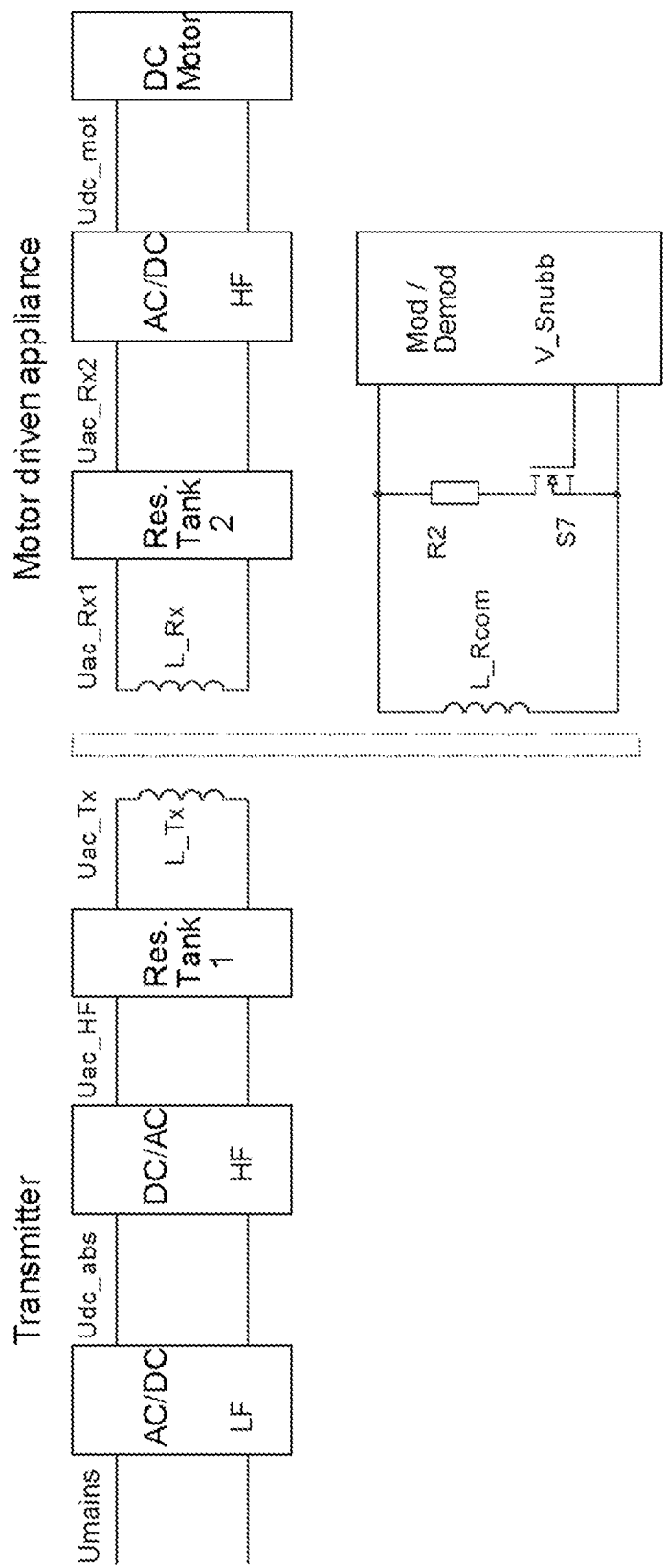
FIG. 39 illustrates an example of elements of a power transfer system in accordance with some embodiments of the invention.

FIG. 39 illustrates an example wherein a wireless power transfer system further comprises communication coils L_Tcom and L_Rcom. The coil L_Rcom will typically be located in the same magnetic plane as the power receiver coil and accordingly it is possible to re-use this coil for energy absorption purposes as well. By closing the low voltage switch S7 when the On_Off_zeroX signal goes low, the residual energy in the resonant tanks will be absorbed by resistor R2.

The transmitter waveforms with resistive shorting of the receiver coil L_Rx by means of the communication coil L_Rcom will correspond directly to the situation were the separate coupled coil L_Raux is used.

It will be appreciated that whereas the previous description provided a number of different approaches for reducing ringing, the approaches are not mutually exclusive. Thus, in many embodiments, a combination of the described examples may be applied. An example combination could be to introduce the following functions:

Gradually change the zero-on-off signal to zero to reduce EMC problems;

Switch off the inverter completely to store the remaining energy in the input capacitor Cin at the input of the inverter;

Reduce the remaining ringing at the receiver by resistive shortening of the receiver coil L_Rx, the input terminals of the HF rectifier and the terminals of Cres2 (D5, D6, D7, R5, R6, S6); and Reduce the remaining ringing at the receiver by resistive shortening of the coupled transmitter communication coil L_Rcom (R5, S5).

Figure 40:
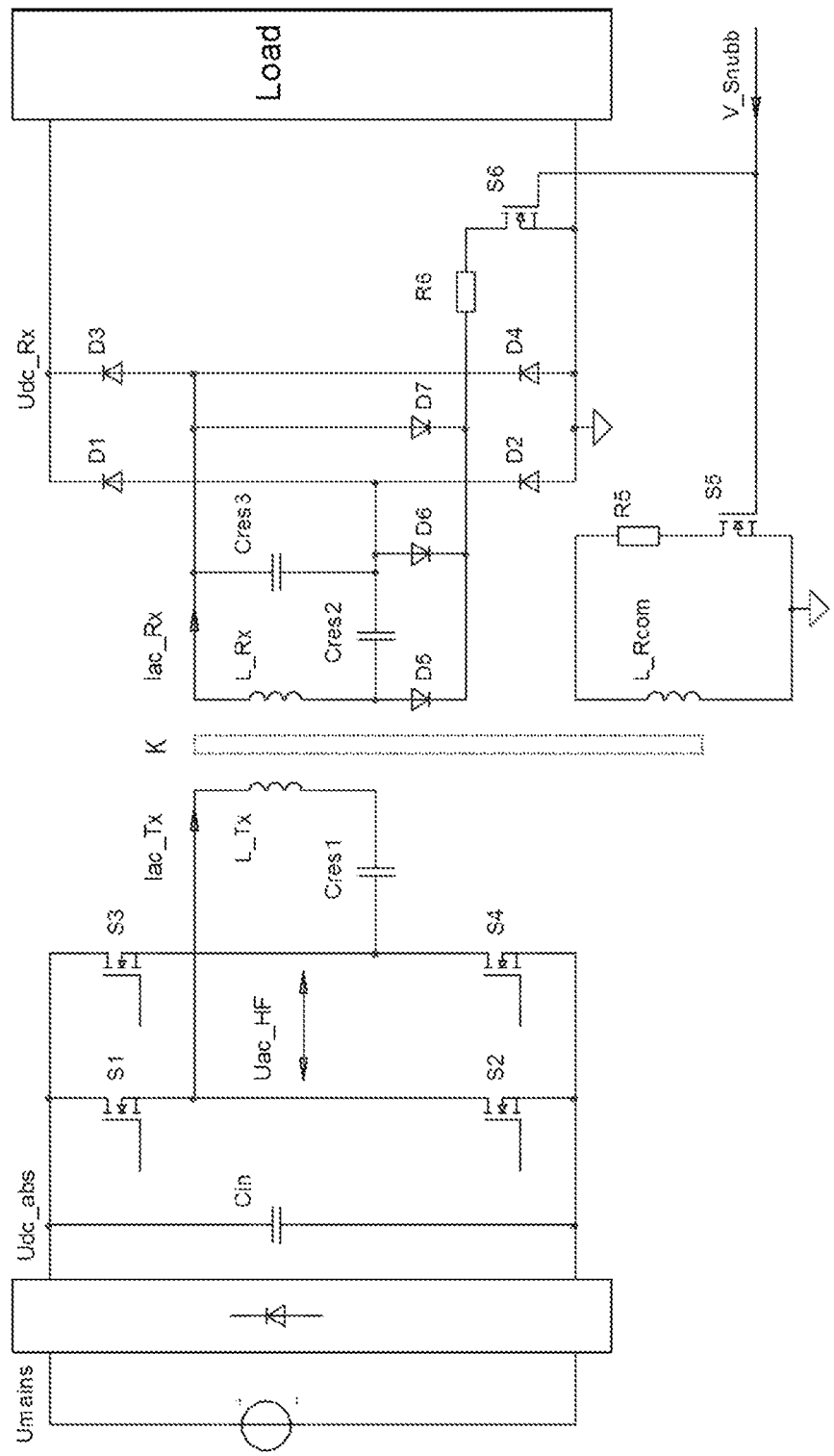
FIG. 40 illustrates an example of elements of a power transfer system in accordance with some embodiments of the invention.
Figure 41:
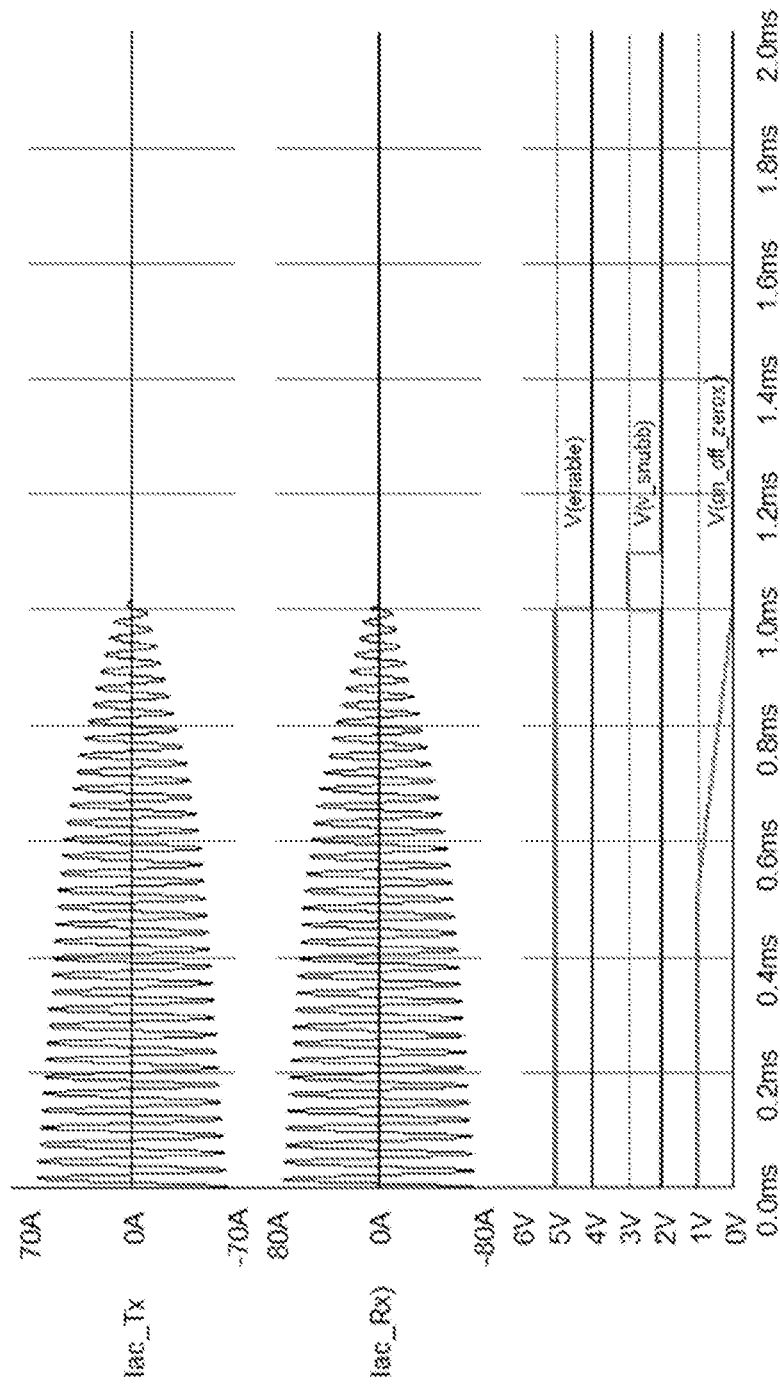
FIG. 41 illustrates an example of some signals of a power transfer system in accordance with some embodiments of the invention.

An example of such an embodiment is provided in FIG. 40. In the example, the inverter is disabled with the modified On_Off_zeroX signal thereby providing a gradual transition. When the modified On_Off_zeroX signal is "low", the four switches S1-S4 are completely switched off by setting the gate signals at zero volt. The switches S5 and S6 are controlled by voltage signal "V_snubb". FIG. 41 illustrates simulation results for this example system. As can be seen, both Iac_Tx and Iac_Rx show no ringing, shortly after the Enable signal goes low.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A power transmitter for transferring power to a power receiver using a wireless inductive power signal, the power transmitter comprising:
an inductor for providing the wireless inductive power signal in response to a drive signal fed to the inductor;
a power source for providing a power source signal;
a power signal generator for generating the drive signal from the power source signal, the power signal generator comprising:
a frequency converter arranged to generate a frequency of the drive signal to be higher than a frequency of the power source signal,
a limiter for restricting a power of the drive signal fed to the inductor to be below a threshold in repeating time intervals;
a synchronizer for synchronizing the repeating time intervals to the power source signal; and
a communication unit for exchanging data with the power receiver during the repeating time intervals.

2. The power transmitter of claim 1, wherein the power source signal is a varying DC power signal.

3. The power transmitter of claim 2, wherein the repeating time intervals correspond to time intervals for which a level of the power source signal is below a power threshold.

4. The power transmitter of claim 2, wherein the synchronizer is arranged to synchronize the repeating time intervals to periodic amplitude variations in the power source signal.

5. The power transmitter of claim 2, wherein the power source signal comprises a ripple component overlaid a DC component, and the synchronizer is arranged to synchronize the repeating time intervals to the ripple component.

6. The power transmitter of claim 1, wherein the power source is arranged to generate the power source signal in response to a rectification of an AC signal, and wherein the synchronizer is arranged to synchronize the repeating time intervals to zero crossings of the AC signal.

7. The power transmitter of claim 1, wherein the limiter is arranged to decouple the inductor from the frequency converter during the repeating time intervals.

8. The power transmitter of claim 1, wherein the communication unit comprises a carrier generator for generating a carrier signal and providing it to the inductor during the repeating time intervals.

9. The power transmitter of claim 8, wherein the communication unit comprises a modulator for modulating data onto the carrier signal during the repeating time intervals.

10. The power transmitter of claim 8, wherein the communication unit comprises a demodulator for demodulating a load modulation of the carrier signal during the repeating time intervals.

11. The power transmitter of claim 8, wherein a frequency of the carrier signal is different from a frequency of the drive signal.

12. The power transmitter of claim 1, wherein the communication unit comprises a modulator for load modulating a load of the inductor during the repeating time intervals.

13. The power transmitter of claim 1, wherein the communication unit comprises a demodulator for demodulating a modulated carrier signal induced in the inductor by the power receiver during the repeating time intervals.

14. The power transmitter of claim 1, wherein the communication unit comprises a communication inductor for communicating with the power receiver during the repeating time intervals.

15. The power transmitter of claim 1, wherein the power signal generator is arranged to determine a duration of the repeating time intervals in response to data received from the power receiver.

16. The power transmitter of claim 1, wherein the limiter is arranged to couple a power dissipation element to the inductor at initiation of a repeating time interval.

17. The power transmitter of claim 16, wherein the coupling of the power dissipation element to the inductor is an inductive coupling.

18. The power transmitter of claim 1, wherein the frequency converter comprises a switch bridge for generating the drive signal, and wherein the limiter is configured to restrict the power signal by gradually changing a relative phase of switch elements of the switch bridge.

19. The power transmitter of claim 1, wherein the frequency converter comprises a switch bridge for generating the drive signal, and the limiter is arranged to restrict the power signal by instantaneously changing drive signals for all switch elements of the switch bridge to switch all switch elements off.

20. A method of operation for a power transmitter transferring power to a power receiver using a wireless inductive power signal, the power transmitter comprising an inductor for providing the wireless inductive power signal in response to a drive signal fed to the inductor; and the method comprising acts of:

providing a power source signal;

generating the drive signal from the power source signal, the generating comprising:

generating a frequency of the drive signal to be higher than a frequency of the power source signal, and restricting a power of the drive signal fed to the inductor to be below a threshold in repeating time intervals;

synchronizing the repeating time intervals to the power source signal; and exchanging data with the power receiver during the repeating time intervals.

* * * * *